US012646411B2

(12) United States Patent
Kose Cihangir et al.

(10) Patent No.: US 12,646,411 B2
(45) Date of Patent: Jun. 2, 2026

(54) METHODS AND DEVICES FOR A ROAD USER

(71) Applicant: Intel Corporation, Santa Clara, CA (US)

(72) Inventors: Neslihan Kose Cihangir, Munich (DE); Rafael Rosales, Unterhaching (DE); Florian Geissler, Munich (DE); Michael Paulitsch, Ottobrunn (DE); Ignacio Alvarez, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 454 days.

(21) Appl. No.: 17/358,036

(22) Filed: Jun. 25, 2021

(65) Prior Publication Data

US 2021/0383695 A1     Dec. 9, 2021

(51) Int. Cl.
*G08G 1/123*      (2006.01)
*G08G 1/056*      (2006.01)
*H04W 4/40*      (2018.01)

(52) U.S. Cl.
CPC ............. *G08G 1/123* (2013.01); *G08G 1/056* (2013.01); *H04W 4/40* (2018.02)

(58) Field of Classification Search
None
See application file for complete search history.

(56) References Cited

U.S. PATENT DOCUMENTS

| | | | | |
|---|---|---|---|---|
| 5,111,401 A * | 5/1992 | Everett, Jr. | .......... | G05D 1/0255 |
| | | | | 180/169 |
| 7,755,510 B2 * | 7/2010 | Bilimoria | ................. | G08G 1/22 |
| | | | | 701/119 |
| 9,460,613 B1 * | 10/2016 | Whiting | ............... | G06V 10/764 |
| 10,282,996 B1 * | 5/2019 | Buchbut | ............... | G08G 1/164 |
| 10,613,547 B2 * | 4/2020 | Riess | ..................... | H04L 67/12 |
| 12,441,353 B2 * | 10/2025 | Braunstein | ............... | G06N 3/08 |
| 2014/0350837 A1 * | 11/2014 | Galbas | .................. | B60W 30/09 |
| | | | | 701/301 |
| 2015/0091740 A1 * | 4/2015 | Bai | ........................ | B60W 40/08 |
| | | | | 340/901 |
| 2017/0025001 A1 * | 1/2017 | Gignac | ................ | G06V 10/809 |

(Continued)

OTHER PUBLICATIONS

Andreas Loecken et al., "How Should Automated Vehicles Interact with Pedestrians? A Comparative Analysis of Interaction Concepts in Virtual Reality", 2019 Automotive User Interfaces, Sep. 21-25, 2019, pp. 262-274, Utrecht, Netherlands.

(Continued)

*Primary Examiner* — Muhammad Adnan
(74) *Attorney, Agent, or Firm* — Viering, Jentschura & Partner mbB

(57)      ABSTRACT
Devices and methods for a road user are provided in this disclosure. An apparatus for determining detection of a road user may include a memory configured to store a plurality of data items received from a plurality of further road users. Each of the plurality of data items may include a detection information indicating whether an object has or has not been detected by one of the plurality of further road users. Furthermore, the apparatus may include a processor that is configured to determine a detection result indicating whether the road user has been detected by the one of the plurality of further road users based on the detection information.

9 Claims, 16 Drawing Sheets

(56) References Cited

U.S. PATENT DOCUMENTS

| | | | | |
|---|---|---|---|---|
| 2017/0083021 | A1* | 3/2017 | Balaghiasefi | G08G 1/163 |
| 2017/0334350 | A1* | 11/2017 | Rink | G06V 40/10 |
| 2018/0090005 | A1* | 3/2018 | Philosof | G08G 1/164 |
| 2018/0232947 | A1* | 8/2018 | Nehmadi | G01S 7/295 |
| 2019/0049992 | A1* | 2/2019 | Riess | G05D 1/0276 |
| 2019/0329780 | A1* | 10/2019 | Tomescu | B62D 15/029 |
| 2019/0378414 | A1* | 12/2019 | Pari | G08G 1/04 |
| 2020/0018613 | A1* | 1/2020 | Stenneth | G08G 1/048 |
| 2020/0049511 | A1* | 2/2020 | Sithiravel | G01S 13/865 |
| 2020/0209882 | A1* | 7/2020 | Kashi | G10K 11/178 |
| 2020/0257560 | A1* | 8/2020 | Wang | G06F 9/4887 |
| 2020/0278681 | A1* | 9/2020 | Gier | G05D 1/0246 |
| 2021/0101620 | A1* | 4/2021 | Buerkle | B60W 10/20 |
| 2021/0152991 | A1* | 5/2021 | Wu | H04W 4/38 |
| 2021/0155233 | A1* | 5/2021 | Beauchamp | G08G 1/166 |
| 2021/0183244 | A1* | 6/2021 | Malhan | G08G 1/09 |
| 2021/0300358 | A1* | 9/2021 | Sherrit | B60Q 9/008 |
| 2021/0312795 | A1* | 10/2021 | Schonfeld | G08G 1/012 |
| 2022/0101732 | A1* | 3/2022 | Saur | G08G 1/163 |
| 2022/0196410 | A1* | 6/2022 | Hines | G06V 20/64 |
| 2022/0221575 | A1* | 7/2022 | Velusamy | G06V 20/58 |
| 2022/0248175 | A1* | 8/2022 | Seureau | H04W 4/14 |
| 2022/0348196 | A1* | 11/2022 | Foltin | B60W 30/16 |
| 2023/0093053 | A1* | 3/2023 | Joseph | H04W 4/40 |
| | | | | 340/932.2 |
| 2023/0136951 | A1* | 5/2023 | Wada | B60W 30/06 |
| | | | | 340/932.2 |
| 2024/0194065 | A1* | 6/2024 | Gabb | G08G 1/166 |
| 2024/0214786 | A1* | 6/2024 | Sharma Banjade | H04W 4/40 |
| 2025/0218290 | A1* | 7/2025 | Nordbruch | H04L 67/12 |
| 2025/0308253 | A1* | 10/2025 | Venkatesh | G06V 10/26 |

OTHER PUBLICATIONS

Lionel P. Robert Jr., "The Future of Pedestrian-Automated Vehicle Interactions", XRDS: Crossroads, The ACM Magazine for Students, Apr. 11, 2019, pp. 30-33, vol. 25, Issue 3.

Max Oudshoorn et al., "Bio-inspired intent communication for automated vehicles", Transportation Research Part F 80 (2021), 2021, pp. 127-140, Elsevier Ltd.

European Telecommunications Standards Institute (ETSI), "Intelligent Transport Systems (ITS); Users and applications requirements; Part 2: Applications and facilities layer common data dictionary", Sep. 2014, RTS/ITS-00148, ETSI TS 102 894-2 V1.2.1 (Sep. 2014).

Marketsandmarkets, "Intelligent transportation system market—Global Forecast To 2023", Mar. 2018.

Ashesh Jain et al., "Brain4Cars: Car That Knows Before You Do via Sensory-Fusion Deep Learning Architecture", arXiv, Jan. 5, 2016, 15 pages.

World Health Organization, "Make walking safe: a brief overview of pedestrian safety around the world", 2013, 8 pages, WHO/NMH/VIP13.02.

Stéphanie Levéfre et al., "A survey on motion prediction and risk assessment for intelligent vehicles", Robomech Journal 2014, 2014, 14 pages, vol. 1, p. 1, HAL Id: hal-01053736.

Hema S. Koppula et al., "Learning Spatio-Temporal Structure from RGB-D Videos for Human Activity Detection and Anticipation", Proceedings of the 30th International Conference on Machine Learning, 2013, 9 pages, vol. 28, Atlanta, Georgia, USA.

David F. Bizup et al., "Maneuver detection using the radar range rate measurement", IEEE Transactions On Aerospace And Electronic Systems, Jan. 2004, pp. 330-336, vol. 40, No. 1.

Sea Stachura; "Why Pedestrian Deaths Are At A 30-Year High"; https://www.npr.org/2019/03/28/706481382/why-pedestrian-deaths-are-at-a-30-year-high.?t=1636027148793; NPR; retrieved on Nov. 4, 2021; 14 pages.

https://zonesafe.com/wp-content/uploads/2015/11/Crossing-Alert.jpg; retrieved on Nov. 4, 2021; 1 page.

Manolis Tsogas et al., "Situation refinement for vehicle maneuver identification and driver's intention prediction", 10th International Conference on Information Fusion (FUSION 2007), Jul. 9-12, 2017, 8 pages, Quebec City, Canada.

Neslihan Koese et al., "Multi-view human activity recognition using motion frequency", Proceedings of the 2017 IEEE International Conference on Image Processing (ICIP), Sep. 17-20, 2017, pp. 3963-3967, Beijing, China.

Sangheon Park et al., "Infrastructure based Vehicle Recognition System with multi sensor fusion", 2013, 7th International Conference on Signal Processing and Communication Systems (ICSPCS), Dec. 16-18, 2013, 5 pages, IEEE, Carrara, Australia.

BFW Innovations Ltd, "The Pedestrian Crossing Alert System", Jun. 22, 2021, 4 pages.

Inc. Technology Solutions for Bike Path Safety; http://www.crossalert.com/; retrieved on Nov. 4, 2021; 3 pages.

Solnick & Associates, LLC; "How Optical Illusions May Trick Montgomery County Drivers Into Slowing Down"; https://www.solnicklawyers.com/optical-illusions-drivers-slow-down/; retrieved on Nov. 4, 2021; 9 pages.

Mhafuzul Islam et al., "Vision-based Pedestrian Alert Safety System (PASS) for Signalized Intersections" Transportation Cyber Physical Systems (TCPS), Jul. 2019, 23 pages.

US Department of Transportation; "VS 13: Intersection Safety Warning and Collision Avoidance"; https://local.iteris.com/arc-it/html/servicepackages/sp57.html#tab-3; retrieved on Nov. 4, 2021; 16 pages.

Alexandre Alahi et al., "Social LSTM: Human Trajectory Prediction in Crowded Spaces", 2016 IEEE Conference on Computer Vision and Pattern Recognition (CVPR), Jun. 27-30, 2016, pp. 961-971, IEEE, Las Vegas, NV, USA.

Tung Phan-Minh Caltech et al., "CoverNet: Multimodal Behavior Prediction Using Trajectory Sets", 2020 IEEE/CVF Conference on Computer Vision and Pattern Recognition (CVPR), Jun. 13-19, 2020, pp. 14074-14083, IEEE, Seattle, WA, USA.

Artsiom Sanakoyeu; "Winning solution for Kaggle challenge: Lyft Motion Prediction for Autonomous Vehicles"; https://gdude.de/blog/2021-02-05/Kaggle-Lyft-solution; retrieved on Nov. 4, 2021; 17 pages.

* cited by examiner

| | 1001 | 1002 | 1003 | 1004 | 1005 | 1006 |
| --- | --- | --- | --- | --- | --- | --- |
| | ID | Environment Data | Location | Type | Detection Result | Time |
| | Road user #802 | 1 pedestrian;<br>1 vehicle;<br>1 RSU | 48.134311;11.610382 | Vehicle | Aware | 1623911764 |
| | Road user #806 | 1 vehicle;<br>1 RSU | 48.134275;11.610297 | Vehicle | Not Aware | 1623911864 |
| | Road side unit #808 | 4 vehicles;<br>1 pedestrian | 48.134438;11.610350 | RSU | Aware | 1623911909 |
| | N/A | N/A | 48.134759;11.610011 | Vehicle | Not Aware | 1623911909 |
| | N/A | N/A | 48.134191;11.610196 | Vehicle | Not Aware | 1623911909 |

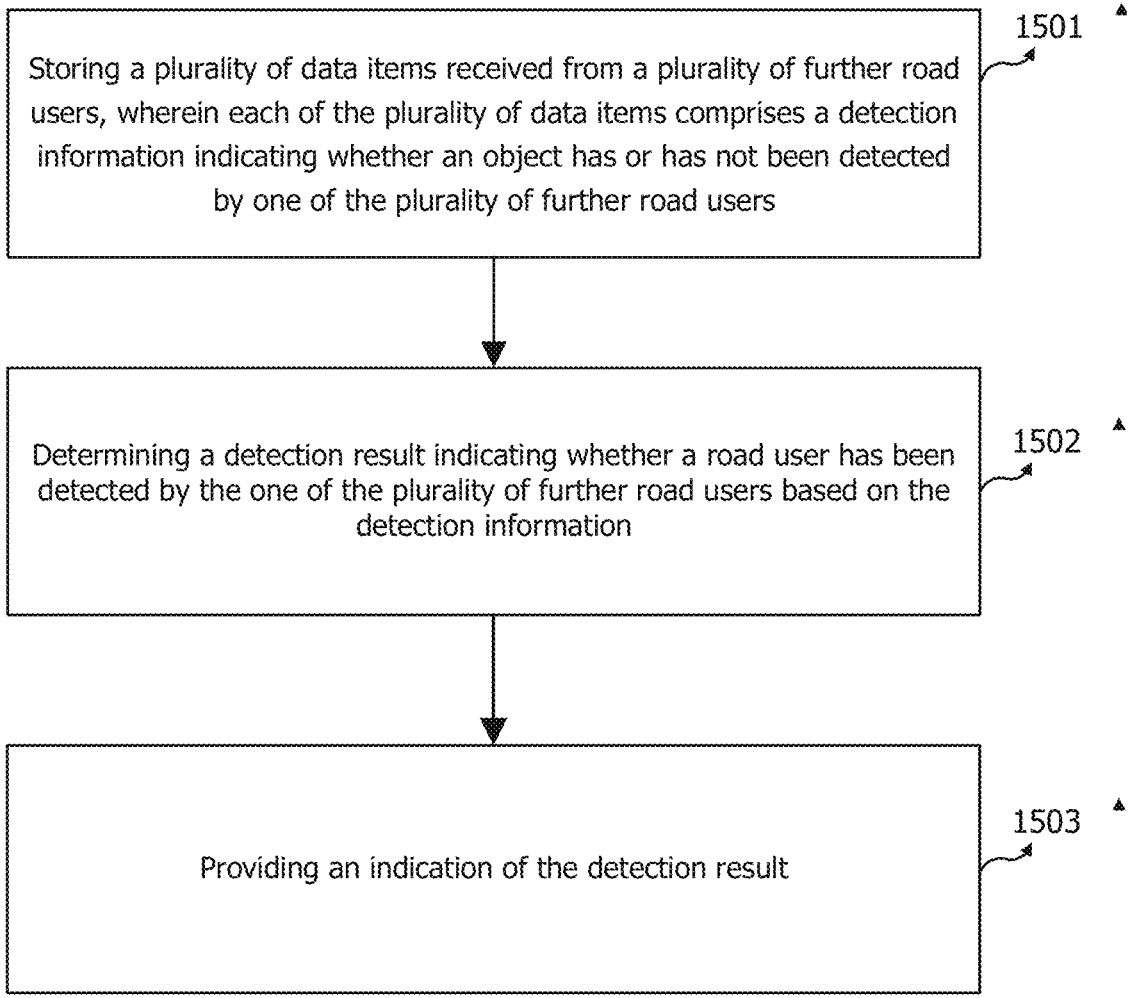

Storing a plurality of data items received from a plurality of further road users, wherein each of the plurality of data items comprises a detection information indicating whether an object has or has not been detected by one of the plurality of further road users

1501

Determining a detection result indicating whether a road user has been detected by the one of the plurality of further road users based on the detection information

1502

Providing an indication of the detection result

| Interface 1901 | Memory 1902 | Data Fusion 1903 |
| --- | --- | --- |
| Vehicle Trajectory Prediction 1904 | Road Occupancy Prediction 1905 | VRU Trajectory Prediction 1906 |
| Relevancy Filter 1907 | I/O 1908 | Rules Filter 1909 |

1900

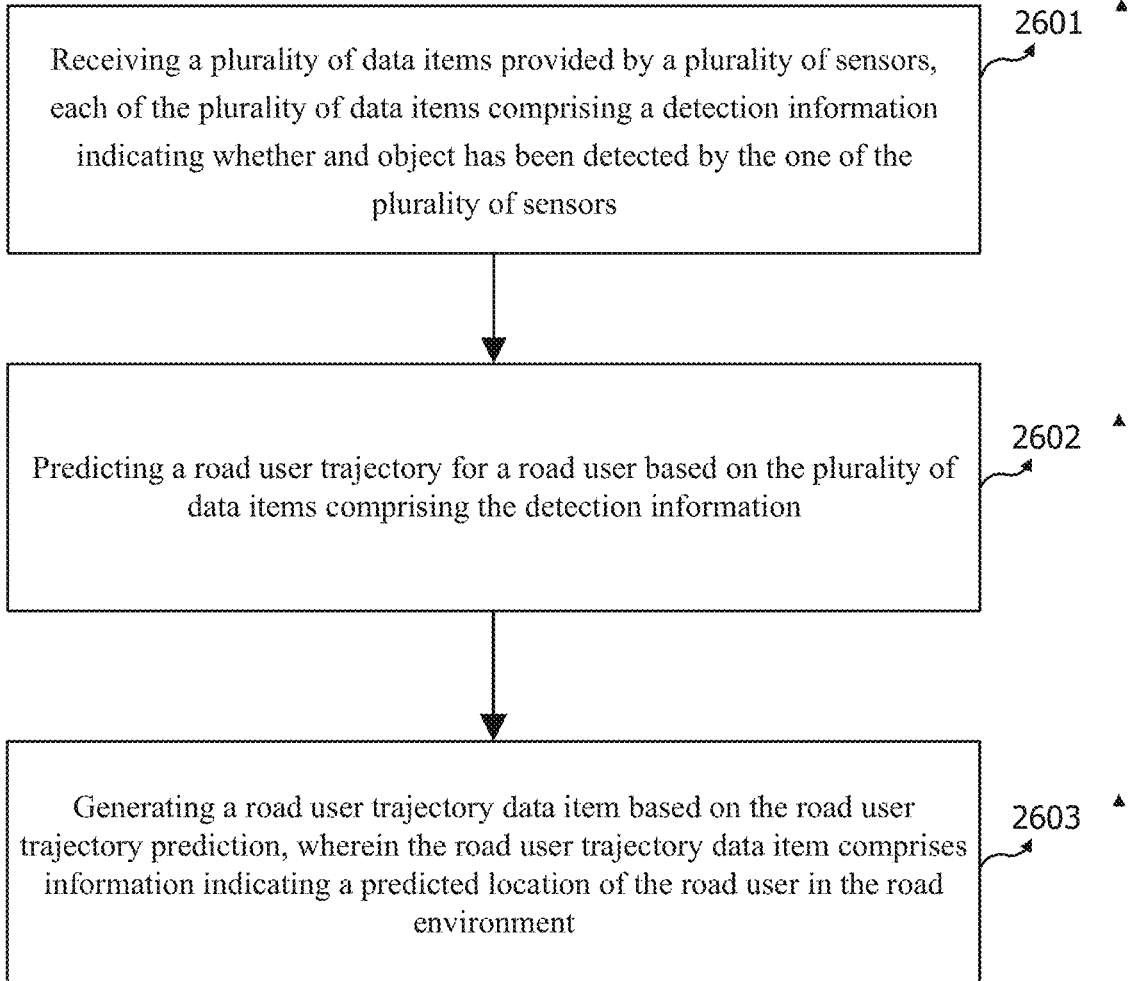

Receiving a plurality of data items provided by a plurality of sensors, each of the plurality of data items comprising a detection information indicating whether and object has been detected by the one of the plurality of sensors        2601

Predicting a road user trajectory for a road user based on the plurality of data items comprising the detection information        2602

Generating a road user trajectory data item based on the road user trajectory prediction, wherein the road user trajectory data item comprises information indicating a predicted location of the road user in the road environment        2603

FIG. 26

METHODS AND DEVICES FOR A ROAD USER

TECHNICAL FIELD

This disclosure generally relates to methods and devices for a road user, apparatus for determining detection of a road user, apparatus for predicting a trajectory for a road uses.

BACKGROUND

In general, the development of traffic related network infrastructures may be applied in the field of intelligent transportation. A so-called "intelligent transportation system" (ITS) may provide one or more services relating to transport management, e.g., with the goal of enabling safe and coordinated use of a transport network. The road traffic may include the presence of various road user types, and it may be necessary to provide methods that may be employed by road users to supply awareness with respect to the road traffic and road environment. A road traffic related ITS may include information and communication technologies applied in the field of road transportation, including, for example, infrastructure, vehicles, and users. Various forms of communication technologies may be used to implement communication in an ITS, e.g., short-range communication or long-range communication.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the disclosure. In the following description, various aspects of the disclosure are described with reference to the following drawings, in which:

FIG. 15 shows schematically an example of a method;

FIG. 26 shows schematically an example of a method.

DESCRIPTION

Figure 1:
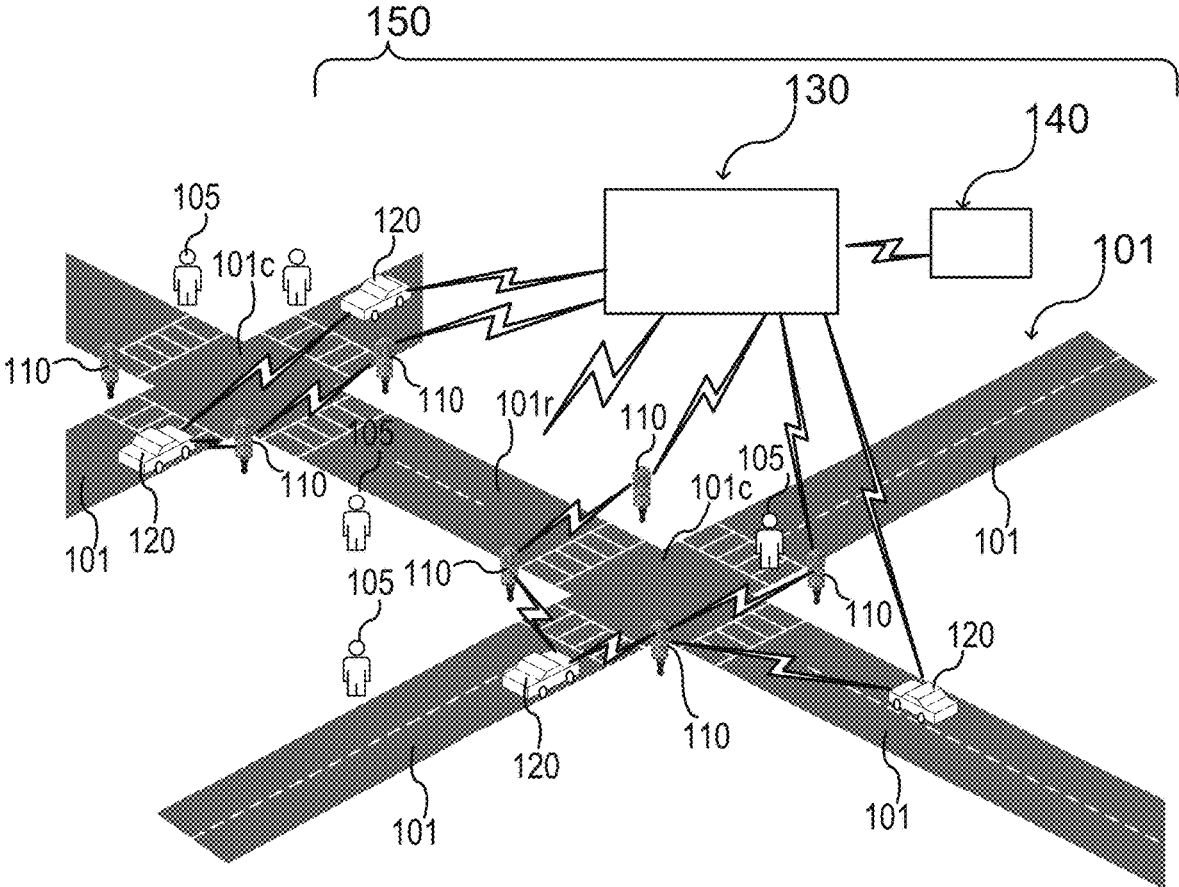
FIG. 1 illustrates a road system.

The following detailed description refers to the accompanying drawings that show, by way of illustration, exemplary details and aspects in which aspects of the present disclosure may be practiced.

With recent developments in vehicle and road related technologies, road users have become more aware of their environment. It is common for vehicles to provide assistance to their drivers by using their sensors and detecting the environment for various matters, and autonomous vehicles are capable of driving and interacting in a road environment based on the detection. Further, recent developments in communication technologies allowed road users exchanging information with each other to increase their awareness and use the exchanged information to improve the driving experience.

Road users traditionally may seek an indication from other road users in a road environment especially when there is a decision to make for the road user about how the road user would proceed based on the situation. Such indication may be provided with an eye-contact, a hand gesture, other road user slowing down, or any other signal which the road user may relate to whether the other road user has acknowledged the presence of the road user. It may be desirable for road users to seek the indication via other means. It may also not be possible for the road user who seeks the acknowledgement to receive the acknowledgment from each of the other users who are in the road environment at the same time.

The following detailed description refers to the accompanying drawings that show, by way of illustration, specific details and aspects in which the disclosure may be practiced.

The word "exemplary" is used herein to mean "serving as an example, instance, or illustration". Any aspect or design described herein as "exemplary" is not necessarily to be construed as preferred or advantageous over other aspects or designs.

The words "plurality" and "multiple" in the description or the claims expressly refer to a quantity greater than one. The terms "group (of)", "set [of]", "collection (of)", "series (of)", "sequence (of)", "grouping (of)", etc., and the like in the description or in the claims refer to a quantity equal to or greater than one, i.e. one or more. Any term expressed in plural form that does not expressly state "plurality" or "multiple" likewise refers to a quantity equal to or greater than one. The terms "proper subset", "reduced subset", and "lesser subset" refer to a subset of a set that is not equal to the set, i.e. a subset of a set that contains fewer elements than the set.

As used herein, "memory" is understood as a non-transitory computer-readable medium in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, etc., or any combination thereof. Furthermore, registers, shift registers, processor registers, data buffers, etc., are also embraced herein by the term memory. A single component referred to as "memory" or "a memory" may be composed of more than one different type of memory, and thus may refer to a collective component including one or more types of memory. Any single memory component may be separated into multiple collectively equivalent memory components, and vice versa. Furthermore, while memory may be depicted as separate from one or more other components (such as in the drawings), memory may also be integrated with other components, such as on a common integrated chip or a controller with an embedded memory.

The term "software" refers to any type of executable instruction, including firmware.

The term "radio communication device" utilized herein refers to any devices using radio frequency signals for communication including user-side devices (both portable and fixed) that can connect to a core network and/or external data networks via a radio access network. "Radio communication device" can include any mobile or immobile wireless communication device, including User Equipment (UEs), Mobile Stations (MSs), Stations (STAs), cellular phones, tablets, laptops, personal computers, wearables, multimedia playback, and other handheld or body-mounted electronic devices, consumer/home/office/commercial appliances, vehicles, and any other electronic device capable of user-side wireless communications. Without loss of generality, in some cases terminal devices can also include application-layer components, such as application processors or other general processing components that are directed to functionality other than wireless communications. Radio communication devices can optionally support wired communications in addition to wireless communications. Furthermore, radio communication devices can include vehicular communication devices that function as radio communication devices. The term "radio communication circuit" may refer to a circuit of a radio communication device.

The disclosure may include information related to radio communication technologies. While some examples may refer to specific radio communication technologies, the examples provided herein may be similarly applied to various other radio communication technologies, both existing and not yet formulated, particularly in cases where such radio communication technologies share similar features as disclosed regarding the following examples. As used herein, a first radio communication technology may be different from a second radio communication technology if the first and second radio communication technologies are based on different communication standards.

Aspects described herein may use such radio communication technologies according to various spectrum management schemes, including, but not limited to, dedicated licensed spectrum, unlicensed spectrum, (licensed) shared spectrum (such as LSA, "Licensed Shared Access," in 2.3-2.4 GHz, 3.4-3.6 GHz, 3.6-3.8 GHz and further frequencies and SAS, "Spectrum Access System," in 3.55-3.7 GHz and further frequencies), and may be use various spectrum bands including, but not limited to, IMT (International Mobile Telecommunications) spectrum (including 450-470 MHz, 790-960 MHz, 1710-2025 MHz, 2110-2200 MHz, 2300-2400 MHz, 2500-2690 MHz, 698-790 MHz, 610-790 MHz, 3400-3600 MHz, etc., where some bands may be limited to specific region(s) and/or countries), IMT-advanced spectrum, IMT-2020 spectrum (expected to include 3600-3800 MHz, 3.5 GHz bands, 700 MHz bands, bands within the 24.25-86 GHz range, etc.), spectrum made available under FCC's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 64-71 GHz, 71-76 GHz, 81-86 GHz and 92-94 GHz, etc.), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz) and WiGig Band 3 (61.56-63.72 GHz) and WiGig Band 4 (63.72-65.88 GHz), the 70.2 GHz-71 GHz band, any band between 65.88 GHz and 71 GHz, bands currently allocated to automotive radar applications such as 76-81 GHz, and future bands including 94-300 GHz and above.

For purposes of this disclosure, radio communication technologies may be classified as one of a Short-Range radio communication technology or Cellular Wide Area radio communication technology. Short Range radio communication technologies may include Bluetooth, WLAN (e.g., according to any IEEE 802.11 standard), and other similar radio communication technologies. Cellular Wide Area radio communication technologies may include Global System for Mobile Communications (GSM), Code Division Multiple Access 2000 (CDMA2000), Universal Mobile Telecommunications System (UMTS), Long Term Evolution (LTE), General Packet Radio Service (GPRS), Evolution-Data Optimized (EV-DO), Enhanced Data Rates for GSM Evolution (EDGE), High Speed Packet Access (HSPA; including High Speed Downlink Packet Access (HSDPA), High Speed Uplink Packet Access (HSUPA), HSDPA Plus (HSDPA+), and HSUPA Plus (HSUPA+)), Worldwide Interoperability for Microwave Access (WiMax) (e.g., according to an IEEE 802.16 radio communication standard, e.g., WiMax fixed or WiMax mobile), etc., and other similar radio communication technologies. Cellular Wide Area radio communication technologies also include "small cells" of such technologies, such as microcells, femtocells, and picocells. Cellular Wide Area radio communication technologies may be generally referred to herein as "cellular" communication technologies.

The terms "radio communication network," "wireless network", "communication network," or the like, as utilized herein encompasses both an access section of a network (e.g., a radio access network (RAN) section) and a core section of a network (e.g., a core network section).

Unless explicitly specified, the term "transmit" encompasses both direct (point-to-point) and indirect transmission (via one or more intermediary points). Similarly, the term "receive" encompasses both direct and indirect reception. Furthermore, the terms "transmit", "receive", "communicate", and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as radio frequency (RF) transceivers and antennas, and the logical transmission and reception over the software-level connection is performed by the processors or controllers. The term "communicate" may encompass one or both of transmitting and receiving, i.e., unidirectional or bidirectional communication in one or both of the incoming and outgoing directions. The term "calculate" may encompass both 'direct' calculations via a mathematical expression/formula/relationship and 'indirect' calculations via lookup or hash tables and other array indexing or searching operations.

FIG. 1 illustrates a road system 101, including various road users including a plurality of vehicles 120, and a traffic infrastructure system 150 in a schematic view. It is noted that all types of road users, e.g., motor bikes, robots, busses, trucks, bicycles, pedestrians 105, may use the road system 100 and may be understood as road-users in a similar way as the illustrated vehicles 120. The road system 101 may include roads 101r, intersections 101c, and/or any other road structures (not illustrated), e.g., bridges, tunnels, parking garages, as examples.

Each (or at least one) of the vehicles 120 may include an apparatus (e.g., an onboard unit) that may be configured to allow for a communication between one or more of the vehicles 120 and components of the traffic infrastructure system 150, e.g., between one or more vehicles 120 and one or more roadside units 110, between one or more vehicles 120 and a monitoring system 130, and/or between one or more vehicles 120 and a vehicle monitoring system 140, and/or between one or more vehicles 120 and other road users, such as pedestrians 105 or vulnerable road users.

Furthermore, other road users, such as pedestrians 105 or vulnerable road users may be equipped with an apparatus (e.g. a user device, a user equipment, a wearable device) that may be configured to communicate with one or more of the vehicles 120, and/or components of the traffic infrastructure system 150, e.g., with one or more roadside units 110, with the monitoring system 130, with the vehicle monitoring system 140, and/or with other road users that are equipped with a similar apparatus.

The monitoring system 130 (also referred to as monitoring entity, also referred to as attestation and reputation entity) may be part of or implemented in one or more centralized computing devices and/or one or more decentralized computing devices. The monitoring system 130 may include one or more centralized computing devices and/or one or more decentralized computing devices. The monitoring system 130 may be an entity of an intelligent transportation system or may be an additional entity associated with an intelligent transportation system. The monitoring system 130 may be configured to receive data from the one or more roadside units 110, from the one or more vehicles 120, and/or from the vehicle monitoring system 140, as examples.

The data transfer that allows transferring information between the various apparatus is illustrated in FIG. 1 by help of the bolt sign. The monitoring system 130 may include one or more communication interfaces and/or one or more application programming interfaces (APIs) for the respective data transfer. The monitoring system 130 may be configured to send data to the one or more roadside units 110 and/or to the one or more vehicles 120 and/or to broadcast data to allow for a reception of the data by the one or more roadside units 110 and/or the one or more vehicles 120. The one or more roadside units 110 may include or may be coupled to one or more transmitters and/or one or more receivers for the respective data transfer. The one or more vehicles 120 may include or may be coupled to one or more transmitters and/or one or more receivers for the respective data transfer. The monitoring system 130 may include or may be coupled to one or more transmitters and/or one or more receivers for the respective data transfer. The vehicle monitoring system 140 may include or may be coupled to one or more transmitters and/or one or more receivers for the respective data transfer.

The one or more roadside units 110 may be coupled to or may include one or more sensors to obtain data (e.g., sensor data). Sensor data may represent traffic related information. Sensor data may be an input for a model-based estimation (e.g., an estimation of a current state or an estimation of a state in the future, referred to as prediction) of one or more traffic related characteristics. Traffic related information may include environmental information, e.g., information related to weather conditions, temperature, humidity, fog, rainfall, snowfall, sunshine, daytime, nighttime, illumination, only as examples. Traffic related information may include vehicle information, e.g., information related to traffic density, an accident, a velocity of one or more vehicles, a type of one or more vehicles, a function of one or more vehicles (e.g., the vehicle, e.g., an ambulance, may be privileged), only as examples. Traffic related information may include road condition information, e.g., information related to the presence of an icy road, a wet road, a dry road, a number of potholes, a surface condition of a road, only as examples). Traffic related information may include information related to road works, redirections, a status of one or more traffic lights, pedestrian crossings, only as examples.

Furthermore, a vehicle (e.g., vehicle 120) or one or more apparatus of a vehicle (e.g., of vehicle 120) may include or coupled to one or more sensors to obtain data (e.g., sensor data). Sensor data may represent traffic related information. Sensor data may be an input for a model-based estimation (e.g., an estimation of a current state or an estimation of a state in the future, referred to as prediction) of one or more traffic related characteristics. Traffic related information may include environmental information, e.g., information related to weather conditions, temperature, humidity, fog, rainfall, snowfall, sunshine, daytime, nighttime, illumination, only as examples. Traffic related information may include road user information, e.g., information related to other road users, presence of one or more road users, detection of one or more road users, awareness of one or more road users, movement of one or more road users, a velocity of one or more road users, a type of one or more road users, a function of one or more one or more road users (e.g., the vehicle, e.g., an ambulance, may be privileged), a location of one or more road users, which may further include vehicle information, e.g., information related to traffic density, an accident, a velocity of one or more vehicles, a type of one or more vehicles, a function of one or more vehicles (e.g., the vehicle, e.g., an ambulance, may be privileged), and further information related to the presence of an icy road, a wet road, a dry road, a number of potholes, a surface condition of a road, only as examples) only as examples. Traffic related information may include information related to road works, redirections, a status of one or more traffic lights, pedestrian crossings, only as examples.

The one or more sensors associated with one or more roadside units 110 or one or more vehicles (e.g. of vehicle 120) may include, for example, one or more cameras. A vehicle 120 or a roadside unit 110 may obtain traffic related information from image data, e.g., by applying one or more image analyzing algorithms on the image data. One or more cameras may be configured to provide the image data. However, the one or more sensors associated with one or more roadside units 110 or one or more vehicles 120 may include other types of sensors, e.g., one or more RADAR (radio detection and ranging) sensors, one or more temperature sensors, one or more humidity sensors, one or more illumination sensors, one or more acoustic sensors, one or more LIDAR (light detection and ranging) sensors, only as examples.

The one or more roadside units 110, one or more apparatus of a roadside unit 110, one or more processors of a roadside units 110, or one or more processors of one or more apparatus of a roadside unit 110, or one or more processors of one or more vehicles 120 may be configured to cause to send (e.g., to output to a transmitter or to transmit) the sensor data or information including an indication to the sensor data or a portion of the sensor data, e.g. a data item, to one or more vehicles 120 in the vicinity of the roadside unit 110 or of the vehicle 120 respectively. The vicinity of the roadside unit 110 or the vehicle 120 may include a coverage of one or more transmitters associated with the respective roadside unit 110 or the respective vehicle 120, e.g., based on the type of transmission, e.g., a short-range transmission (e.g., in a range up to 100 m or more) or a long-range transmission (e.g., up to 1 km or more than 1 km) may be used depending on the type of information and the desired estimation.

A traffic infrastructure system (e.g., traffic infrastructure system 150) may include one or more monitoring systems (e.g., monitoring system 130), one or more roadside units (e.g., roadside units 110), one or more vehicles (or at least one onboard units of one or more vehicles, e.g., one or more vehicles 120), and one or more vehicle monitoring systems (e.g., vehicle monitoring system 140).

A traffic infrastructure system (e.g., traffic infrastructure system 150) may include a roadside unit (e.g., roadside unit 110) connected to or including one or more (e.g., one or more first) sensors, the roadside unit may be, in a first operation mode, configured to generate a first estimation of one or more traffic related characteristics based on first sensor data provided from the one or more sensors to the roadside unit, the roadside unit may be, in a second operation mode, configured to obtain second sensor data and generate a second estimation of the one or more traffic related characteristics based on the second sensor data, and compare the first estimation and the second estimation with one another and based on the comparison, and determine a quality of the first sensor data and/or a quality of the first estimation.

The traffic infrastructure system (e.g., traffic infrastructure system 150) may further include that the roadside unit (e.g., roadside unit 110) may be configured to store the first sensor data as reference data in one or more memories and to load the reference data from the one or more memories, the reference data loaded from the one or more memories may serve as the second sensor data.

The traffic infrastructure system (e.g., traffic infrastructure system 150) may further include that the roadside unit (e.g., roadside unit 110) may be configured to obtain the second sensor data based on a communication with an apparatus of the traffic infrastructure system, e.g., from the monitoring system (e.g., monitoring system 130), from a cloud computing system, from a cloud storage system, as examples.

One or more apparatus of a roadside unit (e.g., of roadside unit 110) may include one or more processors configured to obtain first sensor data, generate a first estimation of one or more traffic related characteristics based on the first sensor data, obtain second sensor data, generate a second estimation of the one or more traffic related characteristics based on the second sensor data, and compare the first estimation and the second estimation with one another, and determine a quality of the first sensor data and/or a quality of the first estimation based on the comparison.

The traffic infrastructure system 150 and/or a roadside unit 110 may generate information in relation with the traffic infrastructure system 150 and/or a roadside unit 110, and may encode V2X messages for transmission. V2X messages may include information indicating an observation that the traffic infrastructure system 150 and/or a roadside unit 110 performs using sensor data. For example, the messages may include information indicating a list of objects that the traffic infrastructure system 150 and/or a roadside unit 110 has detected in its vicinity using sensors. The traffic infrastructure system 150 and/or the roadside unit 110 may transmit the list of objects for other road users to make other road users aware of the objects that the traffic infrastructure system 150 and/or the roadside unit 110 has detected using sensors.

The traffic infrastructure system 150 and/or the roadside unit 110 may further assign a type for the object which the traffic infrastructure system 150 and/or the roadside unit has detected. The traffic infrastructure system 150 and/or the roadside unit 110 may use techniques other than detection to assign the type. For example, the traffic infrastructure system 150 and/or the roadside unit 110 may use measurement devices to estimate a velocity for the object that the traffic infrastructure system 150 and/or the roadside unit 110 has detected, and the traffic infrastructure system 150 and/or the roadside unit 110 may determine a type based on the estimated velocity. The traffic infrastructure system 150 and/or the roadside unit 110 may encode information indicating a type for the detected object and transmit the encoded information via a message including a data item e.g. a V2X message.

Further, the traffic infrastructure system 150 and/or the roadside unit 110 may encode information indicating the position of the traffic infrastructure system 150 and/or the roadside unit 110 to be transmitted via a message e.g. a V2X message. Furthermore, the traffic infrastructure system 150 and/or the roadside unit 110 may estimate a position for the object which the traffic infrastructure system 150 and/or the roadside unit 110 has detected. The traffic infrastructure system 150 and/or the roadside unit 110 may estimate the position of the object based on the position of the traffic infrastructure system 150 and/or the roadside unit 110. The traffic infrastructure system 150 and/or the roadside unit 110 may encode information indicating a position for the detected object and transmit the encoded information via a message, e.g. a V2X message.

Furthermore, the traffic infrastructure system 150 and/or the roadside unit 110 may encode other information that is related to the traffic infrastructure system 150 and/or the roadside unit 110 to be transmitted via a V2X message. The other information may include identifiers of one or more road users in the vicinity for the purpose of being recognized by other entities, such as other vehicles, infrastructure, or pedestrians. The other information may include a type information indicating the type of recognized one or more road users.

Further, the traffic infrastructure system 150 and/or the roadside unit 110 may provide one or more past locations of one or more road users in the vicinity. Furthermore, the traffic infrastructure system 150 and/or the roadside unit 110 may perform a prediction for a trajectory of one or more road users based on their past locations. The prediction may further be based on observations performed by sensors or other measurement devices. Accordingly, the traffic infrastructure system 150 and/or the roadside unit 110 may encode information indicating the trajectory of one or more road users. The indicated trajectory may be related to past locations of the one or more road users. The indicated trajectory may be related to predicted locations of the one or more road users at least for a future time instance. The predicted location may include at least one location for the one or more road user to be present at a future time instance. The traffic infrastructure system 150 and/or the roadside unit 110 may transmit the encoded information via a V2X message. All information discussed herein may be encoded in one data item or in a plurality of data items as an environment data.

Figure 2:
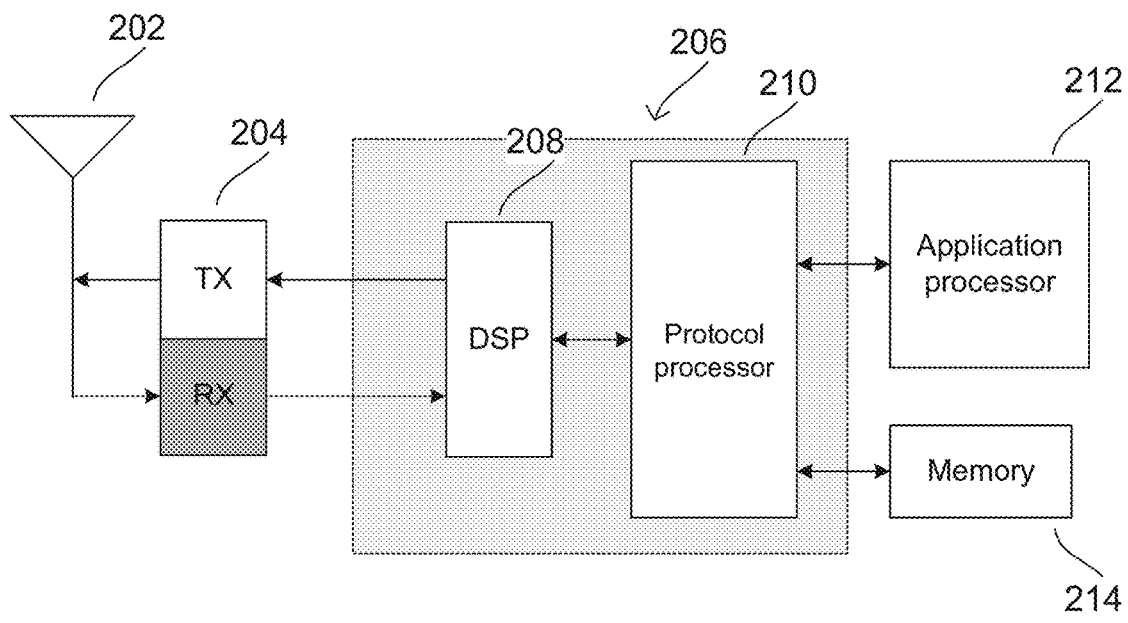
FIG. 2 shows an exemplary internal configuration of a user device.

FIG. 2 shows an exemplary internal configuration of a user device that may be equipped by a road user, which may include antenna system 202, radio frequency (RF) transceiver 204, baseband modem 206 (including digital signal processor 208 and protocol controller 210), application processor 212, and memory 214. Although not explicitly shown in FIG. 2, the user device may include one or more additional hardware and/or software components, such as processors/microprocessors, controllers/microcontrollers, other specialty or generic hardware/processors/circuits, peripheral device(s), memory, power supply, external device interface(s), subscriber identity module(s) (SIMs), sensors, user input/output devices (display(s), keypad(s), touchscreen(s), speaker(s), external button(s), camera(s), microphone(s), etc.), or other related components.

The user device may transmit and receive radio signals on one or more radio access networks. Baseband modem 206 may direct such communication functionality of the user device according to the communication protocols associated with each radio access network, and may execute control over antenna system 202 and RF transceiver 204 to transmit and receive radio signals according to the formatting and scheduling parameters defined by each communication protocol. Although various practical designs may include separate communication components for each supported radio communication technology (e.g., a separate antenna, RF transceiver, digital signal processor, and controller), for purposes of conciseness the configuration of the user device shown in FIG. 2 depicts only a single instance of such components.

The user device may transmit and receive wireless signals with antenna system 202. Antenna system 202 may be a single antenna or may include one or more antenna arrays that each include multiple antenna elements. For example, antenna system 202 may include an antenna array at the top of the user device and a second antenna array at the bottom of the user device. Antenna system 202 may additionally include analog antenna combination and/or beamforming circuitry.

In the receive (RX) path, RF transceiver 204 may receive analog radio frequency signals from antenna system 202 and perform analog and digital RF front-end processing on the analog radio frequency signals to produce digital baseband samples (e.g., In-Phase/Quadrature (IQ) samples) to provide to baseband modem 206. RF transceiver 204 may include analog and digital reception components including amplifiers (e.g., Low Noise Amplifiers (LNAs)), filters, RF demodulators (e.g., RF IQ demodulators)), and analog-to-digital converters (ADCs), which RF transceiver 204 may utilize to convert the received radio frequency signals to digital baseband samples.

In the transmit (TX) path, RF transceiver 204 may receive digital baseband samples from baseband modem 206 and perform analog and digital RF front-end processing on the digital baseband samples to produce analog radio frequency signals to provide to antenna system 202 for wireless transmission. RF transceiver 204 may thus include analog and digital transmission components including amplifiers (e.g., Power Amplifiers (PAs), filters, RF modulators (e.g., RF IQ modulators), and digital-to-analog converters (DACs), which RF transceiver 204 may utilize to mix the digital baseband samples received from baseband modem 206 and produce the analog radio frequency signals for wireless transmission by antenna system 202. Baseband modem 206 may control the radio transmission and reception of RF transceiver 204, including specifying the transmit and receive radio frequencies for operation of RF transceiver 204.

Baseband modem 206 may include digital signal processor 208, which may perform physical layer (PHY, Layer 1) transmission and reception processing to, in the transmit path, prepare outgoing transmit data provided by protocol controller 210 for transmission via RF transceiver 204, and, in the receive path, prepare incoming received data provided by RF transceiver 204 for processing by protocol controller 210. Digital signal processor 208 may be configured to perform one or more of error detection, forward error correction encoding/decoding, channel coding and interleaving, channel modulation/demodulation, physical channel mapping, radio measurement and search, frequency and time synchronization, antenna diversity processing, power control and weighting, rate matching/de-matching, retransmission processing, interference cancelation, and any other physical layer processing functions.

Digital signal processor 208 may be structurally realized as hardware components (e.g., as one or more digitally-configured hardware circuits or FPGAs), software-defined components (e.g., one or more processors configured to execute program code defining arithmetic, control, and I/O instructions (e.g., software and/or firmware) stored in a non-transitory computer-readable storage medium), or as a combination of hardware and software components. Digital signal processor 208 may include one or more processors configured to retrieve and execute program code that defines control and processing logic for physical layer processing operations. Digital signal processor 208 may execute processing functions with software via the execution of executable instructions. Digital signal processor 208 may include one or more dedicated hardware circuits (e.g., ASICs, FPGAs, and other hardware) that are digitally configured to specific execute processing functions, where the one or more processors of digital signal processor 208 may offload certain processing tasks to these dedicated hardware circuits, which are known as hardware accelerators. Exemplary hardware accelerators can include Fast Fourier Transform (FFT) circuits and encoder/decoder circuits. The processor and hardware accelerator components of digital signal processor 208 may be realized as a coupled integrated circuit.

The user device may be configured to operate according to one or more radio communication technologies. Digital signal processor 208 may be responsible for lower-layer processing functions (e.g., Layer 1/PHY) of the radio communication technologies, while protocol controller 210 may be responsible for upper-layer protocol stack functions (e.g., Data Link Layer/Layer 2 and/or Network Layer/Layer 3). Protocol controller 210 may thus be responsible for controlling the radio communication components of the user device (antenna system 202, RF transceiver 204, and digital signal processor 208) in accordance with the communication protocols of each supported radio communication technology, and accordingly may represent the Access Stratum and Non-Access Stratum (NAS) (also encompassing Layer 2 and Layer 3) of each supported radio communication technology.

Protocol controller 210 may be structurally embodied as a protocol processor configured to execute protocol stack software (retrieved from a controller memory) and subsequently control the radio communication components of the user device to transmit and receive communication signals in accordance with the corresponding protocol stack control logic defined in the protocol software. Protocol controller 210 may include one or more processors configured to retrieve and execute program code that defines the upper-layer protocol stack logic for one or more radio communication technologies, which can include Data Link Layer/Layer 2 and Network Layer/Layer 3 functions.

Protocol controller 210 may be configured to perform both user-plane and control-plane functions to facilitate the transfer of application layer data to and from radio the user device according to the specific protocols of the supported radio communication technology. User-plane functions can include header compression and encapsulation, security, error checking and correction, channel multiplexing, scheduling, and priority, while control-plane functions may include setup and maintenance of radio bearers. The program code retrieved and executed by protocol controller 210 may include executable instructions that define the logic of such functions.

The user device may also include application processor 212 and memory 214. Application processor 212 may be a CPU, and may be configured to handle the layers above the protocol stack, including the transport and application layers. Application processor 212 may be configured to execute various applications and/or programs of the user device at an application layer of the user device, such as an operating system (OS), a user interface (UI) for supporting user interaction with the user device, and/or various user applications. Application processor 212 may be further configured to output information to other hardware and/or software components and may be further configured to control other hardware/software components of the user device, such as sensors, input/output devices, and circuits etc.

The application processor may interface with baseband modem 206 and act as a source (in the transmit path) and a sink (in the receive path) for user data, such as voice data, audio/video/image data, messaging data, application data, basic Internet/web access data, etc. In the transmit path, protocol controller 210 may therefore receive and process outgoing data provided by application processor 212 according to the layer-specific functions of the protocol stack, and provide the resulting data to digital signal processor 208.

Digital signal processor 208 may then perform physical layer processing on the received data to produce digital baseband samples, which digital signal processor may provide to RF transceiver 204. RF transceiver 204 may then process the digital baseband samples to convert the digital baseband samples to analog RF signals, which RF transceiver 204 may wirelessly transmit via antenna system 202. In the receive path, RF transceiver 204 may receive analog RF signals from antenna system 202 and process the analog RF signals to obtain digital baseband samples. RF transceiver 204 may provide the digital baseband samples to digital signal processor 208, which may perform physical layer processing on the digital baseband samples. Digital signal processor 208 may then provide the resulting data to protocol controller 210, which may process the resulting data according to the layer-specific functions of the protocol stack and provide the resulting incoming data to application processor 212. Application processor 212 may then handle the incoming data at the application layer, which can include execution of one or more application programs with the data and/or presentation of the data to a user via a user interface.

Memory 214 may be a memory component of the user device, such as a hard drive or another such permanent memory device. Although not explicitly depicted in FIG. 2, the various other components of the user device shown in FIG. 2 may additionally each include integrated permanent and non-permanent memory components, such as for storing software program code, buffering data, etc.

The user device may be configured to implement one or more vehicle-to-everything (V2X) communication protocols, which may include vehicle-to-vehicle (V2V), vehicle-to-infrastructure (V21), vehicle-to-network (V2N), vehicle-to-pedestrian (V2P), vehicle-to-device (V2D), vehicle-to-grid (V2G), and other protocols. The user device may be configured to receive communications including communications (one-way or two-way) between a vehicle and one or more other (target) vehicles in an environment of the user device, or even a transmit or broadcast transmission to unspecified recipients in a vicinity of the user device.

The user device may be configured to operate in accordance with a Medium or Wide Range mobile radio communication standard such as, e.g., a 3G (e.g. Universal Mobile Telecommunications System—UMTS), a 4G (e.g. Long-Term Evolution—LTE), or a 5G mobile radio communication standard in accordance with corresponding 3GPP (3rd Generation Partnership Project) standards.

The user device may further be configured to operate in accordance with a Wireless Local Area Network communication protocol or standard such as e.g. in accordance with IEEE 802.11 (e.g. 802.11, 802.11a, 802.11b, 802.11g, 802.11n, 802.11p, 802.11-12, 802.11ac, 802.11ad, 802.11ah, 802.11ay, and the like). The user device may include one or more RF transceiver(s) to implement various communication protocols and/or communication standards.

Figure 3:
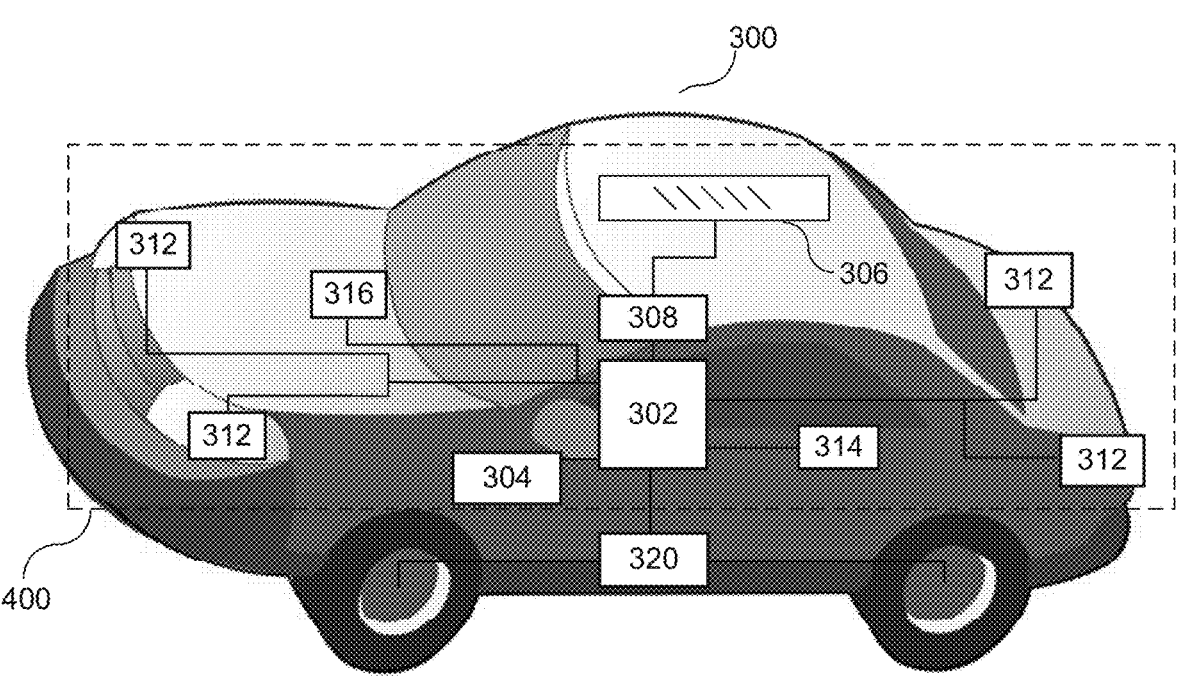
FIG. 3 shows a vehicle including a mobility system and a control system.
Figure 4:
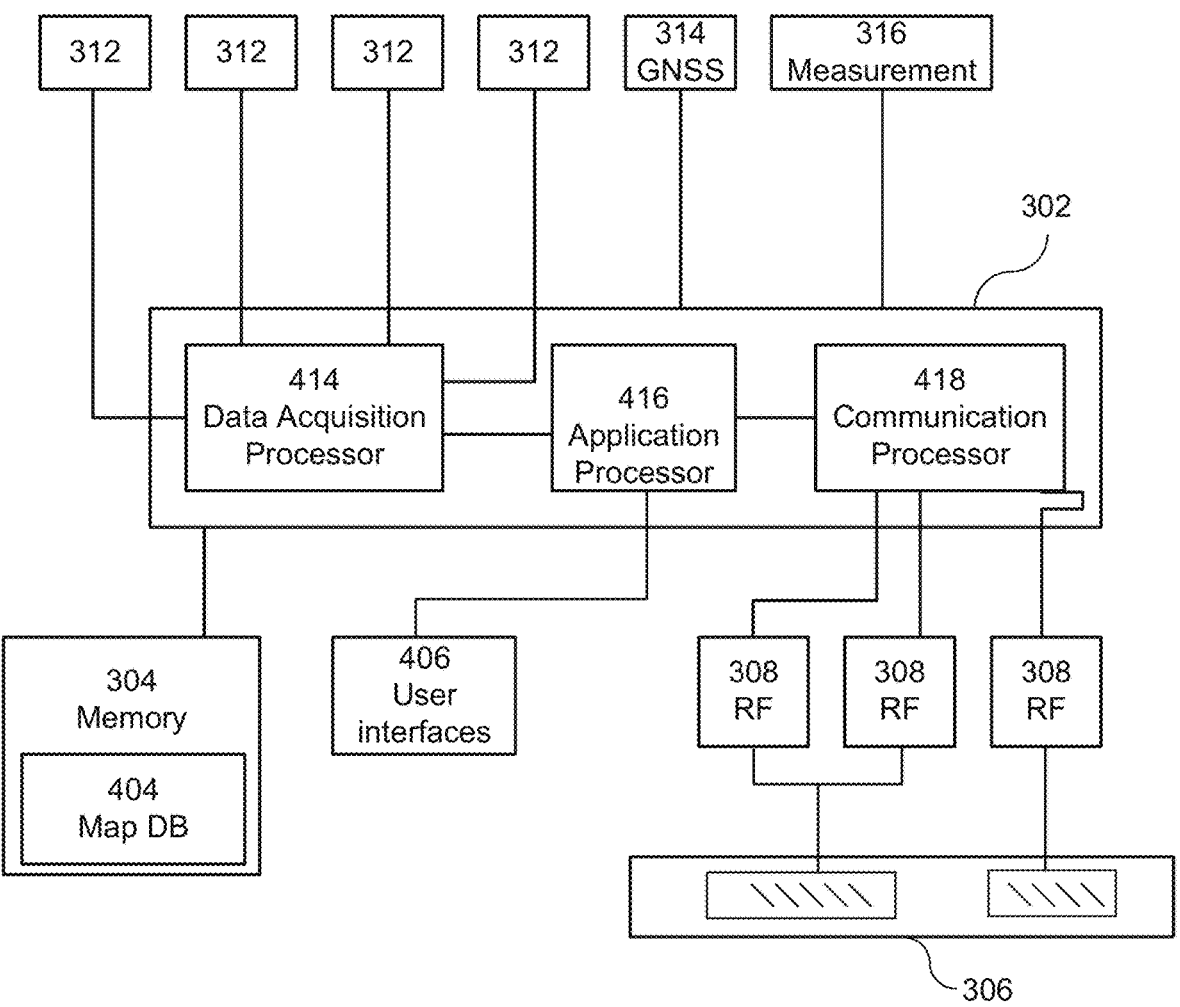
FIG. 4 shows schematically a vehicle including a mobility system and a control system.

FIG. 3 shows a vehicle 300 including a mobility system 320 and a control system 400 (see also FIG. 4). It is appreciated that vehicle 300 and control system 400 are exemplary in nature and may thus be simplified for explanatory purposes. For example, while vehicle 300 is depicted as a ground vehicle, this may be equally or analogously applied to aerial vehicles such as drones. Furthermore, the quantities and locations of elements, as well as relational distances (as discussed above, the figures are not to scale) are provided as examples and are not limited thereto. The components of vehicle 300 may be arranged around a vehicular housing of vehicle 300, mounted on or outside of the vehicular housing, enclosed within the vehicular housing, or any other arrangement relative to the vehicular housing where the components move with vehicle 300 as it travels.

In addition to including a control system 400, vehicle 300 may also include a mobility system 320. Mobility system 320 may include components of vehicle 300 related to steering and movement of vehicle 300. Where vehicle 300 is an automobile, for example, mobility system 320 may include wheels and axles, a suspension, an engine, a transmission, brakes, a steering wheel, associated electrical circuitry and wiring, and any other components used in the driving of an automobile.

Mobility system 320 may also include autonomous driving functionality, and accordingly may include an interface with one or more processors 302 configured to perform autonomous driving computations and decisions and an array of sensors for movement and obstacle sensing. In this sense, the mobility system 320 may be provided with instructions to direct the navigation and/or mobility of vehicle 300 from one or more components of the control system 400. The autonomous driving components of mobility system 320 may also interface with one or more radio frequency (RF) transceivers 308 to facilitate mobility coordination with other nearby vehicular communication devices and/or central networking components, such as a traffic infrastructure system, or a roadside unit, or a monitoring system.

The control system 400 may include various components depending on the requirements of a particular implementation. As shown in FIG. 3 and FIG. 4, the control system 400 may include one or more processors 302, one or more memories 304, an antenna system 306 which may include one or more antenna arrays at different locations on the vehicle for radio frequency (RF) coverage, one or more radio frequency (RF) transceivers 308, one or more data acquisition devices 312, one or more position devices 314 which may include components and circuitry for receiving and determining a position based on a Global Navigation Satellite System (GNSS) and/or a Global Positioning System (GPS), and one or more measurement sensors 316, e.g. speedometer, altimeter, gyroscope, velocity sensors, etc.

The control system 400 may be configured to control the vehicle's 300 mobility via mobility system 320 and/or interactions with its environment, e.g. communications with other devices or network infrastructure elements (NIEs) such as base stations, via data acquisition devices 312 and the radio frequency communication arrangement including the one or more RF transceivers 308 and antenna system 306.

The one or more processors 302 may include a data acquisition processor 414, an application processor 416, a communication processor 418, and/or any other suitable processing device. Each processor 414, 416, 418 of the one or more processors 302 may include various types of hardware-based processing devices. By way of example, each processor 414, 416, 418 may include a microprocessor, pre-processors (such as an image pre-processor), graphics processors, a CPU, support circuits, digital signal processors, integrated circuits, memory, or any other types of devices suitable for running applications and for image processing and analysis. Each processor 414, 416, 418 may include any type of single or multi-core processor, mobile device microcontroller, central processing unit, etc. These processor types may each include multiple processing units with local memory and instruction sets. Such processors may include video inputs for receiving image data from multiple image sensors and may also include video out capabilities.

Any of the processors 414, 416, 418 disclosed herein may be configured to perform certain functions in accordance with program instructions which may be stored in a memory of the one or more memories 304. In other words, a memory of the one or more memories 304 may store software that, when executed by a processor (e.g., by the one or more processors 302), controls the operation of the system, e.g., a driving and/or safety system. A memory of the one or more memories 304 may store one or more databases and image processing software, as well as a trained system, such as a neural network, or a deep neural network, for example. The one or more memories 304 may include any number of random-access memories, read only memories, flash memories, disk drives, optical storage, tape storage, removable storage and other types of storage. Alternatively, each of processors 414, 416, 418 may include an internal memory for such storage.

The data acquisition processor 416 may include processing circuitry, such as a CPU, for processing data acquired by data acquisition units 312. For example, if one or more data acquisition units are image acquisition units, e.g. one or more cameras, then the data acquisition processor may include image processors for processing image data using the information obtained from the image acquisition units as an input. The data acquisition processor 416 may therefore be configured to create voxel maps detailing the surrounding of the vehicle 300 based on the data input from the data acquisition units 312, i.e., cameras in this example.

Application processor 416 may be a CPU, and may be configured to handle the layers above the protocol stack, including the transport and application layers. Application processor 416 may be configured to execute various applications and/or programs of vehicle 300 at an application layer of vehicle 300, such as an operating system (OS), a user interfaces (UI) 406 for supporting user interaction with vehicle 300, and/or various user applications. Application processor 416 may interface with communication processor 418 and act as a source (in the transmit path) and a sink (in the receive path) for user data, such as voice data, audio/video/image data, messaging data, application data, basic Internet/web access data, etc.

In the transmit path, communication processor 418 may therefore receive and process outgoing data provided by application processor 416 according to the layer-specific functions of the protocol stack, and provide the resulting data to digital signal processor 408. Communication processor 418 may then perform physical layer processing on the received data to produce digital baseband samples, which digital signal processor may provide to RF transceiver 308. RF transceiver 308 may then process the digital baseband samples to convert the digital baseband samples to analog RF signals, which RF transceiver 308 may wirelessly transmit via antenna system 306.

In the receive path, RF transceiver 308 may receive analog RF signals from antenna system 306 and process the analog RF signals to obtain digital baseband samples. RF transceiver 308 may provide the digital baseband samples to communication processor 418, which may perform physical layer processing on the digital baseband samples. Communication processor 418 may then provide the resulting data to other processors of the one or more processors 302, which may process the resulting data according to the layer-specific functions of the protocol stack and provide the resulting incoming data to application processor 416. Application processor 416 may then handle the incoming data at the application layer, which can include execution of one or more application programs with the data and/or presentation of the data to a user via a user interface 406. User interfaces 406 may include one or more screens, microphones, mice, touchpads, keyboards, or any other interface providing a mechanism for user input.

The communication processor 418 may include a digital signal processor and/or a controller which may direct such communication functionality of vehicle 300 according to the communication protocols associated with one or more radio access networks, and may execute control over antenna system 306 and RF transceiver(s) 308 to transmit and receive radio signals according to the formatting and scheduling parameters defined by each communication protocol. Although various practical designs may include separate communication components for each supported radio communication technology (e.g., a separate antenna, RF transceiver, digital signal processor, and controller), for purposes of conciseness, the configuration of vehicle 300 shown in FIGS. 3 and 4 may depict only a single instance of such components.

Vehicle 300 may transmit and receive wireless signals with antenna system 306, which may be a single antenna or an antenna array that includes multiple antenna elements. Antenna system 402 may additionally include analog antenna combination and/or beamforming circuitry. In the receive (RX) path, RF transceiver(s) 308 may receive analog radio frequency signals from antenna system 306 and perform analog and digital RF front-end processing on the analog radio frequency signals to produce digital baseband samples (e.g., In-Phase/Quadrature (IQ) samples) to provide to communication processor 418. RF transceiver(s) 308 may include analog and digital reception components including amplifiers (e.g., Low Noise Amplifiers (LNAs)), filters, RF demodulators (e.g., RF IQ demodulators)), and analog-to-digital converters (ADCs), which RF transceiver(s) 308 may utilize to convert the received radio frequency signals to digital baseband samples. In the transmit (TX) path, RF transceiver(s) 308 may receive digital baseband samples from communication processor 418 and perform analog and digital RF front-end processing on the digital baseband samples to produce analog radio frequency signals to provide to antenna system 306 for wireless transmission. RF transceiver(s) 308 may thus include analog and digital transmission components including amplifiers (e.g., Power Amplifiers (PAs), filters, RF modulators (e.g., RF IQ modulators), and digital-to-analog converters (DACs), which RF transceiver(s) 308 may utilize to mix the digital baseband samples received from communication processor 418 and produce the analog radio frequency signals for wireless transmission by antenna system 306. Communication processor 418 may control the radio transmission and reception of RF transceiver(s) 308, including specifying the transmit and receive radio frequencies for operation of RF transceiver(s) 308.

Communication processor 418 may include a baseband modem configured to perform physical layer (PHY, Layer 1) transmission and reception processing to, in the transmit path, prepare outgoing transmit data provided by communication processor 418 for transmission via RF transceiver(s) 308, and, in the receive path, prepare incoming received data provided by RF transceiver(s) 308 for processing by communication processor 418. The baseband modem may include a digital signal processor and/or a controller. The digital signal processor may be configured to perform one or more of error detection, forward error correction encoding/decoding, channel coding, and interleaving, channel modulation/demodulation, physical channel mapping, radio measurement and search, frequency and time synchronization, antenna diversity processing, power control, and weighting, rate matching/de-matching, retransmission processing, interference cancelation, and any other physical layer processing functions.

The digital signal processor may be structurally realized as hardware components (e.g., as one or more digitally-configured hardware circuits or FPGAs), software-defined components (e.g., one or more processors configured to execute program code defining arithmetic, control, and I/O instructions (e.g., software and/or firmware) stored in a non-transitory computer-readable storage medium), or as a combination of hardware and software components. The digital signal processor may include one or more processors configured to retrieve and execute program code that defines control and processing logic for physical layer processing operations.

The digital signal processor may execute processing functions with software via the execution of executable instructions. The digital signal processor may include one or more dedicated hardware circuits (e.g., ASICs, FPGAs, and other hardware) that are digitally configured to specific execute processing functions, where the one or more processors of digital signal processor may offload certain processing tasks to these dedicated hardware circuits, which are known as hardware accelerators. Exemplary hardware accelerators can include Fast Fourier Transform (FFT) circuits and encoder/decoder circuits. The processor and hardware accelerator components of the digital signal processor may be realized as a coupled integrated circuit.

Vehicle 300 may be configured to operate according to one or more radio communication technologies. The digital signal processor of the communication processor 418 may be responsible for lower-layer processing functions (e.g., Layer 1/PHY) of the radio communication technologies, while a controller of the communication processor 418 may be responsible for upper-layer protocol stack functions (e.g., Data Link Layer/Layer 2 and/or Network Layer/Layer 3). The controller may thus be responsible for controlling the radio communication components of vehicle 300 (antenna system 306, RF transceiver(s) 308, position device 314, etc.) in accordance with the communication protocols of each supported radio communication technology, and accordingly may represent the Access Stratum and Non-Access Stratum (NAS) (also encompassing Layer 2 and Layer 3) of each supported radio communication technology.

The controller may be structurally embodied as a protocol processor configured to execute protocol stack software (retrieved from a controller memory) and subsequently control the radio communication components of vehicle 300 to transmit and receive communication signals in accordance with the corresponding protocol stack control logic defined in the protocol stack software. The controller may include one or more processors configured to retrieve and execute program code that defines the upper-layer protocol stack logic for one or more radio communication technologies, which can include Data Link Layer/Layer 2 and Network Layer/Layer 3 functions.

The controller may be configured to perform both user-plane and control-plane functions to facilitate the transfer of application layer data to and from vehicle 300 according to the specific protocols of the supported radio communication technology. User-plane functions can include header compression and encapsulation, security, error checking and correction, channel multiplexing, scheduling and priority, while control-plane functions may include setup and maintenance of radio bearers. The program code retrieved and executed by the controller of communication processor 418 may include executable instructions that define the logic of such functions.

Vehicle 300 may be configured to transmit and receive data according to multiple radio communication technologies. Accordingly, one or more of antenna system 306, RF transceiver(s) 308, and communication processor 418 may include separate components or instances dedicated to different radio communication technologies and/or unified components that are shared between different radio communication technologies. For example, multiple controllers of communication processor 418 may be configured to execute multiple protocol stacks, each dedicated to a different radio communication technology and either at the same processor or different processors. Multiple digital signal processors of communication processor 418 may include separate processors and/or hardware accelerators that are dedicated to different respective radio communication technologies, and/or one or more processors and/or hardware accelerators that are shared between multiple radio communication technologies.

RF transceiver(s) 308 may include separate RF circuitry sections dedicated to different respective radio communication technologies, and/or RF circuitry sections shared between multiple radio communication technologies. Antenna system 306 may include separate antennas dedicated to different respective radio communication technologies, and/or antennas shared between multiple radio communication technologies. Accordingly, antenna system 306, RF transceiver(s) 308, and communication processor 418 can encompass separate and/or shared components dedicated to multiple radio communication technologies.

Communication processor 418 may be configured to implement one or more vehicle-to-everything (V2X) communication protocols, which may include vehicle-to-vehicle (V2V), vehicle-to-infrastructure (V21), vehicle-to-network (V2N), vehicle-to-pedestrian (V2P), vehicle-to-device (V2D), vehicle-to-grid (V2G), and other protocols. Communication processor 418 may be configured to transmit communications including communications (one-way or two-way) between the vehicle 300 and one or more other (target) vehicles in an environment of the vehicle 300 (e.g., to facilitate coordination of navigation of the vehicle 300 in view of or together with other (target) vehicles in the environment of the vehicle 300), or even a broadcast transmission to unspecified recipients in a vicinity of the transmitting vehicle 300.

Communication processor 418 may be configured to operate via a first RF transceiver of the one or more RF transceivers(s) 308 according to different desired radio communication protocols or standards. By way of example, communication processor 418 may be configured in accordance with a Short-Range mobile radio communication standard such as e.g. Bluetooth, Zigbee, and the like, and the first RF transceiver may correspond to the corresponding Short-Range mobile radio communication standard.

As another example, communication processor 418 may be configured to operate via a second RF transceiver of the one or more RF transceivers(s) 308 in accordance with a Medium or Wide Range mobile radio communication standard such as, e.g., a 3G (e.g. Universal Mobile Telecommunications System—UMTS), a 4G (e.g. Long-Term Evolution—LTE), or a 5G mobile radio communication standard in accordance with corresponding 3GPP (3rd Generation Partnership Project) standards. As a further example, communication processor 418 may be configured to operate via a third RF transceiver of the one or more RF transceivers(s) 308 in accordance with a Wireless Local Area Network communication protocol or standard such as e.g. in accordance with IEEE 802.11 (e.g. 802.11, 802.11a, 802.11b, 802.11g, 802.11n, 802.11p, 802.11-12, 802.11ac, 802.11ad, 802.11ah, 802.11ay, and the like). The one or more RF transceiver(s) 308 may be configured to transmit signals via antenna system 306 over an air interface. The RF transceivers 308 may each have a corresponding antenna element of antenna system 306, or may share an antenna element of the antenna system 306.

Memory 414 may embody a memory component of vehicle 300, such as a hard drive or another such permanent memory device. Although not explicitly depicted in FIGS. 3 and 4, the various other components of vehicle 300, e.g. one or more processors 302, shown in FIGS. 3 and 4 may additionally each include integrated permanent and non-permanent memory components, such as for storing software program code, buffering data, etc.

The antenna system 306 may include a single antenna or multiple antennas. Each of the one or more antennas of antenna system 306 may be placed at a plurality of locations on the vehicle 300 in order to ensure maximum RF coverage. The antennas may include a phased antenna array, a switch-beam antenna array with multiple antenna elements, etc. Antenna system 306 may be configured to operate according to analog and/or digital beamforming schemes in order to maximize signal gains and/or provide levels of information privacy. Antenna system 306 may include separate antennas dedicated to different respective radio communication technologies, and/or antennas shared between multiple radio communication technologies.

While shown as a single element in FIG. 3, antenna system 306 may include a plurality of antenna elements (e.g., multiple antenna arrays) positioned at different locations on vehicle 300. The placement of the plurality of antenna elements may be strategically chosen in order to ensure a desired degree of RF coverage. For example, additional antennas may be placed at the front, back, corner(s), and/or on the side(s) of the vehicle 300.

Data acquisition devices 312 may include any number of data acquisition devices and components depending on the requirements of a particular application. This may include: image acquisition devices, proximity detectors, acoustic sensors, etc., for providing data about the vehicle's environment. Image acquisition devices may include cameras (e.g., standard cameras, digital cameras, video cameras, single-lens reflex cameras, infrared cameras, stereo cameras, depth cameras, RGB cameras, etc.), charge coupling devices (CCDs) or any type of image sensor. Proximity detectors may include: radar sensors, light detection and ranging (LIDAR) sensors, mmWave radar sensors, etc. Acoustic sensors may include: microphones, sonar sensors, ultrasonic sensors, etc.

Accordingly, each of the data acquisition units may be configured to observe a particular type of data of the vehicle's 300 environment and forward the data to the data acquisition processor 414 in order to provide the vehicle with an accurate portrayal of the vehicle's environment. The data acquisition devices 312 may be configured to implement pre-processed sensor data, such as radar target lists or LIDAR target lists, in conjunction with acquired data.

Measurement devices 316 may include other devices for measuring vehicle-state parameters, such as a velocity sensor (e.g., a speedometer) for measuring a velocity of the vehicle 300, one or more accelerometers (either single axis or multi-axis) for measuring accelerations of the vehicle 300 along one or more axes, a gyroscope for measuring orientation and/or angular velocity, odometers, altimeters, thermometers, etc. It is appreciated that vehicle 300 may have different measurement devices 316 depending on the type of vehicle it is, e.g., car vs. drone vs. boat.

Position devices 314 may include components for determining a position of the vehicle 300. For example, this may include GPS or other GNSS circuitry configured to receive signals from a satellite system and determine a position of the vehicle 300. Position devices 314, accordingly, may provide vehicle 300 with satellite navigation features. The one or more position devices 314 may include components (e.g., hardware and/or software) for determining the position of vehicle 300 by other means, e.g. by using triangulation and/or proximity to other devices such as NIEs.

The one or more memories 304 may store data, e.g., in a database or in any different format, that may correspond to a map. For example, the map may indicate a location of known landmarks, roads, paths, network infrastructure elements, or other elements of the vehicle's 300 environment. The one or more processors 302 may process sensory information (such as images, radar signals, depth information from LIDAR, or stereo processing of two or more images) of the environment of the vehicle 300 together with position information, such as GPS coordinates, a vehicle's ego-motion, etc., to determine a current location of the vehicle 300 relative to the known landmarks, and refine the determination of the vehicle's location. Certain aspects of this technology may be included in a localization technology such as a mapping and routing model.

Furthermore, the control system 400 may include a driving model, e.g., implemented in an advanced driving assistance system (ADAS) and/or a driving assistance and automated driving system. By way of example, the control system 400 may include (e.g., as part of the driving model) a computer implementation of a formal model such as a safety driving model. A safety driving model may be or include a mathematical model formalizing an interpretation of applicable laws, standards, policies, etc. that are applicable to self-driving vehicles. A safety driving model may be designed to achieve, e.g., three goals: first, the interpretation of the law should be sound in the sense that it complies with how humans interpret the law; second, the interpretation should lead to a useful driving policy, meaning it will lead to an agile driving policy rather than an overly-defensive driving which inevitably would confuse other human drivers and will block traffic and in turn limit the scalability of system deployment; and third, the interpretation should be efficiently verifiable in the sense that it can be rigorously proven that the self-driving (autonomous) vehicle correctly implements the interpretation of the law. A safety driving model, illustratively, may be or include a mathematical model for safety assurance that enables identification and performance of proper responses to dangerous situations such that self-perpetrated accidents can be avoided.

As described above, the vehicle 300 may include the control system 400 as also described with reference to FIG. 4. The vehicle 300 may include the one or more processors 302 integrated with or separate from an engine control unit (ECU) which may be included in the mobility system 320 of the vehicle 300. The control system 400 may, in general, generate data to control or assist to control the ECU and/or other components of the vehicle 300 to directly or indirectly control the movement of the vehicle 300 via mobility system 320. The one or more processors 302 of the vehicle 300 may be configured to perform as described herein.

The components illustrated in FIGS. 3 and 4 may be operatively connected to one another via any appropriate interfaces. Furthermore, it is appreciated that not all the connections between the components are explicitly shown, and other interfaces between components may be covered within the scope of this disclosure.

In a road environment, it may be desirable for a vehicle 300 to communicate with other entities in order to enhance the road safety and provide more efficient traffic situation within the road environment. Developing communication protocols, such as V2V (vehicle-to-vehicle) in which a vehicle communicates with another vehicle, V21 (vehicle-to-infrastructure), in which a vehicle communicates with an infrastructure item, such as a traffic infrastructure system or a roadside unit, V2N (vehicle-to-network) in which a vehicle communicates with a network function, V2P (vehicle-to-pedestrian) in which a vehicle communicates with a pedestrian are adopted for this purpose, which are combined together as V2X (vehicle-to-everything). Some of these protocols rely on vehicles broadcasting messages to communicate with other entities in a predefined proximity (e.g. V2V), while others rely on a communication through an established network (e.g. V2N).

V2X messages shared using V2X protocols may include various data items that may be in a form of data elements or data frames indicating information including any type of traffic related information under various categories. Such categories may include vehicle information indicating a feature of a vehicle such as driving direction, information relating acceleration/deacceleration of a vehicle etc., georeference information indicating a geographical description e.g. altitude, longitude, latitude related information, road topology information indicating information related to road topology such as road segment type, traffic information indicating traffic related information such as a presence of accident, presence of dangerous situation, infrastructure information indicating information about the infrastructure, such as a presence of a toll or a road side unit, personal information indicating a personal information, communication information that are related to the application layer of the communication protocol, such as an identifier of a station exchanging information, and other information such as type of a station which exchanges information.

Accordingly, the vehicle 300 may generate information based on the vehicle 300, and the vehicle 300 may encode V2X messages for transmission. V2X messages may include information indicating an observation that the vehicle 300 performs using data acquisition devices 312. For example, V2X messages may include information indicating a list of objects that the vehicle 300 has detected in its vicinity using data acquisition devices 312. The vehicle 300 may transmit the list of objects for other vehicles to make other vehicles aware of the objects that the vehicle 300 has detected using data acquisition devices 312.

The vehicle 300 may further assign a type for the object which the vehicle 300 has detected using data acquisition devices 312. The vehicle 300 may use techniques other than detection to assign the type. For example, the vehicle 300 may use measurement devices 316 to estimate a velocity for the object that vehicle 300 has detected, and the vehicle 300 may determine a type based on the estimated velocity. The vehicle 300 may encode information indicating a type for the object that the vehicle 300 has detected and transmit the encoded information via a V2X message.

Further, the vehicle 300 may determine the position of the vehicle 300 by using position devices 314, and encode information indicating the position of the vehicle 300 to be transmitted via a V2X message. Furthermore, the vehicle 300 may estimate a position for the object which the vehicle 300 has detected using data acquisition devices 312. The vehicle 300 may estimate the position of the object based on the position information that the vehicle 300 receives from position devices 314. The vehicle 300 may encode information indicating a position for the object that the vehicle 300 has detected and transmit the encoded information via a V2X message.

Furthermore, the vehicle 300 may encode other information that is related to the vehicle 300 to be transmitted via a V2X message. The other information may include an identifier for the vehicle 300 for the purpose of being recognized by other entities, such as other vehicles, infrastructure, or pedestrians. The other information may include a type information indicating the type of the vehicle 300.

Further, the vehicle 300 may provide its past locations that have been stored in the memory for a period of time. The vehicle 300 may perform a prediction for a trajectory based on the past locations. The application processor 416 may perform the prediction of trajectory based on the past locations. The prediction may further be based on observations performed by data acquisition devices 312, measurement devices 316, or position devices 314. Accordingly, the vehicle 300 may encode information indicating a trajectory of the vehicle 300. The indicated trajectory may be related to past locations of the vehicle 300. The indicated trajectory may be related to predicted locations of the vehicle at least for a future time instance. The predicted location may include at least one location for the vehicle 300 to be present at a future time instance. The vehicle 300 may transmit the encoded information via a V2X message. All information discussed herein may be encoded in one data item or in a plurality of data items as an environment data.

Figure 5:
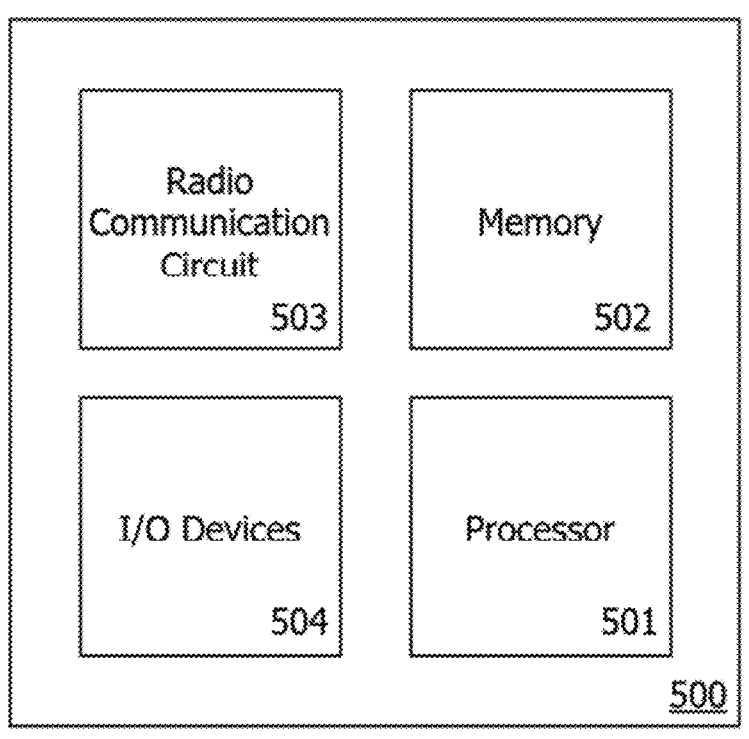
FIG. 5 shows schematically an example of an apparatus for determining detection of a road user.

FIG. 5 shows schematically an example of an apparatus 500 for determining detection of a road user. The apparatus 500 may include an apparatus referred in accordance with FIG. 2. The apparatus 500 includes a processor 501, and a memory. The apparatus 500 may further include a radio communication circuit 503, and input/output devices 504 for the road user such as display(s), keypad(s), touchscreen(s), speaker(s), external button(s), camera(s), microphone(s), etc. The apparatus 500 may be in a form of a communication device, and the communication device may include a display as one of the input/output devices 504.

The apparatus 500 may be configured to receive a plurality of data items provided in a road environment. The apparatus 500 may include an interface to receive the plurality of data items provided in the road environment. The apparatus 500 may be configured to receive V2X messages via the radio communication circuit 503. The radio communication circuit 503 may be configured to listen a predefined broadcast channel in order to detect and receive broadcasted V2X messages that one or more further road users transmitted in the vicinity. The radio communication circuit 503 may be configured to receive V2X messages which one or more further road users have transmitted into a communication network (e.g. as a V2N message). The radio communication circuit 503 may store received V2X messages in the memory 502.

As discussed in this disclosure, V2X messages may include various data items that may be in a form of data elements or data frames indicating information under various categories as an environment data including vehicle information, and/or georeference information, and/or road topology information, and/or traffic information, and/or infrastructure information, and/or personal information, and/or communication information, and/or other information. Furthermore, data items may include information indicating an observation that one or more further road users performed, and/or a list of objects that the one or more further road users have detected in vicinity, and/or a type of the detected objects, and/or position of the one or more road users, and/or position of the detected object, and/or identifier of the one or more road users, and/or type of the one or more road users, and/or past locations of the one or more road users, and/or a past trajectory of the one or more road users, and/or a predicted trajectory of the one or more road users. Accordingly, the V2X messages in the memory 502 may include at least one of these data items received from a plurality of further road users.

The processor 501 of the apparatus 500 may be configured to determine whether the road user has been detected by one or more further road users based on the plurality of data items stored in the memory 502. The processor 501 may be configured to determine a determination result indicating whether the road user has been detected by one or more further road users based on the plurality of items stored in the memory 502. The processor 501 may be configured to identify at least one feature related to the road user based on the plurality of data items stored in the memory.

Figure 6:
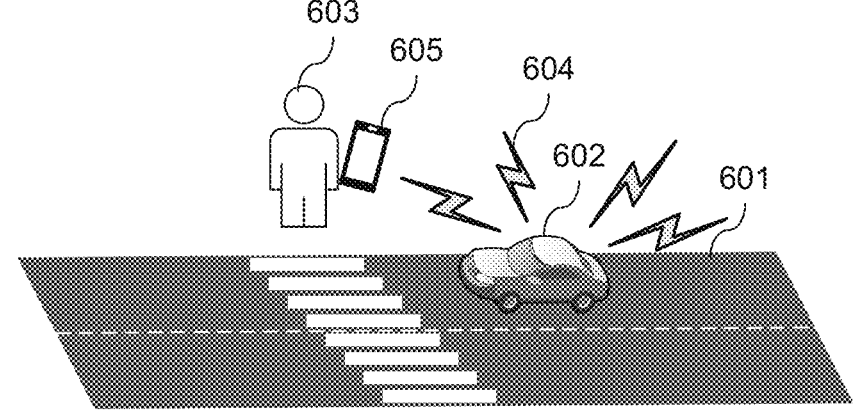
FIG. 6 shows an illustration of a road environment.

FIG. 6 shows an illustration of a road environment. The road environment 601 includes two road users 602, 603, one road user as a vehicle 602, and one road user as a pedestrian 603. The vehicle 602 is configured to broadcast V2X messages 604 including a plurality of data items. The pedestrian 603 carries a user device 605. The user device 605 may include an apparatus for determining detection of a road user. The user device 605 may receive the broadcast V2X messages and store the V2X messages including a plurality of data items in a memory. The processor of the user device 605 checks the plurality of data items in the memory to determine whether the vehicle 602 has detected the pedestrian 603.

The processor may determine whether the vehicle 602 has detected the pedestrian 603 by determining whether the vehicle 602 has detected an object based on the plurality of data items. The processor may check a list of objects provided in the plurality of data items. In case the processor identifies that the vehicle 602 has detected an object, the user device 605 may determine that the pedestrian 603 has been detected by the vehicle 602. Accordingly, the user device 605 may provide an indication to the pedestrian on a display that the vehicle 602 has detected the pedestrian 603. The pedestrian 603 may then decide to cross the road also based on other further elements, such as velocity of the vehicle 602, distance between the pedestrian 603 and the vehicle 602 etc.

Figure 7:
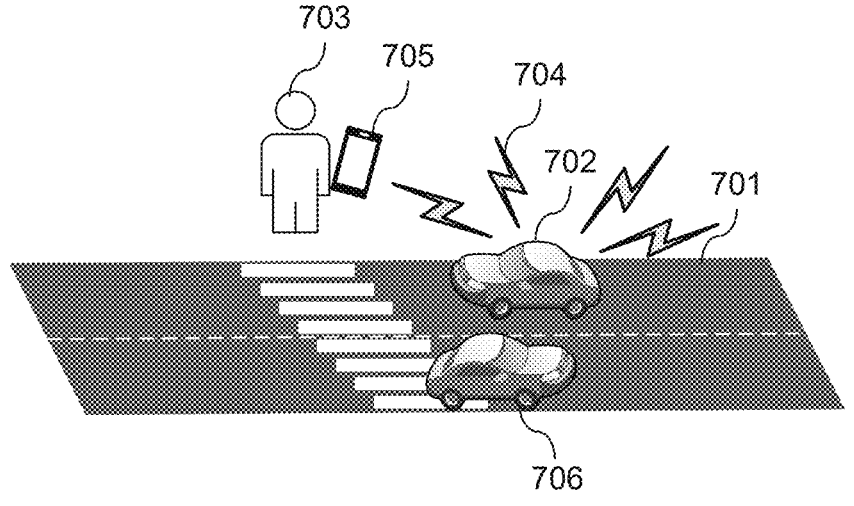
FIG. 7 shows an illustration of a road environment.

FIG. 7 shows an illustration of a road environment. The road environment 701 includes three road users 702, 703, 706, a first vehicle 702, a second vehicle 706, and a pedestrian 703. The first vehicle 702 may be configured to broadcast V2X messages 704 including a plurality of data items. The pedestrian 703 carries a user device 705. The user device 705 may include an apparatus for determining detection of a road user. The user device 705 may receive the broadcast V2X messages that the first vehicle 702 broadcasts and store the V2X messages including a plurality of data items in a memory. The processor of the user device 705 checks the plurality of data items in the memory of the user device 705 to determine whether the vehicle 702 has detected the pedestrian 703.

The processor may determine whether the vehicle 702 has detected the pedestrian 703 by determining whether the vehicle 702 has detected an object based on the plurality of data items. The processor may check a list of objects provided by the plurality of data items. The processor may identify that the vehicle 702 has detected two objects from the plurality of data items in the memory. The processor may also check type information provided in the plurality of data items for the detected objects. The processor may determine that the vehicle has detected the pedestrian 703 by identifying that the vehicle 702 has provided an information indicating "pedestrian" as a type of one of the objects. Accordingly, the user device 705 may provide an indication to the pedestrian 703 on a display that the vehicle 702 has detected the pedestrian 703. The pedestrian 703 may then decide to cross the road also based on other further elements, such as velocity of the vehicle 702, distance between the pedestrian and the vehicle 702, location of the second vehicle 706 etc.

Figure 8:
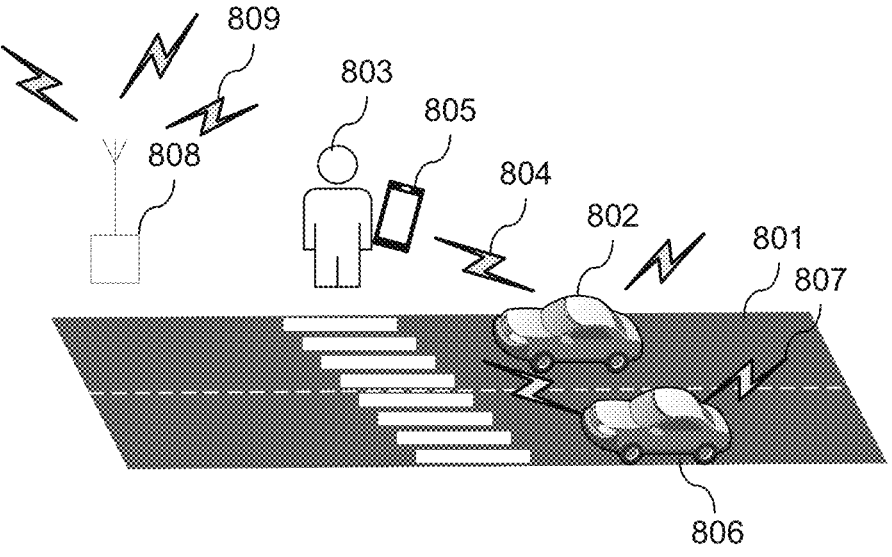
FIG. 8 shows an illustration of a road environment.

FIG. 8 shows an illustration of a road environment. The road environment 801 includes three road users 802, 803, 806, a first vehicle 802, a second vehicle 806, and a pedestrian 803. The first vehicle 802 may be configured to broadcast a first V2X message 804. The second vehicle 806 may be configured to broadcast a second V2X message 807. The pedestrian 803 carries a user device 805. The user device 805 may include an apparatus for determining detection of a road user. The user device 805 may receive the first V2X message that the first vehicle 802 broadcasts and store the first V2X message in a memory. Further, the user device 805 may receive the second V2X message that the second vehicle 806 broadcasts and store the second V2X message in the memory.

There may be also further road users who may transmit further V2X messages. The road environment 801 may include a road side unit 808, and the road side unit 808 may be configured to transmit further V2X messages 809 periodically based on observations performed by the road side unit. The user device 805 may be configured to receive all V2X messages in the vicinity and store them to the memory. Other further road users may have transmitted other V2X messages. The user device 805 may be further configured to receive V2X messages from a traffic infrastructure system.

The processor may be configured to identify the environment data in the received V2X messages. As discussed in this disclosure, the environment data may include information indicating various observations related to the road environment. The environment data may include any traffic related information. Accordingly, the processor may be configured to identify a first environment data related to observations made by the first vehicle 802 and provided within the first V2X message, and the processor may identify a second environment data related to observations made by the second vehicle 806 within the second V2X message. The processor may further be configured to identify further environment data, e.g. from the one or more V2X messages which the road side unit 808 may transmit.

Furthermore, the processor may be configured to identify the sender of the V2X messages. The processor may be configured to identify the sender of the V2X messages based on the plurality of data items. A received V2X message may include a header including an information indicating the sender. The header may include an identifier of the vehicle or another entity that transmitted the V2X message. The processor may be configured to identify the sender of each of the received V2X messages from the header portion of the respective V2X message.

Furthermore, V2X messages may include location information indicating a location of the entity that transmitted the V2X messages. The processor may be configured to identify location information of an entity that transmitted a V2X message. The processor may be configured to identify the location information for each of the received V2X messages. Furthermore, the processor may be configured to identify location information of a detected object from the V2X messages.

Furthermore, V2X messages may include time information indicating a time of the generation of the V2X messages. Alternatively, the time information may indicate a time of the transmission of the V2X message. The time information may indicate a time of the observation performed by the road user or the entity which transmitted the V2X message. The processor may be configured to identify a time information in a V2X message. Accordingly, the processor may identify time information for each of the received V2X messages.

Furthermore, the processor may be configured to determine a detection result based on a detection information in a V2X message. The environment message may include the detection information. The environment message may include an indication of a presence of a detected object provided by a further road user. As provided herein this disclosure, for example, the environment data may include a list of objects which are detected by a road user that provides the V2X message. The processor may be configured to identify the pedestrian 803 from the list of objects provided in the V2X message, and determine that the road user that sent the V2X message has identified the pedestrian.

In the road environment 801, the user device 805 may receive the first V2X message including a first detection information indicating that the first vehicle 802 have detected two objects. The first environment data may include the first detection information. Based on the first detection information provided in the first V2X message, the processor of the user device 805 may determine a first detection result that the first vehicle 802 has detected the pedestrian 803. The user device 805 may further use any portion of the environment data to perform the determination. The user device 805 may further receive the second V2X message from the second vehicle 806. The second V2X message may include a second detection information indicating that the second vehicle 806 has detected one object. The second environment data may include the second detection information. Based on the second detection information provided in the second V2X message, the processor of the user device 805 may determine a second detection result that the second vehicle 806 has not detected the pedestrian 803. The processor of the user device 805 may receive further detection information, e.g. from the road side unit 808, and the processor may determine further detection results based on the further detection information. For example, the environment data which the road side unit 808 provides may include information indicating further road users, or environment data provided from further road users which the further road users provide to the road side unit 808.

Figures 9, 10:
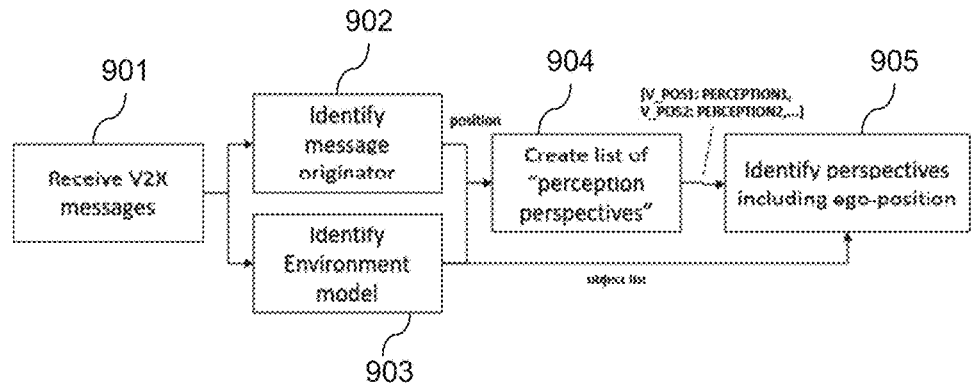
FIG. 9 shows schematically an example of the determination based on the plurality of data items.
FIG. 10 shows an example of a rendered information.

FIG. 9 shows schematically an example of the determination based on the plurality of data items. In this example, a user device may receive 901 and decode the plurality of data items within a plurality of V2X messages. As provided above, the user device may identify 902 each of the further road users that transmitted a V2X message by identifying the originator of the respective V2X messages. Accordingly, the user device may obtain the location of the further road users that transmitted the respective V2X message. Furthermore, the user device may identify 903 the environment data provided within the V2X message. The environment data may include a list of objects indicating the objects detected by the further road user that transmitted the respective V2X message.

The user device may then create 904 a list of perception perspectives based on the location and the environment data, which may include list of objects, of each of the further road users that transmitted a V2X message. The list of perspectives may include traffic related information indicating the location of each of the further road users, and their perception perspectives including the objects that each of the further road users have detected. Then, the processor may determine the detection result whether each of the further road users that transmitted a V2X message have detected the user of the user device by identifying perspectives from the list of perspectives that include ego-position of the user of the user device.

Referring back to FIG. 8, the user device 805 may further combine the first environment data and the second environment data, and also further environment data that may be received via further V2X messages to generate a combined environment data to obtain a collective view of the road environment. The first environment data may provide indication relating to the environment which the first vehicle 802 observed. Similarly, the second environment data may provide indication relating to the environment which the second vehicle 806 observed. In other words, the first environment data may reflect the perspective of the first vehicle 802, and the second environment data may reflect the perspective of the second vehicle 806. Further environment data received from further V2X messages may reflect the perspective of further road users. Accordingly, by combining the first environment data, and the second environment data, and if available further environment data, an overview of the road environment 801 may be obtained by the user device 805.

The processor may combine the first environment data and the second environment data, and if available further environment data via fusing methods. Furthermore, it may be desirable to filter out or disregard objects that are found in more than one environment data due to a detection of the same object by more than one road user to avoid any repetition.

Furthermore, the processor may generate an awareness information indicating whether the respective road user has or has not detected the pedestrian 803 for each of the other road users that the user device 805 has received at least one related data item. For this example, the user device 805 receives further V2X messages from the road side unit 808, and the user device 805 may generate an awareness information with respect to the road side unit 808, or based on the V2X messages received from the road side unit 808.

Accordingly, the user device 805 may generate an overview of the road environment 801 based on the plurality of data items that the user device 805 has received with V2X messages.

An example of the information rendered and stored in the memory of a user device is provided as a table in FIG. 10. The information stored in the memory based on the plurality of data items received via V2X messages may include an identifier 1001 indicating the identity of the further road user, or further the identity of the provider of the related data item e.g. a road side unit. The information stored in the memory may further include environment data 1002 which the further road user has detected or observed. Furthermore, the stored information may include location of the further road user 1003, type of the further road user 1004, and detection result 1005 for the further road user based on the determination of the processor. The stored information may further include time information 1006 indicating a time instance that the further road user has transmitted the related data item. The stored information may further include any type of information that is discussed herein, or any type of information that may be obtained through V2X messages. In this example, the information rendered and stored in the memory further includes information related to two further vehicles. The road side unit may provide this information.

Referring back to FIG. 8, the user device 805 may further include a positioning device. The positioning device may include components for determining a position of the user device 805. The positioning device may include GPS and/or other GNSS circuitry configured to receive signals from a satellite system and determine a position of the user device 805. Positioning device may provide the user device 805 with satellite navigation features. The positioning device may include components (e.g., hardware and/or software) for determining the position of user device 805 by other means, e.g. by using triangulation and/or proximity to other devices such as vehicles 802, 806, or the road side unit 808. Accordingly, the user device 805 may determine a current location of the user device 805 by using the positioning device.

The user device 805 may further use the current location of the user device 805, or alternatively a location of the user device 805 at a past time instance, as an ego-location information. The user device 805 may further use the ego-location to determine the detection result. The processor of the user device 805 may be configured to determine the detection result based on a location information provided by one of further road users (e.g. the first vehicle 802, the second vehicle 806). The processor of the user device 805 may be configured to determine the detection result whether the further road user has detected the pedestrian 803 by an estimation based on the location of the further road user, and it may be further based on the list of objects provided in the environment data by the further road user.

Furthermore, the environment data may include location of the objects which a further road user (e.g. the first vehicle 802, the second vehicle 806) has detected. The processor of the user device 805 may be configured to determine the detection result whether the further road user has detected the pedestrian 803 by identifying the ego-location in the environment data provided by the further road user. As both the ego-location and the location of the further road user may be changing continuously, the processor of the user device 805 may be configured to identify the ego-location in the environment data with a predefined measurement threshold, such that if the processor identifies a location information in the environment data with respect to locations of the objects detected by the further road user, and if the location information differs from the ego-location information but the difference is still within the predefined measurement, the processor may determine the detection result that the further road user has detected the pedestrian 803. The user device 805 may store locations detected by the positioning device into the memory.

The user device 805 may further include one or more sensors to detect a feature of the pedestrian 803. The user device 805 may include one or more sensors configured to detect the pedestrian, and the processor may be configured to estimate an orientation for the head of the pedestrian 803 based on the detection of the one or more sensors. The processor may be configured to estimate a direction of the gaze of the pedestrian 803 based on the detection of the one or more sensors. The processor may be configured to estimate a posture for the pedestrian 803 based on the detection of the one or more sensors. The processor may store the estimations in the memory as an ego-information.

The processor of the user device 805 may be configured to determine a past trajectory for the user device 805 based on a plurality of locations stored in the memory. Furthermore, the user device 805 may perform a prediction for the pedestrian 803 a road trajectory based on the past trajectory of the user device 805. The predicted road trajectory may include at least one location information at a future time instance. The processor of the user device 805 may further predict the road trajectory based on the plurality of data items which the user device 805 receives. The processor may be further configured to predict the road trajectory based on the current location of the user device 805. The processor may be further configured to predict the road trajectory based on the ego-information in the memory.

Furthermore, the processor of the user device 805 may determine to send an information indicating a predicted trajectory of the user device 805. The processor may encode a message indicating a predicted trajectory for the user device 805 which may include information indicating at least one location that the processor predicts to be located at a future time instance, or for a period of time in future. The processor may encode the message as a V2X message, and the radio communication circuit of the user device 805 may broadcast the V2X message. The processor may encode the message to be transmitted to further road users that have not detected the pedestrian 803 to make the further road users that have not detected the pedestrian 803 aware of the pedestrian 803. The processor may encode the message to be transmitted to further road users that have detected the pedestrian 803, to provide indication of the predicted trajectory of the user device 805. Furthermore, the processor may encode the message to be transmitted to only one of the further road users. The encoded message may further include an acknowledgment request indicating that the user device 805 requests an acknowledgment of the encoded message.

Figure 11:
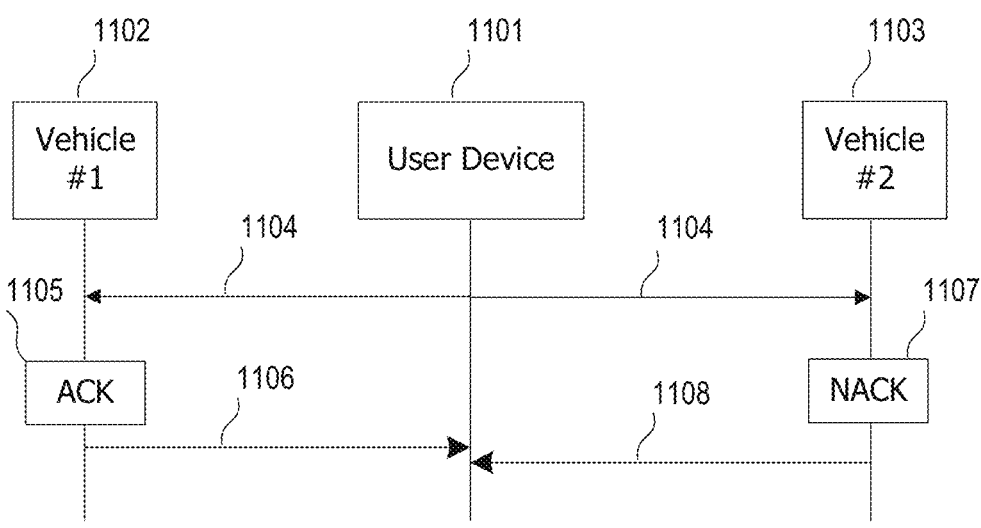
FIG. 11 shows schematically an example of messages exchanged between road users in a road environment.

FIG. 11 shows schematically an example of messages exchanged between road users in a road environment. The messages are sent between a user device 1101, a first vehicle 1102, and a second vehicle 1103. The user device 1101 may broadcast a first message 1104 including information indicating a predicted trajectory for the user. For example, the first message 1104 may include information indicating that the user is predicted to stop and wait for the vehicles to pass. The first message 1104 may further include an acknowledgment request with respect to the information indicating the predicted trajectory for the user.

The first vehicle 1102 may receive and decode the first message 1104, and may acknowledge 1105 that the provided information indicating that the user is predicted to stop is acknowledged by the first vehicle 1102. Accordingly, the first vehicle 1102 may transmit an acknowledgement message 1106 to the user device 1101. The second vehicle 1103 may receive and decode the first message 1104, and the second vehicle 1103 may not acknowledge 1107 the first message 1104. Accordingly, the second vehicle 1103 may send a NACK message 1108 to the user device 1101. The user device may store information indicating that the first vehicle 1102 has provided an ACK, and the second vehicle 1103 has provided a NACK in a memory. There may be other further vehicles that the user device 1101 has detected in the environment, but the user device 1101 may not receive any response from the other further vehicles. The user device 1101 may further store information indicating that other further vehicles have not provided any response. The user device 1101 may further classify other further vehicles that have not provided any response as a vehicle that provided NACK.

Referring back to FIG. 8, the user device 805 may further be configured to obtain a map of the road environment 801 from the road side unit 808. The user device 805 may receive the map of the road environment 801 via a V2X message. The user device 805 may receive the map of the road environment 801 via the V2X message from the road side unit 808. Alternatively, the user device 805 may receive the map of the road environment 801 from a traffic infrastructure system. The user device 805 may receive the map of the road environment 801 via a pedestrian-to-network communication. The map of the road environment 801 may include an overview representation of the road environment 801. The overview representation may include any type of representation of the road environment 801 such as a graphical indication of roads and/or other prominent objects in the road environment 801, or a satellite image of the road environment, street names, street numbers etc.

Furthermore, the user device 805 may include an input/output device to provide an indication to the pedestrian based on the determination of the detection result. The user device 805 may include a loudspeaker, and the user device 805 may be configured to provide an audio indication from the loudspeaker. The user device 805 may include a haptic device, and the user device 805 may be configured to provide a haptic indication from the haptic device. Furthermore, the user device 805 may include a display to display an output information for the pedestrian 803. The display of the user device 805 may be configured to provide an indication to the pedestrian 803 based on the determination of the detection result. The indication which the display of the user device 805 may provide the indication as a simple message, or another graphical indication in a form of special figure or character. Based on the indication provided from the user device 805, the pedestrian 803 may be aware of whether the pedestrian 803 has been detected by further road users, e.g. the vehicle 802, and the vehicle 806.

In order to provide the indication, the user device 805 may include an output that is configured to provide an indication of the detection result, and the processor may be configured to generate an output information to be provided from the output. The output information may be provided to a loudspeaker for an audio indication. The output information may be provided to a haptic device for a haptic indication. The output information may be provided to a display for a visual indication.

The processor may be configured to generate the output information based on the combined environment data. The processor may be configured to generate the output information to indicate to the pedestrian 803 awareness of at least one of the further road users. For example, the output information may be configured to provide an indication on the display that the first vehicle 802 has detected the pedestrian 803, and/or the output information may be configured to provide an indication on the display that the second vehicle 806 has not detected the pedestrian 803.

Furthermore, the processor may be configured to generate the output information including the map of the road environment 801. The processor may further be configured to provide a marker for at least one of the further road users based on the determined detection result. The processor may be configured to generate the output information by generating a first marker indicating the first vehicle 802, and a second marker indicating the second vehicle 806. The processor may be configured to provide the first marker and the second marker on the map of the road environment 801.

The processor may be configured to generate the first marker and the second marker on the map of the road environment based on the location of the first vehicle 802 and the second vehicle 806. The processor may be configured to generate other markers for further road users or further entities such as the road side unit 808 based on their location provided in the plurality of data items received via V2X messages. The user device 805 may provide the output information including the map of the road environment 801 and the markers to the display to provide the overview of the road environment 801 to the pedestrian 803.

The processor may further be configured to generate the first marker and the second marker based on the determined detection result for the respective road user. In order to convey the awareness information to the pedestrian in an easier manner, the processor may be configured to generate the first marker with a first color by generating a first color information for the first vehicle 802, since the processor has determined that the first vehicle 802 has detected the pedestrian 803. The processor may further be configured to generate the second marker with a second color by generating a second color information for the second vehicle 806 since the processor has determined that the second vehicle 806 has not detected the pedestrian 803. For example, the first color information may indicate that the first marker will be green, and the second color information may indicate that the second marker will be red.

Furthermore, the processor may be configured to generate the first marker and the second marker based on the time information stored in the memory related to the respective road user received from the respective data item. It may be desirable to provide indication regarding the temporal aspect, e.g. the time of the V2X message that was used to determine the detection result for the respective road user, so that the pedestrian 803 may understand whether the determination of the detection result has been performed recently, or it has been a while.

Accordingly, the processor may be configured to generate the first marker and the second marker based on the time information stored in the memory related to the respective road user. For example, the first marker may include a transparency component that is generated based on the time information stored in the memory for the first vehicle 802. Similarly, the second marker may include a transparency component that is generated based on the time information stored in the memory for the second vehicle 806. Furthermore, the processor may be configured to stop providing a marker, or the processor may not generate a marker for a road user having a time information stored in the memory earlier than a predetermined threshold.

Furthermore, the processor may be configured to generate a marker for a further road user based on the other information provided by the plurality of data items for the road user. The processor may be configured to generate the marker for the further road user based on the trajectory information which the further road user provided. In this case, the processor may be configured to generate the marker for the further road user, and the marker may include an indication based on the trajectory of the further road user, e.g. an arrow indicating the trajectory of the further road user, a displayed movement corridor for the further road user.

Furthermore, the processor may be configured to generate a marker for a further road user based on a communication event with the further road user. As provided above, especially related to FIG. 11, the user device 805 may transmit and receive messages from a further road user. Accordingly, the processor may be configured to generate the marker for the further road user based on whether the user device 805 has transmitted a message to the further road user. Furthermore, the processor may be configured to generate the marker for the further road user based on the status of the acknowledgment provided by the further road user.

Figure 12:
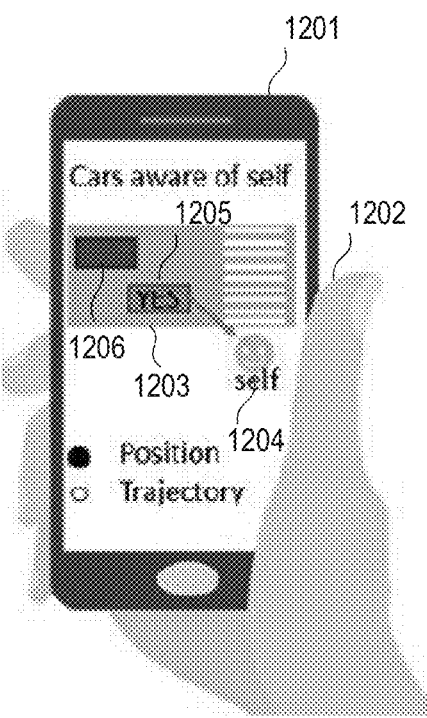
FIG. 12 shows an example of an output information provided on a display of a user device.

FIG. 12 shows an example of an output information provided on a display of a user device. The user device 1201 is represented as a mobile device. A pedestrian 1202 may carry the user device 1201. Based on the determination of the detection result, the user device 1201 has provided the output information to a display. The displayed information shows the map of the road environment 1203, the ego-position 1204 of the pedestrian 1202, a first marker 1205, and a second marker 1206. The processor has generated the first marker based on the determination of the detection result for the first vehicle based on the plurality of data items received from the first vehicle with a first color information, while the first marker further includes a "YES" sign. The processor has generated the second marker 1206 for a second vehicle based on the determination of the detection result for the second vehicle based on the plurality of data items received from the second vehicle with a second color information. Accordingly, the pedestrian 1202 may be aware that the first vehicle has detected the pedestrian 1202, and the second vehicle has not detected the pedestrian 1202.

Figure 13:
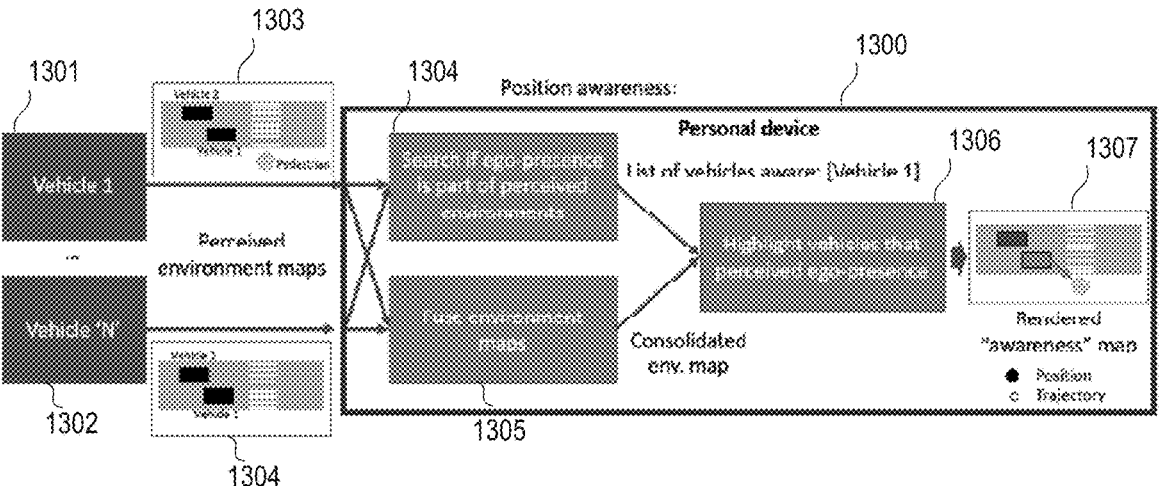
FIG. 13 shows schematically an example of an overview of rendering an awareness map in accordance with this disclosure.

FIG. 13 shows schematically an example of an overview of rendering an awareness map in accordance with this disclosure. An apparatus 1300 for determining detection of a road user, may receive a plurality of data items from a plurality of road users, including a first data item 1303 from a first vehicle 1301 and a second data item 1304 a second vehicle 1302.

The first data item 1303 includes information indicating the observed environment of the first vehicle 1301, and the second data item 1304 includes information indicating observed environment of the second vehicle 1302. The information indicating observed environment may include perceived environment maps. The apparatus 1300 may search 1304 if ego-presence is part of the perceived environment for the first vehicle 1301 to determine whether the first vehicle 1301 has detected the road user and if ego-presence is part of the perceived environment for the second vehicle 1302 to determine whether the second vehicle 1302 has detected the road user. In this example, the apparatus 1300 determines that the first vehicle has detected the road user, and the second vehicle has not detected the road user.

Furthermore, the apparatus may fuse 1305 perceived environment maps to generate a combined environment data, and based on the determination of detection results, the apparatus 1300 may highlight 1306 vehicles that perceived ego-presence of the road user. Furthermore, the apparatus 1300 may render 1307 an awareness map, and output the awareness map to an output device, such as a display of the apparatus 1300.

Figure 14:
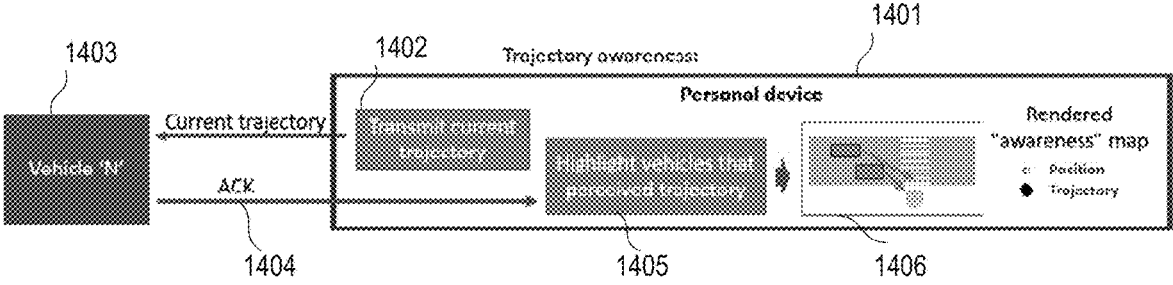
FIG. 14 shows schematically an example of providing output information based on awareness of trajectory.

FIG. 14 shows schematically an example of providing output information based on awareness of trajectory. The apparatus 1401 for determining detection of a road user may predict a road trajectory for the road user and transmit 1403 the road trajectory to a further road user 1403. The apparatus may transmit 1403 the road trajectory to a further road user 1403 which the processor has determined that has not detected the road user to make the further road user 1403 aware of the road user. Based on the received road trajectory the further road user 1403 may provide an acknowledgment message to the apparatus 1401. Accordingly, the apparatus 1401 may generate a marker for the further road user 1403 based on the receipt of the acknowledgment. In this example, since the further road user 1403 has acknowledged the road trajectory provided by the apparatus 1401, the apparatus may render the awareness map with the further road user 1403 in green color, indicating that the further road user 1403 is aware of the road user.

FIG. 15 shows schematically an example of a method. The method may include: storing 1501 a plurality of data items received from a plurality of further road users, wherein each of the plurality of data items comprises a detection information indicating whether an object has or has not been detected by one of the plurality of further road users, determining a detection result indicating whether a road user has been detected by the one of the plurality of further road users based on the detection information, providing an indication of the detection result.

In a road environment, it may be desirable to receive sensor data from various sources to increase awareness of the road users within the road environment. As provided in this disclosure, a road environment may include a road side unit that includes one or more sensors, or a road side unit which is coupled to one or more sensors.

Figure 16:
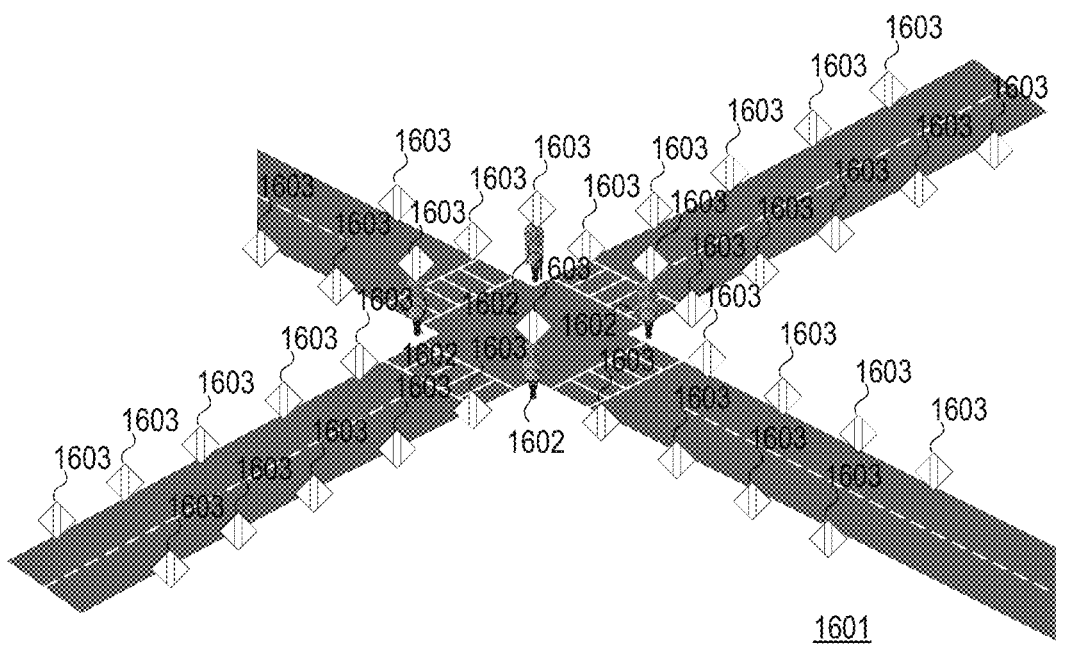
FIG. 16 shows schematically an illustration of a road environment.

FIG. 16 shows schematically an illustration of a road environment. The road environment 1601 may be an intersection as provided which may any type of road users, such as vehicles and/or pedestrians. Similar to FIG. 1, the road environment may include one or more road side units 1602. The one or more road side units 1602 may include one or more sensors 1603 to obtain data (e.g. sensor data). The one or more roadside units 1602 may further be coupled to one or more sensors 1603 to obtain data (e.g., sensor data). Sensor data may represent traffic related information. Sensor data may be an input for a model-based estimation (e.g., an estimation of a current state or an estimation of a state in the future, referred to as prediction) of one or more traffic related characteristics. Traffic related information may include environmental information, e.g., information related to weather conditions, temperature, humidity, fog, rainfall, snowfall, sunshine, daytime, nighttime, illumination, only as examples. Traffic related information may include vehicle information, e.g., information related to traffic density, an accident, a velocity of one or more vehicles, a type of one or more vehicles, a function of one or more vehicles (e.g., the vehicle, e.g., an ambulance, may be privileged), only as examples. Traffic related information may include road condition information, e.g., information related to the presence of an icy road, a wet road, a dry road, a number of potholes, a surface condition of a road, only as examples). Traffic related information may include information related to road works, redirections, a status of one or more traffic lights, pedestrian crossings, only as examples.

The one or more sensors 1603 associated with one or more roadside units 1602 or one or more vehicles (not shown) may include, for example, one or more cameras. A vehicle or a roadside unit 1602 may obtain traffic related information from image data, e.g., by applying one or more image analyzing algorithms on the image data. One or more cameras may be configured to provide the image data. However, the one or more sensors 1603 associated with one or more roadside units 1602 or one or more vehicles may include other types of sensors, e.g., one or more RADAR (radio detection and ranging) sensors, one or more temperature sensors, one or more humidity sensors, one or more illumination sensors, one or more acoustic sensors, one or more LIDAR (light detection and ranging) sensors, only as examples.

The one or more roadside units 1602, one or more apparatus of a roadside unit 1602, one or more processors of roadside units 1602, or one or more processors of one or more apparatus of a roadside unit 1602, or one or more processors of one or more vehicles may be configured to cause to send (e.g., to output to a transmitter or to transmit) the sensor data or information including an indication to the sensor data or a portion of the sensor data, e.g. a data item, to one or more vehicles in the vicinity of the roadside unit 1602 or of the vehicle respectively. The vicinity of the roadside unit 1602 or the vehicle may include a coverage of one or more transmitters associated with the respective roadside unit 1602 or the respective vehicle, e.g., based on the type of transmission, e.g., a short-range transmission (e.g., in a range up to 100 m or more) or a long-range transmission (e.g., up to 1 km or more than 1 km) may be used depending on the type of information and the desired estimation.

The one or more sensors 1603 may be provided as roadside sensors that are placed to side of the roads in the road environment 1601. The one or more sensors 1603 may be provided as infrastructure sensors. The one or more sensors 1603 may be provided as a network, e.g. a roadside sensor network including the one or more sensors 1603. A network of infrastructure network may include the one or more sensors 1603. The one or more sensors 1603 may be configured to cover strategic areas of the road environment, e.g. intersection, crosswalks, potential road segments that may have reduced safety due to its location, stationary objects in the environment, trees, construction sites, vicinity of traffic lights etc.

The one or more sensors 1603 may be coupled to the one or more road side units 1603, and the one or more sensors 1603 may be configured to provide the sensor data. Each of the one or more sensors 1603 may include a communication circuit that is configured to provide the sensor data to other entities. Each of the one or more sensors 1603 may include a communication circuit that is configured to provide the sensor data according to a communication protocol, e.g. as a V2X message. Each of the one or more sensors 1603 may include a communication circuit that is configured to provide the sensor data to a communication network. Each of the one or more sensors 1603 may be coupled to a sensor hub. The sensor hub may include a communication circuit to provide sensor data to other entities or to a network. For example, the sensor hub may be configured to provide the sensor data to the one or more road side units 1602. The sensor hub may be configured to provide the sensor data to an edge cloud. The one or more road side units 1602 may include or may be coupled to an edge cloud device that is configured to receive the sensor data. The communication circuit of each of the one or more sensors 1603 may provide the sensor data to the edge cloud.

Figure 17:
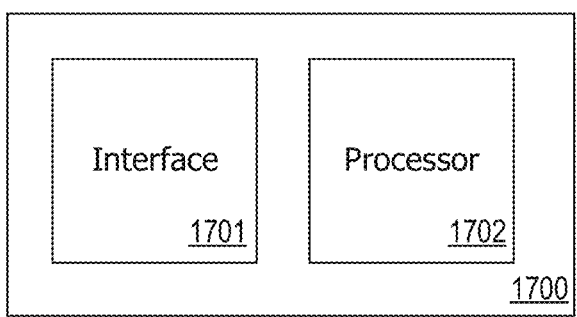
FIG. 17 shows an example of an apparatus.

FIG. 17 shows an example of an apparatus. The apparatus 1700 may include an interface 1701. The interface 1701 may be configured to receive a plurality of data items provided by a plurality of sensors. The interface 1701 may include a communication interface that is configured to receive communication signals. The interface 1701 may include a radio communication interface that is configured to receive wireless communication signals. The interface 1701 may include an interface for an edge cloud. The interface 1701 may include a memory interface configured to provide access to a memory.

The apparatus 1700 may receive the plurality of data items provided by the plurality of sensors via the interface, and each of the plurality of data items may include a detection information indicating whether an object has been detected by at least the one of the plurality of sensors. The apparatus 1700 may further include a processor 1702 to process information received via the plurality of data items. The data items may include sensor data as detection information which may be an input for a model-based estimation (e.g., an estimation of a current state or an estimation of a state in the future, referred to as prediction) of one or more traffic related characteristics, such as a trajectory of a road user.

The processor 1702 may be configured to detect a presence of a road user from the information that the apparatus 1700 receives via the interface 1701. Each of the plurality of data items may include sensor data as the detection information, the sensor data may be related to an observation of the respective sensor that provides the sensor data. The sensor data may include information indicating the observation of the respective sensor at a time instance, or the observation of the respective sensor for a period of time.

The processor 1702 may be configured to detect the presence of a road user based on the detection information (e.g. sensor data). The detection information may include a traffic related information providing an indication that a road user has been detected. The detection information may include an indication that an object has been detected, and the processor 1702 may be configured to determine that the detected object is a road user. Furthermore, the detection information may include further information providing an indication related to the detected object, such as a type of the detected object, a location of the detected object, an identifier for the detected object. The detection information may include an image of the detected object.

Figure 18:
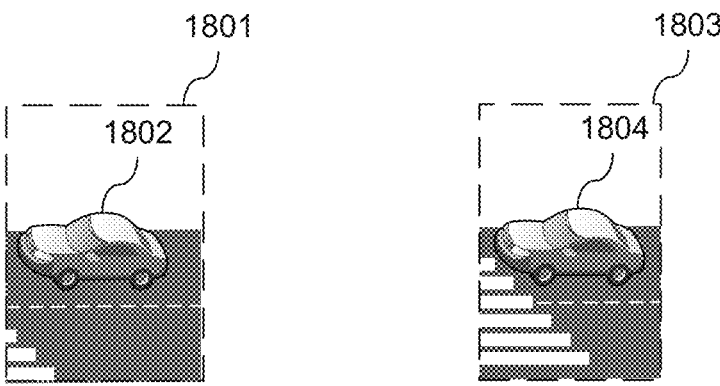
FIG. 18 shows schematically an illustration of information provided as a detection information for two data items.

FIG. 18 shows schematically an illustration of information provided as a detection information for two data items. In this example, detection information includes an image of the detected object. The first data item may include a first detection information 1801. The first detection information 1801 may include an image of the detected object 1802 which a first sensor provides. The first detection information 1801 may further include other type of information which the first sensor provides, e.g. an estimated type for the detected object 1802, an estimated location for the detected object 1802, an estimated velocity of the detected object 1802, e.g. environment data of the first sensor at a first time instance.

The second data item may include a second detection information 1803. The second detection information 1803 may include an image of the detected object 1804 which a second sensor provides. The second detection information 1803 may further include other type of information which the second sensor provides, e.g. an estimated type for the detected object 1804, an estimated location for the detected object 1804, an estimated velocity of the detected object 1804, e.g. environment data of the second sensor at a second time instance.

Referring back to FIG. 17, the processor 1702 may include a be configured to predict a road user trajectory for a road user based on the detection information received from the plurality of data items. The processor 1702 may be configured to predict the road user trajectory via various prediction methods based on the plurality of data items. For example, the processor 1702 may be configured to analyze a plurality of data items. Each of the plurality of data items may include a detection information including an image of an environment including a road user taken by one or more sensors. The processor 1702 may be configured to analyze the plurality of data items, and predict a road trajectory for the road user based on the images including the road user taken at one or more instances of time.

Each of the plurality of data items may include a detection information indicating a location of a road user, a velocity of the road user, and a heading of the road user. The processor 1702 may be configured to analyze the plurality of data items and predict a road trajectory for the road user based on the detection information indicating one or more of a location, a velocity, and a heading for the road user. Each of the plurality of data items may include a detection information indicating a location of a road user for various instances of time. The processor 1702 may be configured to predict a road trajectory for the road user based on the detection information of each of the plurality of data items, which the each of the detection information indicates a location of the road user for different instance of time. Furthermore, the plurality of data items may include detection information indicating a past trajectory for a road user for various periods of time. The processor 1702 may be configured to predict a road trajectory for the road user based on the past trajectory for the road user.

Furthermore, the detection information may include an information that may be specific to a detected road user. For example, the detection information may further include a type information indicating the type of the detected road user. Alternatively, the processor 1702 may be configured to estimate a type of the detected road user based on each of the plurality of data items including the detection information and generate a type information for the detected road user.

The detection information may further include a posture information indicating the posture of the detected road user. Alternatively, the processor 1702 may be configured to estimate a posture of the detected road user based on each of the plurality of data items including the detection information and generate a posture information for the detected road user. The detection information may include a behavior information indicating a behavior of the detected road user. Alternatively, the processor 1702 may be configured to estimate a behaviour of the detected road user based on each of the plurality of data items including the detection information and generate a behavior information for the detected road user. The detection information may include a state information indicating a state of the detected road user. Alternatively, the processor 1702 may be configured to estimate a state of the detected road user based on each of the plurality of data items including the detection information and generate a state information for the detected road user. The processor 1702 may be configured to perform above-mentioned detections to generate a behavior information, and/or a state information, and/or a posture information, only in case the type of the road user is a vulnerable road user, or specifically a pedestrian.

Furthermore, the processor 1702 may be configured to include the road-user specific information to the prediction of a road trajectory for a road user. The road-user specific information may include one or more of the type information, the posture information, the behaviors information, the state information. The processor 1702 may be configured to include the road-user specific information, only in case the road user is detected as a vulnerable road user or a pedestrian.

The road user type may provide an indication to the processor 1702, that the processor 1702 may perform the prediction of the road user trajectory according to an average velocity predetermined for the road user type. The type information for the road user may indicate that the road user is a pedestrian. The processor 1702 may predict the road user trajectory for the road user by using an average velocity predetermined for the pedestrian type.

The posture information may indicate a gaze direction of the road user. Accordingly, the processor 1702 may predict the road user trajectory for the road user towards the gaze direction of the road user. The behavior information may indicate that the road user walks with a velocity higher than the velocity of the average velocity for the type of the road user. Accordingly, the processor 1702 may predict the road user trajectory with a velocity higher than the average velocity for the type of the road user. The state information may indicate that the road user may be distracted, and the processor 1702 may predict the road user trajectory by considering that the road user may be distracted.

Furthermore, the processor 1702 may be configured to combine at least two of the plurality of data items to generate a combined environment data. The one of the at least two of the plurality of data items may include information providing indication relating to the environment which a first sensor detected. The other one of the at least two of the plurality of data items may include information providing indication relating to the environment which a second sensor detected. Further data items received via the interface 1701 may reflect further environment data received by further sensors. Accordingly, by combination, an overview of the road environment may be obtained.

As an alternative, the processor 1702 may be configured to perform above-mentioned prediction based on the combined environment data to generate one or more road user trajectory data for one or more road users. Each of the generated one or more road user trajectory data may include at least one predicted location of the respective road user at a future time. The one or more road user trajectory data may further include a time information indicating an instance of time, or a period of time, for the respective road user to be at the predicted location.

Accordingly, the processor 1702 may be configured to perform above-mentioned detections and predictions for one or more road users detected from the plurality of data items which the apparatus 1700 receives via the interface 1701. Based on the prediction, the processor 1702 may be configured to generate one or more road user trajectory data for one or more road users detected based on the plurality of data items. Each of the one or more road user trajectory data may include information indicating a predicted location of the one or more road user in the road environment.

Furthermore, the processor 1702 may be configured to determine an occupancy of the predicted location for a time instance provided in the one or more road user trajectory data. The processor 1702 may be configured to determine an occupancy for each of the predicted locations provided in the one or more road user trajectory data. Accordingly, the processor 1702 may identify potential collisions, or intersections that the processor 1702 may predict based on the occupancy.

Furthermore, in case the processor 1702 identifies an intersection at least two road user trajectory data, the processor 1702 may determine to generate an alternative trajectory. Accordingly, the processor 1702 may generate an alternative trajectory for at least one of the road users that the processor 1702 identifies the intersection. The processor 1702 may generate the alternative trajectory for at least one road user based on the generated road user trajectory data of other road users.

The processor 1702 may further be configured to generate a signal and/or encode a message for transmission based on the determination of the occupancy. The processor 1702 may determine to send an indication to at least one of the road users that the processor 1702 identifies an intersection in order to provide an instruction to the road user. The processor 1702 may encode the message for transmitting the message over a mobile network to a user device of the road user. The processor 1702 may generate a signal to be transmitted to an infrastructure unit, e.g. a traffic light, or a display, or a loudspeaker in the vicinity of the road user.

Furthermore, the processor 1702 may further be configured to determine the locations and/or regions in the road environment that the processor 1702 has not predicted any occupancy for a period of time. The processor 1702 may generate for at least one road user an alternative trajectory including the locations and/or regions in the road environment that the processor 1702 predicted no occupancy, and encode the alternative trajectory for transmitting to the respective road user. The processor 1702 may further be configured to identify the type of the road users, and the processor 1702 may be configured to determine the locations and/or regions in the road environment that the processor 1702 has not predicted any vehicle occupancy for a period of time. Accordingly, the processor 1702 may encode a message for transmitting to a road user which the processor 1702 has detected as a vulnerable road user, indicating that there is no predicted occupancy for the determined location and/or region.

Figure 19:
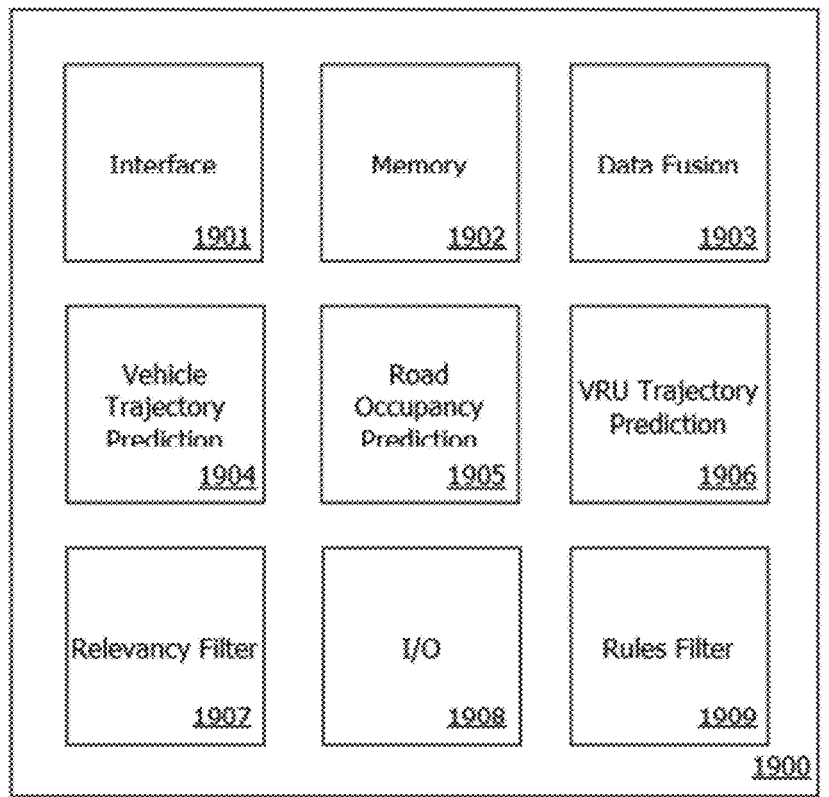
FIG. 19 shows schematically an example of various modules that may be integrated by one or more processors.

FIG. 19 shows schematically an example of various modules that may be integrated by one or more processors. Various modules in a processor 1900 may include an interface module 1901, a memory module 1902, a data fusion module 1903, a vehicle trajectory prediction module 1904, a road occupancy prediction module 1905, a vulnerable road user trajectory prediction module 1906, a relevancy filter module 1907, an input/output module 1908, and a rules filter module 1909.

The interface module 1901 may be configured to provide an interface to receive and transmit data. The interface module 1901 may be configured to receive a plurality of data items provided by a plurality of sensors in a road environment. Each of the plurality of data items may include a detection information based on an observation performed by one of the plurality of sensors in the road environment. The interface module 1901 may be configured to receive the plurality of data items and store the plurality of items using the memory module. Alternatively, the interface module 1901 may be configured to provide cloud computing techniques to act as an interface between other modules of the processor 1900 and e.g. cloud in order to access the plurality of data items in the cloud.

The memory module 1902 may provide access to a memory for functions of the other modules of the processor 1900. As an alternative, the interface module 1901 may also include the memory module 1902.

The data fusion module 1903 may be configured to combine information provided by the plurality of data items provided by the interface module 1901. The data fusion module 1903 may be configured to identify the detection information of the plurality of data items. The data fusion module 1903 may be configured to identify the detection information of each of the plurality of data items. The detection information may include any type of information that the one or more sensors have detected with respect to an object. The detection information may include an image of an environment, an image of a road user, any type of traffic related information, including a type information related to one or more road users, a posture information related to one or more road users, a behavior information related to one or more road users, a state information related to one or more road users. Furthermore the data fusion module 1903 may also obtain a map of the respective road environment from a road side unit, or from a network via the interface module 1901. The data fusion module 1903 may combine the plurality of data items provided by the interface module 1901 to obtain a map of dynamic environment.

Since the resulting map of dynamic environment may include any type of information which the interface module 1901 provides to the data fusion module 1903, the data fusion module 1903 may include functions to provide temporal alignment with respect to plurality of data items received in various times. Furthermore, the data fusion module 1903 may include functions to associate one or more data items received for the same object, such as a road user, from one or more sensors to avoid any repetitions. Furthermore, the data fusion module 1903 may include functions to cluster the objects and/or the information which the detection information includes. Furthermore, the data fusion module 1903 may include functions to identify and extract the objects provided with the plurality of data items, and further functions to track all detected road users.

Furthermore, the data fusion module 1903 may be configured to sustain the map of the dynamic environment continuously based on further plurality of data items that the interface module 1901 provides to ensure that the map of the dynamic environment continuously changes based on the interactions in the road environment. Accordingly, the map of the dynamic environment may include a representation of the road environment which is continuously updated via the plurality of data items provided by the plurality of sensors in the road environment.

The vehicle trajectory prediction module 1904 may communicate with the data fusion module 1903 and the interface module 1901 to predict a road user trajectory for one or more of the plurality of vehicles detected in the map of the dynamic environment via the data fusion module 1903. The vehicle trajectory prediction module 1904 may use the map of the dynamic environment to predict a road user trajectory for the one or more vehicles based on the information provided by the plurality of data items. The vehicle trajectory prediction module 1904 may further communicate with the vulnerable road user trajectory prediction module 1906 to receive information related to trajectories of the vulnerable road users on the map of the dynamic environment.

The vehicle trajectory prediction module 1904 may consider the locations of each of the road users detected on the map, and provide a convolutional neural network (CNN) based prediction for each of the road users based on their location on the map. The vehicle trajectory prediction module 1904 may be configured to compute mask images for each of the detected vehicles. Alternatively, the vehicle trajectory prediction module 1904 may be configured to predict a road user trajectory for each of the detected vehicles by using a long short term memory (LSTM) based approach.

The vehicle trajectory prediction module 1904 may further be configured to generate a road user trajectory data for one or more of the detected vehicles. The road user trajectory data may include at least one predicted location information indicating a predicted location of the detected vehicle. The road user trajectory data may further include at least one time information indicating the time on which the detected vehicle will be on the at least one predicted location. The vehicle trajectory prediction module 1904 may further be configured to communicate with the road occupancy prediction module 1905 to provide the road user trajectory data.

The vulnerable road user trajectory prediction module 1906 may communicate with the data fusion module 1903 and the interface module 1901 to predict a road user trajectory for each of the vulnerable road users detected in the map of the dynamic environment by the data fusion module 1903. The vulnerable road user trajectory prediction module 1906 may use the map of the dynamic environment to predict a road user trajectory for one or more of the vulnerable road users based on the information provided by the plurality of data items.

Furthermore, the vulnerable road user trajectory prediction module 1906 may be configured to use a type information for one or more detected vulnerable road users and/or a posture information related to one or more detected vulnerable road users, and/or a behavior information related to one or more detected vulnerable road users and/or a state information related to one or more detected vulnerable road users to predict the road user trajectory for the respective one or more detected vulnerable road users.

The vulnerable road user trajectory prediction module 1906 may be configured to communicate with the input/output module 1908 to receive a type information for at least one of the detected vulnerable road users and/or a posture information related to at least one of the vulnerable road users, and/or a behavior information related to at least one of the vulnerable road users and/or a state information related to at least one of the vulnerable road users to predict the road user trajectory for the at least one of the vulnerable road users. The input/output module 1908 may include an interface to one or more sensors of an apparatus including the processor 1900.

The vulnerable road user trajectory prediction module 1906 may further be configured to generate a road user trajectory data for one or more detected vulnerable road users. The road user trajectory data may include at least one predicted location information indicating a predicted location of the detected vulnerable road user. The road user trajectory data may further include at least one time information indicating the time on which the detected vulnerable road user will be at the at least one predicted location. The vulnerable road user trajectory prediction module 1906 may further be configured to communicate with the road occupancy prediction module 1905 to provide the road user trajectory data.

The road occupancy prediction module 1905 may be configured to communicate with the vehicle trajectory prediction module 1904, the data fusion module 1903, and the vulnerable road user trajectory prediction module 1906. The road occupancy prediction module 1905 may be configured to analyze each of the road user trajectory for each of the vehicles which the vehicle trajectory prediction module 1904 provides with the road user trajectory data, and determine regions in the road environment that are occupied from the vehicles. The road occupancy prediction module 1905 may be configured to access the map of the dynamic environment to perform the determinations.

The road occupancy prediction module 1905 may be configured to analyze each of the road user trajectory data provided for the one or more detected vehicles, and determine locations which will be occupied based on the at least one predicted location information, and at least one time information in the road user trajectory data. Accordingly, the road occupancy prediction module 1905 may provide information indicating the locations and/or regions of the road environment that will be occupied by the detected vehicles at a given time. Furthermore, the road occupancy prediction module 1905 may provide information indicating locations and/or regions of the road environment that are available for other road users, including the vulnerable road users.

Furthermore, the road occupancy prediction module 1905 may be configured to analyze each of the road user trajectory for the one or more detected vulnerable road users which the vulnerable road user prediction module 1906 provides with the road user trajectory data. The road occupancy prediction module 1905 may further be configured to determine locations and/or regions in the road environment that are occupied by the detected vulnerable road users. The road occupancy prediction module 1905 may be configured to access the map of the dynamic environment to perform the determinations.

The road occupancy prediction module 1905 may be configured to analyze each of the road user trajectory data provided for the one or more detected vulnerable road users, and determine locations which will be occupied by the one or more detected vulnerable road users based on the at least one predicted location information, and at least one time information in the road user trajectory data. Accordingly, the road occupancy prediction module 1905 may provide information indicating the locations and/or regions of the road environment that will be occupied by the detected vulnerable road users at a given time. Furthermore, the road occupancy prediction module 1905 may provide information indicating locations and/or regions of the road environment that are available for other road users, including the vulnerable road users.

Furthermore, the road occupancy prediction module 1905 may be configured to analyze each of the road user trajectory for the one or more detected vulnerable road users and for the vehicles. The road occupancy prediction module 1905 may further be configured to determine locations and/or regions in the road environment that may be of interest to provide an indication to guide the road users in the road environment. The road occupancy prediction module 1905 may be configured to analyze at least two road user trajectories to determine the locations and/or regions in the road environment that may be of interest to provide the indication to guide the road users. The road occupancy prediction module 1905 may be configured to access the map of the dynamic environment to perform the determinations.

The road occupancy prediction module 1905 may be configured to analyze each of the road user trajectory data provided for at least two road users and determine locations which may be occupied by at least two road users based on the at least two predicted location information, and at least one time information in the road user trajectory data. Accordingly, the road occupancy prediction module 1905 may provide information indicating the locations and/or regions of the road environment that may be occupied by at least users at a given time. Furthermore, the road occupancy prediction module 1905 may provide information indicating locations and/or regions of the road environment that are not available for other road users, including the vulnerable road users.

Figure 20:
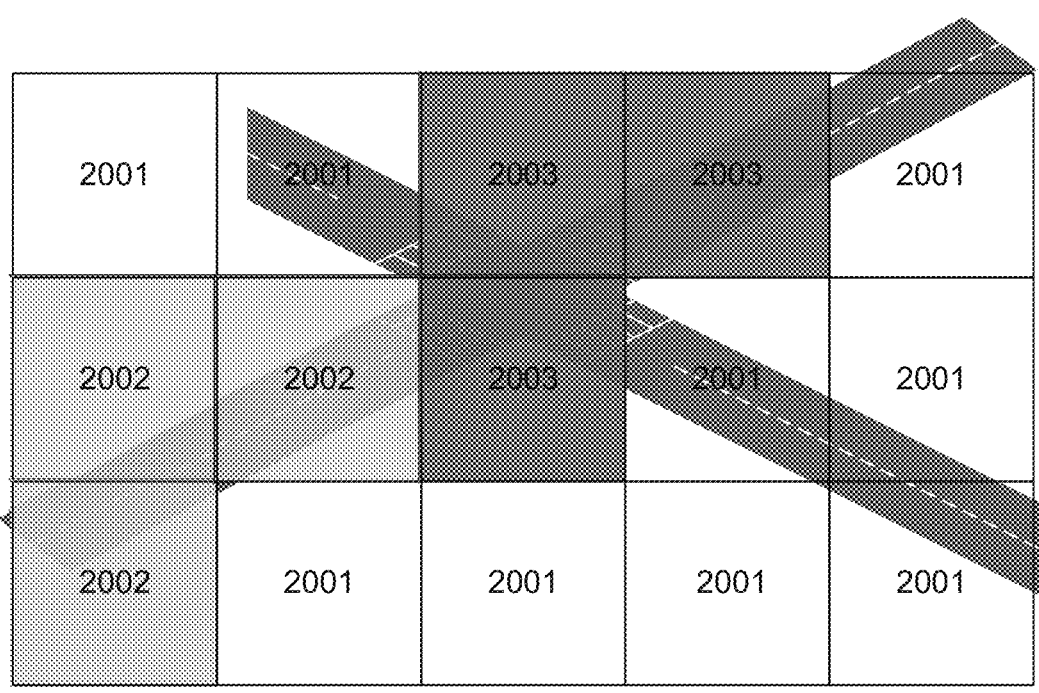
FIG. 20 shows schematically an exemplary diagram representing visually a map of occupancy at a future time instance.

FIG. 20 shows schematically an exemplary diagram representing visually a map of occupancy at a future time instance. Based on the information that the vehicle trajectory prediction module 1904 and the vulnerable road user trajectory prediction module 1906 provide to the road occupancy prediction module 1905, the road occupancy prediction module 1905 determines an occupancy value for the regions and/or locations on the map. The map indicates visually the regions that have no predicted occupancy 2001, the regions that have predicted occupancy 2002, and the regions that have certain complexities 2003. The road occupancy prediction module 1905 determines three level of occupancies for this example. The road occupancy prediction module 1905 may determine the amount of the occupancy levels further based on the information which the data fusion module 1903 provides.

Furthermore, the road occupancy prediction module 1905 may be configured to communicate with the relevancy filter module 1907 to provide one or more road occupancy information related to predicted occupancies based on the predicted road user trajectory data of the detected one or more road users. A road occupancy information may further include an information indicating the determined occupancy level for one or more locations and/or regions. A road occupancy information may further include information indicating road users to warn. A road occupancy information may further include any traffic related information. A road occupancy information may further include information indicating the one or more detected vulnerable road users in the road environment.

The relevancy filter module 1907 may receive the one or more road occupancy information and determine one or more messages and/or signals to transmit based on the one or more road occupancy information. The relevancy filter module 1907 may receive the one or more road occupancy information indicating that road occupancy prediction module 1905 has predicted a vulnerable road user may cross a road section that may intersect with the trajectory of a vehicle. The relevancy filter module 1907 may determine to provide information to the input/output module 1908 to transmit a message and/or signal to warn the vulnerable road user. In other words, the relevancy filter module 1907 may receive the output of the road occupancy module 1905, and the relevancy filter module 1907 may determine whether an action needs to be taken or not based on the information that the road occupancy module 1905 provides. The relevancy filter module 1907 may provide an output information to the input/output module 1908 to provide an output. The relevancy filter module 1907 may further communicate with the data fusion module 1903 to obtain further information to perform a determination.

Furthermore, the relevancy filter module 1907 may determine not to provide any indication based on the road occupancy information. For example, the road occupancy information may indicate that the road occupancy prediction module 1905 has predicted that a vulnerable road user may want to cross a road section that will not be occupied for a predicted time period. The relevancy filter module 1907 may determine not to provide any indication to the vulnerable road user, based on the prediction of the road occupancy prediction module 1905. The relevancy filter module 1907 may further determine to provide information indicating that the road occupancy prediction module 1905 has predicted that the respective road section will be unoccupied for the predicted time period to the memory module 1902, so the memory module 1902 may store the information.

The rules filter module 1909 may communicate with any of the other modules. For example, the rules filter module 1909 may communicate with the interface module 1901 to receive a plurality of data items including information indicating certain rules that may affect the decisions and/or determinations performed by other modules. The rules filter module 1909 may provide information indicating laws and regulations related to traffic at the location of the road environment. For example, the rules filter module 1909 may provide the maximum allowed velocity at the road environment. The rules filter module 1909 may be configured to communicate with the input/output module 1908 to obtain the location of the road environment. Furthermore, the rules filter module 1909 may allow access to the laws and regulations to the vehicle trajectory prediction module 1904, or the vulnerable road user trajectory prediction module 1906, or the road occupancy module 1905, since these modules may perform their predictions based on the laws and regulations applied at the road environment.

The input/output module 1908 may be configured to receive an input from other modules, components and/or circuits of an apparatus that includes the processor 1900, e.g. sensors. Furthermore, the input/output module 1908 may be configured to provide an output based on the data which relevancy filter module 1907 provides. The input/output module 1908 may receive the output information from the relevancy filter module 1907. The output information may include information indicating that the input/output module 1908 may encode a message for one of the detected road users for transmission. The output information may include information indicating that the input/output module 1908 may configure a signal to transmit to an infrastructure unit, such as a traffic light at a road section, or a display at a road section. The output information may include information indicating that the input/output module 1908 may configure an audio signal to transmit at a road section.

Figure 21:
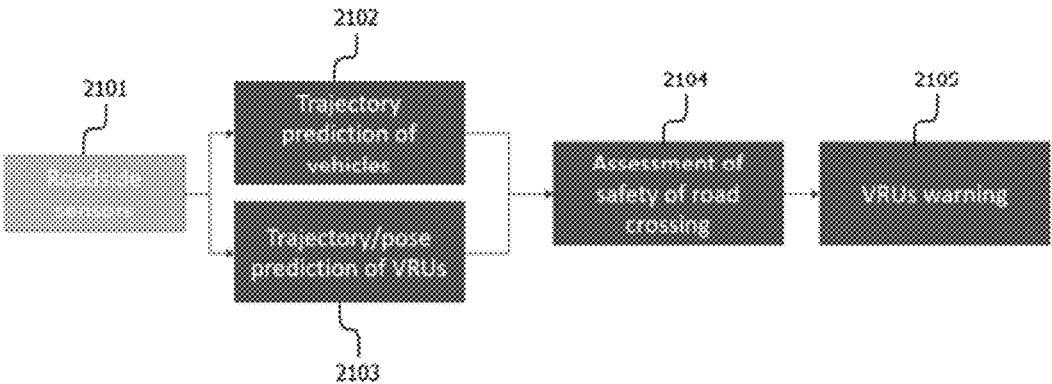
FIG. 21 shows schematically an example of an application including an apparatus.

FIG. 21 shows schematically an example of an application including an apparatus. The apparatus may include the processor as referred in FIG. 19. The apparatus may receive 2101 plurality of data items from a plurality of sensors via an interface module. The processor of the apparatus may generate a combined environment data e.g. using a data fusion module. The combined environment data includes information indicating one or more road users. The processor may predict and generate a road user trajectory data 2102 for each one or more road users detected as vehicles in the combined environment data via a vehicle trajectory prediction module.

The processor may predict and generate a road user trajectory data 2103 for each one or more road users detected as vulnerable road users in the combined data via a vulnerable road user trajectory prediction module further by considering vulnerable road user specific data e.g. type, posture, behavior, and/or state of the vulnerable road user. The processor may the assess the safety of a road section 2104, such as a road crossing via a road occupancy prediction module. The processor may identify the road sections which one or more detected vulnerable road users may use. The processor may further identify the road sections which may provide a risk for one or more detected vulnerable road users. The processor may provide indication 2105 to the vulnerable road users e.g. such as transmitting a message to a user device of the vulnerable road user and/or providing indication to the vulnerable road user via an infrastructure unit e.g. a traffic light.

Figure 22:
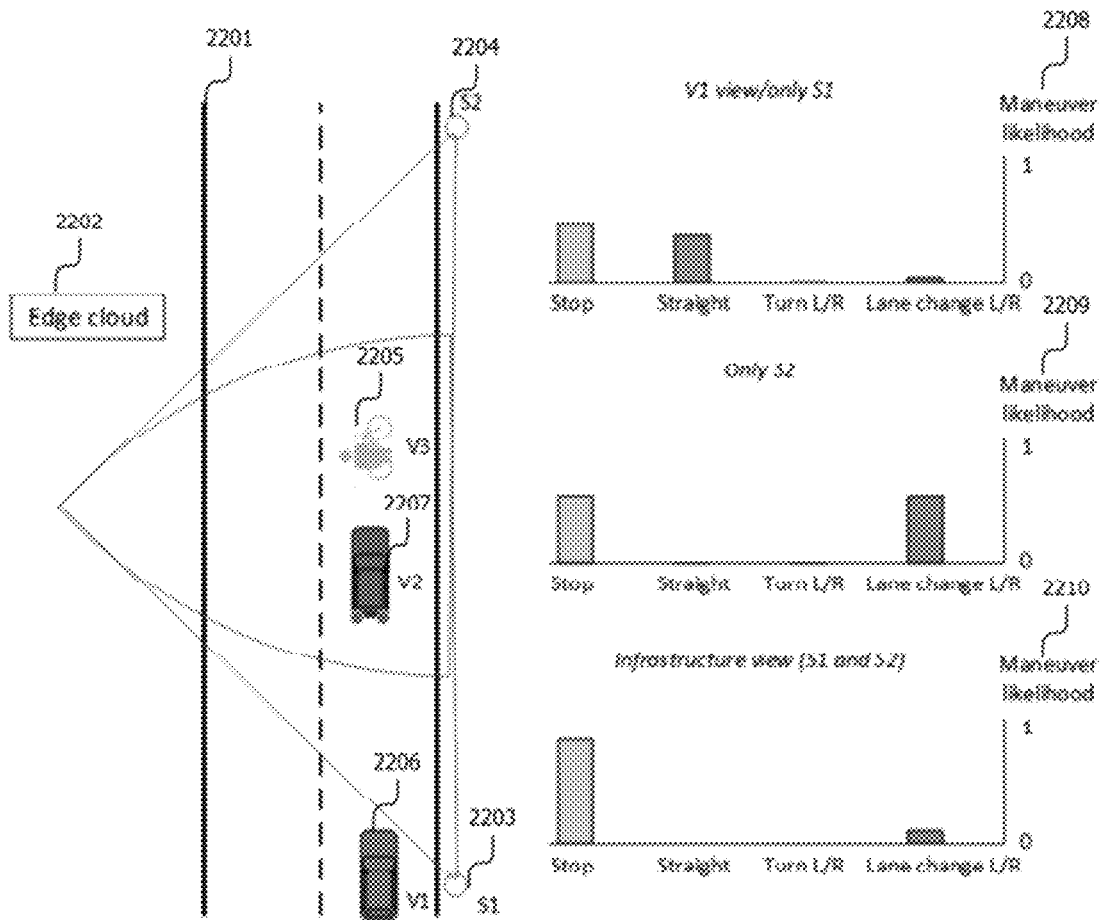
FIG. 22 shows schematically an example illustration of a road environment and a prediction based on a plurality of data items.

FIG. 22 shows schematically an example illustration of a road environment and a prediction based on a plurality of data items. The road environment 2201 includes an apparatus 2202 including a processor in a form of edge cloud. The road environment includes a first sensor 2203, and a second sensor 2204. The first sensor 2203 and the second sensor 2204 are configured to provide data items for the processor of the edge cloud 2202. The edge cloud 2202 is configured to receive the plurality of data items which the first sensor 2203 and the second sensor 2204 provides via its interface.

As illustrated, there are a biker 2205, a first vehicle 2206, and a second vehicle 2207 in the road environment 2201. The biker 2205 may be travelling at a velocity that is slower than the velocity of the second vehicle 2207. Accordingly, the second vehicle 2207 brakes by lighting the brake lights of the second vehicle 2207. At this time instance, the first sensor 2203 generates a sensor data as an image, encodes the sensor data as a data item and transmits.

The processor of the edge cloud 2202 receives the data item that the first sensor 2203 provides. The processor detects that there is a vehicle as a car at the road environment using the data fusion module. Since the view of the first sensor 2203 does not have a line of sight with the biker 2205 at that time instance as it was blocked by the second vehicle 2207, the presence of the biker 2205 is not detected. Furthermore, the data fusion module identifies that the brake lights of the second vehicle 2207 is on, which provides indication to the data fusion module that the second vehicle is braking.

The vehicle trajectory prediction module accesses the data which the data fusion module generated and predict a road user trajectory data for the second vehicle 2201. The prediction which the vehicle trajectory prediction module performs may indicate that the second vehicle 2207 may stop, or the second vehicle 2207 may go straight, since the presence of the biker 2205 was not detected. A representation of the road user trajectory data for the second vehicle 2207 may be provided in 2208.

At a second time instance, the second sensor 2204 generates a sensor data as an image, encodes the sensor data as a data item, and transmits. The processor receives the data item that the second sensor 2204 provides via its interface module. The data fusion module receives the data and identifies that there are other road users including the biker 2205 and the first vehicle 2206.

The vehicle trajectory prediction module accesses the data which the data fusion module generated and predict a second road user trajectory for the second vehicle 2207. Based on the plurality of data items received from the first sensor 2203 and the second sensor 2204, the vehicle trajectory prediction module may indicate that it is highly likely that the second vehicle 2207 is going to stop. A representation of the second road user trajectory may be seen in 2210. Furthermore, a representation of a road user trajectory is provided in 2209 how the vehicle trajectory prediction module would predict the road user trajectory for the second vehicle 2207, if the data fusion module received the data which the second sensor 2204 transmitted at the first instance (without the data of the first sensor 2203).

Figure 23:
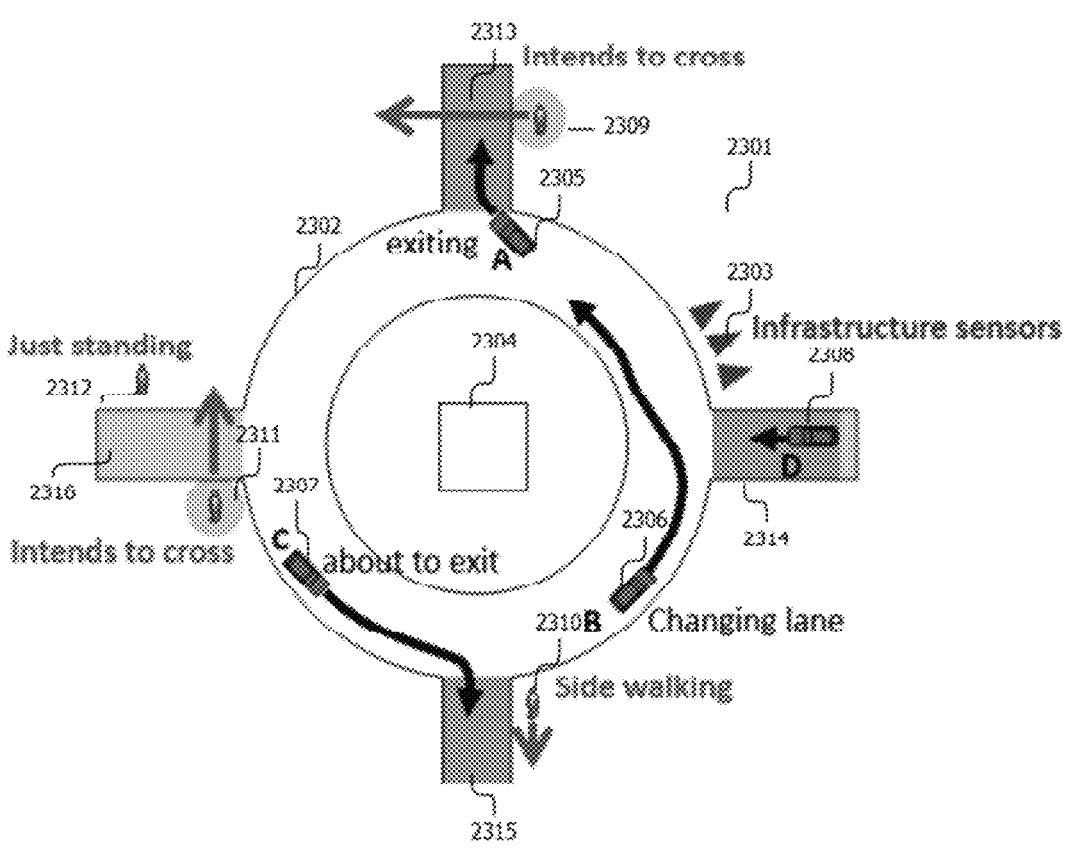
FIG. 23 shows schematically an illustration of a road environment.

FIG. 23 shows schematically an illustration of a road environment. The road environment 2301 includes a roundabout 2302. There is a plurality of sensors 2303 (not all shown) provided as a roadside sensor network around the roundabout 2302. The plurality of infrastructure sensors 2303 are configured to provide the sensor data to a cloud edge which is connected to a road side unit 2304.

There is a first vehicle 2305, a second vehicle 2306, a third vehicle 2307, and a fourth vehicle 2308 on the road environment 2301 as vehicles, and a first pedestrian 2309, a second pedestrian 2310, a third pedestrian 2311, and a fourth pedestrian 2312 as vulnerable road users.

The road side unit 2304 includes a processor including modules referred in FIG. 19. The data fusion module is configured to fuse the sensor data received from the plurality of sensors 2303 and generate a combined environment data map of the road environment 2301 continuously based on the plurality of data items received by the interface module.

The vehicle trajectory prediction module may access to data which the data fusion module provides as the combined environment data map, and the vehicle trajectory prediction module may predict a road user trajectory based on the combined environment data map for each of the road users that the combined environment data map includes an indication that a road user is a vehicle. Accordingly, the vehicle trajectory prediction module may generate a first road user trajectory data for the first vehicle 2305, and/or a second road user trajectory data for the second vehicle 2306, and/or a third road user trajectory data for the third vehicle 2307, and/or a fourth road user trajectory data for the fourth vehicle 2308.

The vulnerable road user trajectory prediction module may access to data which the data fusion module provides as the combined environment data map, and the vulnerable road user trajectory prediction module may predict a road user trajectory based on the combined environment data map for each of the road users that the combined environment data map includes an indication that a road user is a vulnerable road user. The vulnerable road user trajectory prediction module may further perform the prediction based one or more of the following for a detected vulnerable road user: a type information for one or more detected vulnerable road users and/or a posture information related to one or more detected vulnerable road users, and/or a behavior information related to one or more detected vulnerable road users and/or a state information related to one or more detected vulnerable road users. Accordingly, the vulnerable road user trajectory prediction module may generate a fifth road user trajectory data for the first pedestrian 2309, and/or a sixth road user trajectory data for the second pedestrian 2310, and/or a seventh road user trajectory data for the third pedestrian 2311, and/or an eighth road user trajectory data for the fourth pedestrian 2312.

The road occupancy prediction module may receive or may access any of the generated road user trajectory data. The road occupancy prediction module may predict occupancy for various locations and/or regions of the road environment 2301 based on the road user trajectory data and/or other information including the combined environment data map, or any traffic related information. The road occupancy prediction module may identify that the vulnerable road user trajectory prediction module has predicted that the first pedestrian 2309 intends to cross a road section 2313 based on the fifth road user trajectory data, and accordingly the first pedestrian 2309 may be on the road section 2313 for a first period of time.

Furthermore, the road occupancy prediction module may identify that the vehicle trajectory prediction module has predicted that first vehicle 2305 intends to cross the road section 2313 within a second period of time based on the first road user trajectory data. The road occupancy prediction module may further identify that the first period of time and the second period of time has an overlap at an overlapped period of time. The road occupancy prediction module may further determine that the road section 2313 may be occupied by the first vehicle 2305 and the first pedestrian 2309 at the same time. The road occupancy prediction module may generate a road section information indicating that the road section 2313 may be occupied by the first vehicle 2305 and the first pedestrian 2309 at the same time.

The relevancy filter module may receive or may access the road section information. The relevancy filter module may further determine to provide an indication to the first pedestrian 2309 indicating that the first vehicle 2305 will approach to the road section 2313. The indication may further include a warning for the first pedestrian 2309. The relevancy filter module may further determine to provide the indication to the first pedestrian 2309 via a communication message to be transmitted to a user device carried by the first pedestrian 2309. The relevancy filter module may further determine to provide the indication to the first pedestrian 2309 via an infrastructure unit. Accordingly, the relevancy filter module may provide information indicating, for this example, that the input/output module may provide an output signal to a road structure unit at the road section 2313 to warn the first pedestrian 2309 by providing a red light to the road section 2313. The input/output module may transmit the signal, or may instruct to the interface module to transmit the signal.

Furthermore, the road occupancy prediction module may identify that the vehicle trajectory prediction module has predicted that the second vehicle 2306 intends to approach to a road section 2314 based on the second road user trajectory data, and accordingly the second vehicle 2306 may cross in front of the road section 2314 within the roundabout 2302 for a first period of time.

Furthermore, the road occupancy prediction module may identify that the vehicle trajectory prediction module has predicted further that the fourth vehicle 2308 intends to enter the roundabout 2302 from road section 2314 within a second period of time based on the fourth road user trajectory data. The road occupancy prediction module may further identify that the first period of time and the second period of time has an overlap at an overlapped period of time. The road occupancy prediction module may further determine that a region providing intersection with the road section 2314 and the roundabout 2302 may be occupied by the second vehicle 2306 and the fourth vehicle 2308 at the same time. The road occupancy prediction module may generate a road section information indicating that the region providing intersection with the road section 2314 and the round about 2302 may be occupied by the second vehicle 2306 and the fourth vehicle 2306 at the same time.

The relevancy filter module may receive or may access the road section information. The relevancy filter module may further determine to provide an indication to the fourth vehicle 2308 indicating that the second vehicle 2306 will approach to the respective region. The relevancy filter may determine to provide the indication to the fourth vehicle 2308 by receiving or accessing information which the rules filter module provides to identify a law or regulation for the road environment 2301 regarding which of these vehicles may have priority to enter to the respective region. The indication may further include a warning for the fourth vehicle 2308. The relevancy filter module may further determine to provide the indication to the fourth vehicle 2308 via a communication message to be transmitted to a user device carried by the user of the fourth vehicle 2308, or a vehicle communication unit of the fourth vehicle 2308. The relevancy filter module may further determine to provide the indication to the fourth vehicle 2308 via an infrastructure unit. Accordingly, the relevancy filter module may provide information indicating, for this example, that the input/output module may provide an output signal to a road structure unit at the road section 2314 to warn the fourth vehicle 2308 by providing a red light to the road section 2314. The input/output module may transmit the signal, or may instruct to the interface module to transmit the signal.

Furthermore, the road occupancy prediction module may identify that the vehicle trajectory prediction module has predicted that the third vehicle 2307 intends to approach to a road section 2315 based on the third road user trajectory data, and accordingly the third vehicle 2307 may enter into the road section 2315 from the roundabout 2302, and may be in the road section 2315 for a first period of time.

Furthermore, the road occupancy prediction module may identify that the vulnerable road user trajectory prediction module has predicted further that the second pedestrian 2310 intends to continue walking on the sideway in the vicinity of the road section 2315 for a second period of time based on the sixth road user trajectory data. The road occupancy prediction module may further identify that the first period of time and the second period of time has no overlap. The road occupancy prediction module may further determine that the road section 2315 may be occupied by the third vehicle 2307 for a period of time. The road occupancy prediction module may generate a road section information indicating that the road section 2315 may be occupied by the third vehicle 2307 for the period of time. The road occupancy prediction module may further include in the road section information an information indicating that there is the second pedestrian 2310 at the vicinity of the road section 2315.

The relevancy filter module may receive or may access the road section information. The relevancy filter module may determine to provide an indication to the third vehicle 2307 indicating that there is the second pedestrian 2310 at the vicinity of the road section 2315. The relevancy filter module may further determine not to provide an indication to any of the road users in or in the vicinity of the road section 2315 based on the road section information, since there is no predicted occupancy for more than one road users. Accordingly, the relevancy filter module may provide a road section information to the memory module to store the road section information in a memory. Alternatively, the road section information may be stored in the cloud.

Figure 24:
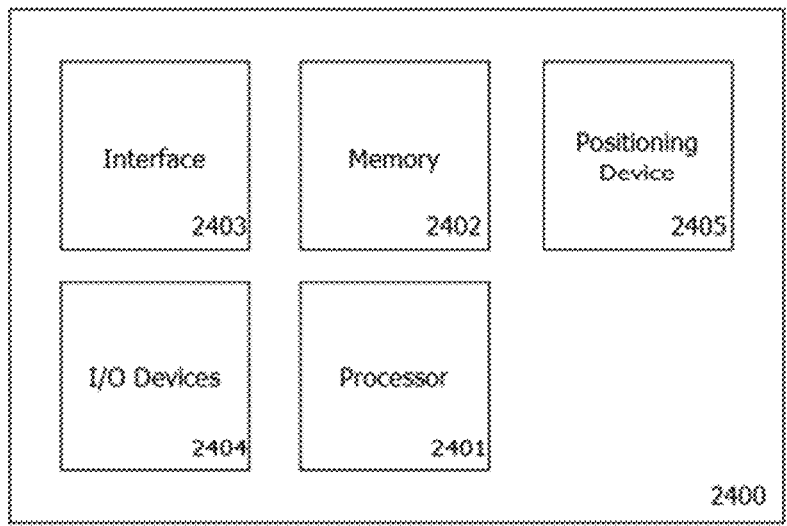
FIG. 24 shows schematically a user device suitable for the road environment.

FIG. 24 shows schematically a user device suitable for the road environment. FIG. 24 is discussed with FIG. 23. The second pedestrian 2310 may carry the user device 2400 that is configured to communicate with the road side unit 2304, or the communication network to access to the road side unit 2304. The user device 2400 may include a processor 2401, a memory 2402, input/output devices 2404, a positioning device and an interface to receive information from the road side unit 2304. The user device 2400 may include other components, elements or functions provided in this disclosure. The user device 2400 may be configured access the road section information that may also be stored in the cloud.

The second pedestrian 2310 may decide to use the road section 2315. The second pedestrian 2310 may actively provide an indication via the input/output devices 2404 of the user device 2400 that the second pedestrian intends 2310 to cross the road by entering into the road section 2315. The processor 2401 may receive the indication. The processor 2401 may further receive a position information from the positioning device 2405 to estimate the location of the second pedestrian 2310. Further, the processor 2401 may control the interface 2403 to receive the road section information based on the position information in order to receive the road section information related to the road section 2315.

Furthermore, the processor 2401 may provide information indicating that the second pedestrian 2310 intends to enter the road section 2315 to the interface 2403, so the interface 2403 may provide indication to the road side unit 2304 that the second pedestrian 2310 intends to enter the road section 2315. The road side unit 2304 may receive the indication via its interface module and provide an indication to the data fusion module in order to provide a data item related to the environment, so that the data fusion module is made aware of the intention of the second pedestrian 2310. The data fusion module may then provide the information to other prediction modules as discussed herein.

Furthermore, the processor 2401 may determine whether another road user is predicted in the road section 2315 based on the received road section information related to the road section 2315. The processor 2401 may identify that the second vehicle 2306 is predicted to enter the road section 2315 for a period of time. Accordingly, the processor 2401 may provide an indication to the I/O devices 2404 to provide an indication to the second pedestrian 2310. The indication may be provided, for example, as a visual indication provided on a display, as an audio indication, or as a haptic indication.

Furthermore, the interface 2403 of the user device 2400 may be configured to access at least a portion of the combined environment data based on the position of the user device 2400 or the second pedestrian 2310. The interface 2403 may receive at least the portion of the combined environment data and provide an indication of the overview of the road environment 2301, or the road section 2315. The indication may include a map of the road environment 2301 or the road section 2315. The indication may further include indication of a real-time detections which the data fusion module performs, e.g. visual representation of the map which the data fusion module generates.

Furthermore, the interface 2403 of the user device 2400 may be configured to access at least a portion of the road user trajectory data which the vehicle trajectory prediction module or which the vulnerable road user trajectory prediction module may generate. Furthermore, the interface 2403 of the user device 2400 may be configured to access at least a portion of the road section information which the road occupancy prediction module may generate.

Furthermore, the processor 2401 may be configured to process any type of information which the interface 2403 receives or accesses from the road side unit 2304, and provide output information based on the information which the interface 2403 receives or accesses from the road side unit. The output information may include indications which relate to at least a portion of the map which the data fusion module generates, and/or which relate to at least one or more road user trajectory data, and/or at least a portion of the road section information for one or more road sections. Accordingly, the user device 2400 may provide indication relating to the road environment 2301 to the road user.

Furthermore, the road occupancy prediction module may identify that the vulnerable road user trajectory prediction module has predicted that the third pedestrian 2311 intends to cross a road section 2316 based on the seventh road user trajectory data, and accordingly the third pedestrian 2311 may cross the road section 2316 for a first period of time.

Furthermore, the road occupancy prediction module may identify that the vulnerable road user trajectory prediction module has predicted further that the fourth pedestrian 2312 intends to stop in a sidewalk in the vicinity of the road section 2316 for a second period of time based on the eighth road user trajectory data. The road occupancy prediction module may further identify that the first period of time and the second period of time no overlap. Accordingly, the road occupancy prediction module may generate a road section information indicating that the third pedestrian 2311 may occupy the road section 2316. The road occupancy prediction module may further include in the road section information an information indicating that there is further the fourth pedestrian 2312 at the vicinity of the road section 2316.

The relevancy filter module may receive or may access the road section information. The relevancy filter module may determine to provide an indication to the third pedestrian 2311 indicating that there are no predicted other road users that intends to occupy the road section 2316. The relevancy filter module may further determine not to provide an indication to any of the road users in or in the vicinity of the road section 2315 based on the road section information, since there is no predicted occupancy for more than one road users. Accordingly, the relevancy filter module may provide a road section information to the memory module to store the road section information in a memory. Alternatively, the road section information may be stored in the cloud allowing access of a user device.

Figure 25:
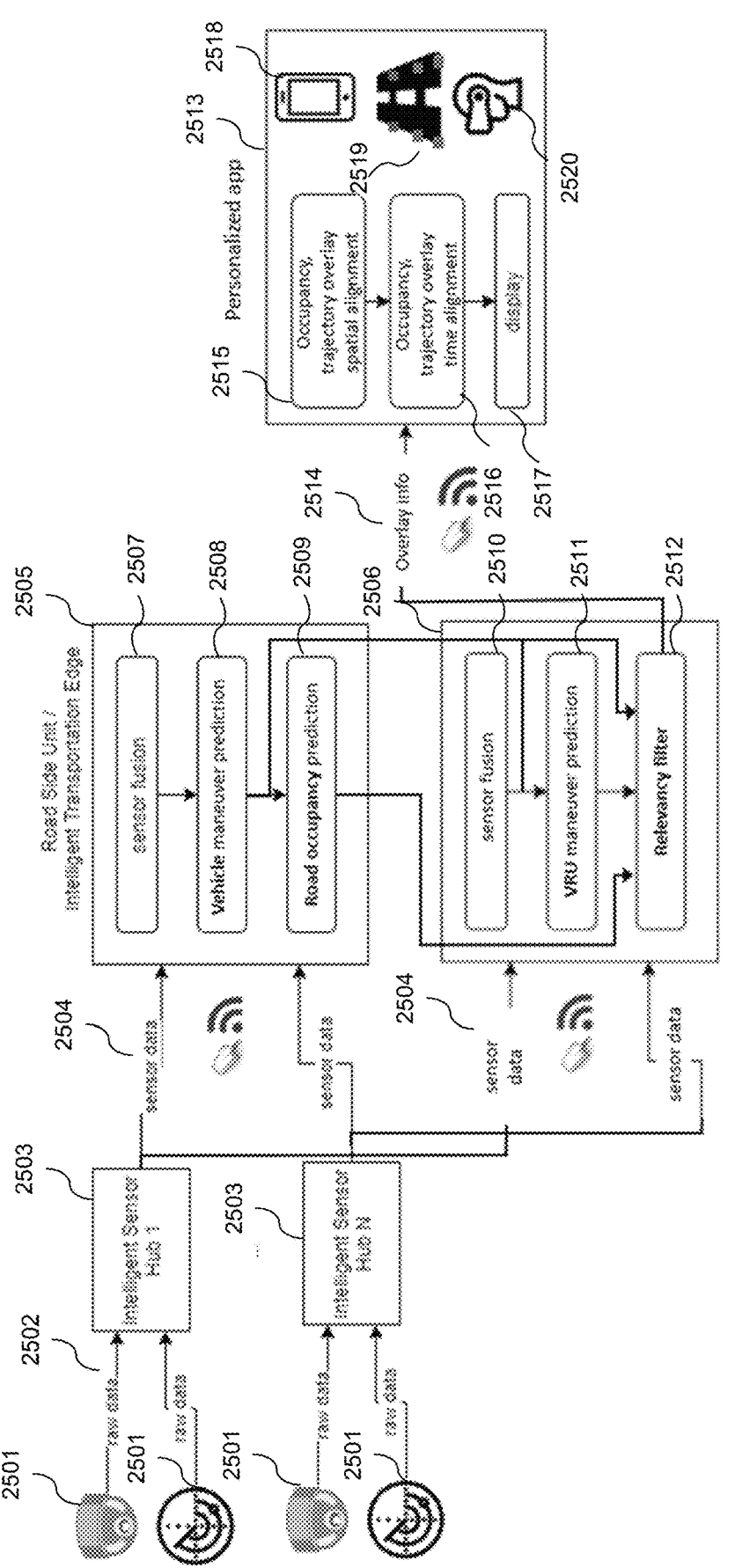
FIG. 25 shows schematically an example of a system.

FIG. 25 shows schematically an example of a system. The system may include a plurality of sensors 2501 that are configured to detect an object and provide a plurality of data items comprising information indicating whether an object has been detected by the respective sensor. The plurality of sensors 2501 may provide information indicating whether an object has been detected or not as a raw data 2502 to one or more sensor hubs 2503. The raw data may include digital signals. The raw data may also include analog signals.

The one or more sensor hubs 2503 may be configured to receive the raw data and provide a sensor data as an output. The sensor data may include digital information. The one or more sensor hubs 2503 may provide the sensor data to cloud computing device. The one or more sensor hubs 2503 may provide the sensor data to a road side unit and/or intelligent transportation edge 2505. The one or more sensor hubs 2503 may provide the sensor data to a roadside awareness module 2506.

The road side unit and/or intelligent transportation edge 2505 may include a sensor fusion module 2507 including a data fusion module, a vehicle maneuver prediction module 2508 including a vehicle trajectory prediction module, and a road occupancy prediction module 2509. The road side awareness module 2506 may include a sensor fusion module 2510 including a data fusion module, a VRU maneuver prediction module 2511 including a vulnerable road user trajectory prediction module, and a relevancy filter 2512. The vehicle maneuver prediction module 2508 may communicate with the sensor fusion module 2507, the road occupancy module 2509, the VRU maneuver prediction module 2511, and the relevancy filter. The road occupancy module 2509 may further communicate with the relevancy filter 2512. The VRU maneuver prediction module 2511 may further communicate with the relevancy filter 2512. Accordingly, the relevancy filter 2512 may determine information which the relevancy filter will provide to a personalized application in a form of overlay information 2514. The personalized application 2513 may further include an occupancy trajectory overlay spatial alignment module 2515 that is configured to provide spatial alignment for the received overlay information, an occupancy, trajectory overlay time alignment module 2516 to provide temporal alignment for the received overlay information, and a display interface 2517 to provide indication based on the aligned overlay information. The personalized application 2513 may be used via a user device. Such user device may be provided in a form of a mobile terminal 2518, or an infrastructure unit 2519 e.g. a display, or a wearable device 2520 may include the user device.

FIG. 26 shows schematically an example of a method. The method may include receiving 2601 a plurality of data items provided by a plurality of sensors, each of the plurality of data items may include a detection information indicating whether and object has been detected by the one of the plurality of sensors, predicting 2602 a road user trajectory for a road user based on the plurality of data items may include the detection information, generating 2603 a road user trajectory data based on the road user trajectory prediction, can optionally include that the road user trajectory data includes information indicating a predicted location of the road user in the road environment.

The following examples pertain to further aspects of this disclosure.

Example 1 includes a subject matter of an apparatus. The subject matter apparatus may be suitable for determining detection of a road user, including: a memory configured to store a plurality of data items received from a plurality of further road users, each of the plurality of data items including a detection information indicating whether an object has or has not been detected by one of the plurality of further road users; a processor configured to determine a detection result indicating whether the road user has been detected by the one of the plurality of further road users based on the detection information; and an output configured to provide an indication of the detection result.

In example 2, the subject matter of example 1, and can optionally include that the plurality of data items includes environment data including a list of objects detected by one of the plurality of further road users, and can optionally include that the processor is further configured to determine whether the road user has been detected by one of the plurality of further road users by identifying the road user in the list of objects.

In example 3, the subject matter of example 1 or example 2, and can optionally include that the plurality of data items includes information of at least one of the following: an object type indicating a type of the object; an object location indicating a detected location of the object; a further road user identifier indicating an identifier of the one of the plurality of further road users; a further road user type indicating a type of the one of the plurality of further road users; a further road user trajectory may include information related to a trajectory of the one of the plurality of further road users; a further road user location may include information related to a location of the one of the plurality of further road users.

In example 4, the subject matter of example 3, and can optionally include that the processor is further configured to determine whether the road user has been detected by one of the plurality of further road users by determining whether the object type information corresponds to a type of the road user. In example 5, the subject matter of example 3 or 4, and can optionally include that the processor is further configured to determine whether the road user has been detected by one of the plurality of further road users by determining whether the object location information corresponds to a current location of the road user.

In example 6, the subject matter of example any one of examples 1 to 5, and can optionally include that the determination of whether the road user has been detected by one of the plurality of further road users includes identifying the one of the plurality of further road users. In example 7, the subject matter of any one of examples 1 to 6, and can optionally include that the determination of whether the road user has been detected by the one of the plurality of further road users includes determining a location for the one of the plurality of further road users.

In example 8, the subject matter of any one of examples 1 to 7, and can optionally include that the processor is further configured to determine whether the road user has been detected by the one of the plurality of further road users based on a time information related to a receipt of data that is used to determine whether the road user has been detected by the one of the plurality of further road users. In example 9, the subject matter of any one of examples 1 to 8, and can optionally include that the processor is further configured to generate a perception perspective information indicating detected environment for the one of the plurality of further road users based on the plurality of data items.

In example 10, the subject matter of any one of examples 1 to 9, and can optionally include that the processor is further configured to determine whether the road user has been detected by the one of the plurality of further road users by determining whether the road user is located in the detected environment for the further road user. In example 11, the subject matter of any one of examples 1 to 10, and can optionally include that the plurality of further road users includes a first further road user and a second further road user. In example 12, the subject matter of example 11, and can optionally include that the processor is further configured to determine whether the road user has been detected by each of the plurality of further road users in the road environment by determining whether the road user has been detected by each of the plurality of further road users based on the plurality of data items for each of the plurality of further road users may include a list of objects.

In example 13, the subject matter of any one of examples 11 or 12, and can optionally include that the data plurality of data items includes a first environment data may include a first list of objects detected by the first further road user in a first environment and a second environment data may include a second list of objects detected by the second further road user in a second environment; can optionally include that the processor is further configured to generate a combined environment information by combining the first environment data and the second environment data. In example 14, the subject matter of any one of examples 11 to 13, and can optionally include that the processor is further configured to generate awareness information indicating which of the plurality of further road users have detected the road user.

In example 15, the subject matter of any one of examples 11 to 14, and can optionally include that the processor is further configured to generate a grid location for a grid of size N for each of the plurality of further road users based on the further road user location of each of the plurality of further road users. In example 16, the subject matter of any one of examples 13 to 15, and can optionally include that the processor is further configured to generate the combined environment information by fusing the first environment data and the second environment data. In example 17, the subject matter of any one of examples 13 to 16, and can optionally include that the processor is further configured to generate a output information based on the combined environment data, and can optionally include that the display information is configured to indicate to the road user the one of the plurality of further road users which has detected the road user, or the one of the plurality of further road users which has not detected the road user.

In example 18, the subject matter of example 17, and can optionally include that the processor is further configured to generate the output information by generating a first marker indicating the further road users that have detected the road user, and a second marker indicating the further road users that have not detected the road user. In example 19, the subject matter of any one of examples 17 or 18, and can optionally include that the processor is further configured to generate the output information by generating the first marker and the second marker based on a time information related to a receipt of one of the plurality of data items that is used to determine whether the road user has been detected by the one of the plurality of further road users based on the detection information.

In example 20, the subject matter of example 19, and can optionally include that the processor is further configured to generate the first marker and the second marker by generating a first color information for the first marker and a second color information for the second marker, and can optionally include that the color information includes a transparency component, and can optionally include that the transparency component is generated based on the time information related to the receipt of the data. In example 21, the subject matter of any one of examples 17 to 20, can optionally include that the output includes a display configured to display the output information. In example 22, the subject matter examples any one of examples 1 to 21, further may include a positioning unit configured to detect a location of the road user.

In example 23, the subject matter of example 22, and can optionally include that the memory is further configured to store information indicating the location of the road user. In example 24, the subject matter of any one of examples 14 to 23, and can optionally include that the processor is further configured to encode a message may include the awareness information. In example 25, the subject matter of any one of examples 1 to 24, and can optionally include that the processor is further configured to encode a message may include information indicating a presence of the road user for transmitting to the further road users that have not detected the road user. In example 26, the subject matter of any one of examples 1 to 25, and can optionally include that the processor is further configured to encode a message may include information indicating acknowledgement of the detection of the further road users that have detected the road user for transmitting to the further road users that have detected the road user.

In example 27, the subject matter of any one of examples 1 to 26, further may include a transmitter configured to transmit an encoded message. In example 28, the subject matter of any one of examples 1 to 27, and can optionally include that the processor is further configured to predict a road user trajectory for the road user. In example 29, the subject matter of example 28, and can optionally include that the processor is further configured to predict the road user trajectory based on at least one of the following: the combined data; a current position information indicating current position of the road user; a history position information indicating previous positions of the road user; a further information may include an indication of the head orientation and/or gaze direction of the road user; further road user information may include information indicating a trajectory for one of the plurality of further road users.

In example 30, the subject matter of any one of examples 28 or 29, and can optionally include that the road user trajectory includes at least one predicted location for the road user to be located at future. In example 31, the subject matter of any one of examples 28 to 30, and can optionally include that the processor is further configured to encode a message may include information indicating the road user trajectory for transmission. In example 32, the subject matter of example 31, and can optionally include that the processor is further configured to decode a response message received from at least one of the plurality of further road users. In example 33, the subject matter of example 32, further may include a transmitter configured to transmit an encoded message.

In example 34, the subject matter of any one of examples 1 to 33, further may include: a receiver configured to receive the plurality of data items, can optionally include that the receiver is configured to receive the data from the plurality of road users. In example 35, the subject matter of example 34, can optionally include that the receiver is configured to receive an environment map data from a road side unit. In example 36, the subject matter of any one of examples 1 to 35, can optionally include that the plurality of data items received from the plurality of road users includes a vehicle to everything (V2X) message, and can optionally include that the processor is configured to identify at least one of the plurality of further road users based on a header of the vehicle to everything (V2X) message.

In example 37, the subject matter of any one of examples 1 to 36, can optionally include that the road user is a vulnerable road user may include at least one of a pedestrian, a cyclist, a motor-cyclist, a person with disabilities or reduced mobility and orientation; can optionally include that the one of the plurality of further road users is a vehicle.

In example 38, the subject matter includes a method that may include: receiving, by a road user, a plurality of data items provided by a plurality of further road users, each of the plurality of data items may include a detection information indicating whether an object has or has not been detected by one of the plurality of further road users; determining a detection result indicating whether the road user has been detected by the one of the plurality of further road users based on the detection information; providing an indication of the detection result. In example 39, the method of example 38, further may include receiving the data from a plurality of further road users, and determining whether the road user has been detected by each of the plurality of further road users.

In example 40, a non-transitory computer readable medium may include instructions stored thereon, that if executed, cause a processor to: receive a plurality of data items provided by a plurality of further road users, each of the plurality of data items may include a detection information indicating whether an object has or has not been detected by one of the plurality of further road users; determine a detection result indicating whether the road user has been detected by the one of the plurality of further road users based on the detection information; provide an indication of the detection result. In example 41, the subject matter of example 40 may include further instructions, that if executed cause the processor to perform any of the examples 1 to 36.

Example 1A includes a subject matter of an apparatus. The subject matter includes: an interface configured to receive a plurality of data items provided by a plurality of sensors, each of the plurality of data items including a detection information indicating whether an object has been detected by the one of the plurality of sensors; a processor configured to: predict a road user trajectory for a road user based on one of the plurality of data items including the detection information, generate a road user trajectory data based on the road user trajectory prediction, wherein the road user trajectory data includes information indicating a predicted location of the road user in the road environment.

In example 2A, the subject matter of example 1A, wherein the processor is further configured to predict the road user trajectory for the road user based on a road user specific data item, wherein the road user specific data item includes at least one of the following information: an indication of a type of the road user; an indication of a posture of the road user; an indication of a behaviour of the road user; an indication of a state of the road user.

In example 3A, the subject matter of example 2A, can optionally include that the plurality of data items includes the road user specific data item, and can optionally include that processor is further configured to decode the road user specific data item. In example 4A, the subject matter of example any one of examples 1A to 3A, can optionally include that the plurality of data items includes a first sensor data and a second sensor data. In example 5A, the subject matter of example 4A, can optionally include that the first sensor data includes information indicating a detection of the road user at a first time, and can optionally include that the second sensor data includes information indicating a detection of the road user at a second time.

In example 6A, the subject matter of example 4A or 5A, can optionally include that the first sensor data includes information indicating a detection of the road user, and wherein the second sensor data includes information indicating a detection of a further road user. In example 7A, the subject matter of any one of examples 4A to 6A, can optionally include that the first sensor data includes information generated by a first sensor of the plurality of sensors, and can optionally include that the second sensor data includes information generated by a second sensor of the plurality of sensors. In example 8A, the subject matter of any one of examples 4A to 7A, can optionally include that the processor is further configured to perform a first prediction based on the first sensor data, and perform a second prediction based on the second sensor data.

In example 9A, the subject matter of any one of examples 4A to 8A, can optionally include that the processor is further configured to combine the first sensor data and the second sensor data to obtain a combined data, wherein the processor is further configured to perform a first prediction and/or a second prediction based on the combined data. In example 10A, the subject matter of any one of examples 4A to 9A, can optionally include that the combination of the first sensor data and the second sensor data includes at least one of the following: aligning the first data item and the second data item temporally; associating the first sensor data and the second sensor data; clustering and object extraction; tracking all provided road users.

In example 11A, the subject matter of any one of examples 4A to 10A, can optionally include that the plurality of data items includes information indicating presences of a plurality of road users; and can optionally include that the plurality of road users includes a first road user may include the road user, and a second road user; and can optionally include that the processor is further configured to identify a first object related to the first road user and a second object related to the second road user from the plurality of data items.

In example 12A, the subject matter of example 11A, can optionally include that the processor is further configured to predict a second road user trajectory for the second road user based on the received plurality of data items and generate a second road user trajectory data, and can optionally include that the second road user trajectory data includes information indicating a predicted location of the second road user in the road environment. In example 13A, the subject matter of example 11A or 12A, can optionally include that the processor is further configured to predict a second road user trajectory for the second road user based on the received plurality of data items and/or combined data and generate a second road user trajectory data, and can optionally include that the second road user trajectory data includes information indicating a predicted location of the second road user in the road environment.

In example 14A, the subject matter of example 12A or 13A, can optionally include that the processor is further configured to determine an occupancy of the predicted location of the first road user by the first road user and the second user at a period of time according to the first road user trajectory data and the second road user trajectory data. In example 15A, the subject matter of any one of examples 12A to 14A, can optionally include that the processor is further configured to generate an alternative trajectory for the first road user and/or the second road user based on the first road user trajectory data or the second road user trajectory data.

In example 16A, the subject matter of any one of examples 11A to 15A, can optionally include that the processor is further configured to determine whether the predicted location of the first road user will be occupied by the first road user and the second user at the same time. In example 17A, the subject matter of example 16A, can optionally include that the processor is further configured to generate a signal for transmission based on the determination of the occupancy of the predicted location of the first road user. In example 18A, the subject matter of any one of examples 16A or 17A, can optionally include that the processor is further configured to encode a message for transmission based on the determination of the occupancy of the predicted location of the first road user.

In example 19A, the subject matter of any one of examples 16A to 18A, can optionally include that the processor is further configured to encode a first message based on the determination of the occupancy of the predicted location of the first road user to be transmitted to the first road user, and can optionally include that the processor is further configured to encode a second message based on the determination of the occupancy of the predicted location of the first road user to be transmitted to the second road user. In example 20A, the subject matter of any one of examples 11A to 19A, can optionally include that the processor is further configured to determine locations in the road environment where there will be no occupancy by any one of the plurality of road users for a predetermined period of time.

In example 21A, the subject matter of any one of examples 11A to 20A, can optionally include that the processor is further configured to generate an alternative trajectory for the first road user and/or the second road user based on the determination of locations in the road environment where there will be no occupancy by any one of the plurality of road users for the predetermined period of time. In example 22A, the subject matter of any one of examples 11A to 21A, can optionally include that the processor is further configured to encode a message for transmission, and can optionally include that the message includes information indicating the alternative trajectory.

In example 23A, the subject matter of any one of examples 11A to 22A, can optionally include that the processor is further configured to determine the occupancy of the predicted location of the first road user based on a second road user specific information. In example 24A, the subject matter of example 23A, can optionally include that the second road user specific information includes at least one of the following: an indication of a type of the second road user; an indication of a posture of the second road user an indication of a behaviour of the second road user; an indication of a state of the second road user.

In example 25A, the subject matter of example 24A, can optionally include that the processor is further configured to predict the second road user trajectory for the second road user based on the plurality of data items and the second road user specific information. In example 26A, the subject matter of any one of examples 1 to 25A, can optionally include that the processor is further configured to determine whether the object is a vulnerable road user may include at least one of a pedestrian, a cyclist, a motor-cyclist, a person with disabilities or reduced mobility and orientation based on the plurality of data items.

In example 27A, the subject matter of any one of examples 1 to 26A, can optionally include that the processor is further configured to determine whether the road user is a vulnerable road user based on the plurality of data items. In example 28A, the subject matter of any one of examples 1 to 27A, can optionally include that the processor is further configured to generate a bird eye view representation of the road environment based on the plurality of data items. In example 29A, the subject matter of any one of examples 1 to 28A, can optionally include that the processor is further configured to identify an indication of a brake light of the road user, can optionally include that the processor is further configured to predict the road user trajectory further based on the identification of the indication of the brake light of the road user.

In example 30A, the subject matter of any one of examples 1 to 29A, can optionally include that the road user trajectory data includes information indicating a plurality of location for the road user for a plurality of period of time. In example 31A, the subject matter of any one of examples 1 to 30A, can optionally include that the processor is further configured to determine a type of the road user based on the plurality of data items. In example 32A, the subject matter of any one of examples 1 to 31A, further may include: a receiver configured to receive data item from a plurality of sensors in the road environment. In example 33A, the subject matter of any one of examples 1 to 32A, further may include: a transmitter configured to transmit an encoded message.

In example 34A, the subject matter is a system. The system includes: a plurality of sensors configured to detect an object, provide a plurality of data items may include information indicating whether the object has been detected by one of the plurality of sensors, an apparatus that may include a processor configured to: predict a road user trajectory for a road user based on the plurality of data items may include information indicating whether the object has been detected by the one of the plurality of sensors, generate a road user trajectory data based on the road user trajectory prediction, generate a road user trajectory data based on the road user trajectory prediction, can optionally include that the road user trajectory data includes information indicating a predicted location of the road user in the road environment.

In example 35A, the system of example 34A, further may include a plurality of indicators configured to be located at a plurality of indicator locations; can optionally include that the processor is further configured to determine a location of the road user; can optionally include that the processor is further configured to determine one of the plurality of indicators to transmit a signal based on the location of the road user. In example 36A, the system of any one of examples 34A or 35A, can optionally include that the plurality of sensors includes a first sensor and a second sensor, can optionally include that the first sensor is configured to detect an area of interest and located to detect the area of interest from a first viewing angle, can optionally include that the second sensor is configured to detect at least a portion of the area of interest from a second viewing angle.

In example 37A, the system of any one of examples 34A to 36A, can optionally include that one of the plurality of sensors are configured to detect a brake light condition of a vehicle, and can optionally include that the one of the plurality of sensors is configured to generate the plurality of data items may include an indication of the brake light condition of the vehicle. In example 38A, the system of any one of examples 34A to 37A, can optionally include that the plurality of sensors are configured to determine whether a detected object is a static object or a dynamic object, can optionally include that the one of the plurality of sensors is configured to generate the plurality of data items may include an indication of whether the object is a static object or a dynamic object.

In example 39A, the subject matter includes a method including: receiving a plurality of data items provided by a plurality of sensors, each of the plurality of data items may include a detection information indicating whether and object has been detected by the one of the plurality of sensors, predicting a road user trajectory for a road user based on the plurality of data items may include the detection information, generating a road user trajectory data based on the road user trajectory prediction, can optionally include that the road user trajectory data includes information indicating a predicted location of the road user in the road environment.

In example 40A, the subject matter includes a non-transitory computer readable medium. The non-transitory computer readable medium may include instructions stored thereon, that if executed, cause a processor to: receive a plurality of data items provided by a plurality of sensors, each of the plurality of data items may include a detection information indicating whether and object has been detected by the one of the plurality of sensors, predict a road user trajectory for a road user based on the plurality of data items may include the detection information, generate a road user trajectory data based on the road user trajectory prediction, can optionally include that the road user trajectory data includes information indicating a predicted location of the road user in the road environment. In example 39A, the subject matter of example 40A may further include instructions stored there, that if executed cause the processor to perform as provided in any one of the examples 1A to 33A.

The word "exemplary" is used herein to mean "serving as an example, instance, or illustration". Any aspect or design described herein as "exemplary" is not necessarily to be construed as preferred or advantageous over other aspects or designs.

Throughout the drawings, it should be noted that like reference numbers are used to depict the same or similar elements, features, and structures, unless otherwise noted. It should be noted that certain components may be omitted for the sake of simplicity. It should be noted that nodes (dots) are provided to identify the circuit line intersections in the drawings including electronic circuit diagrams.

The phrase "at least one" and "one or more" may be understood to include a numerical quantity greater than or equal to one (e.g., one, two, three, four, [ . . . ], etc.). The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of individual listed elements.

The words "plural" and "multiple" in the description and in the claims expressly refer to a quantity greater than one. Accordingly, any phrases explicitly invoking the aforementioned words (e.g., "plural [elements]", "multiple [elements]") referring to a quantity of elements expressly refers to more than one of the said elements. For instance, the phrase "a plurality" may be understood to include a numerical quantity greater than or equal to two (e.g., two, three, four, five, [ . . . ], etc.).

As used herein, a signal that is "indicative of" or "indicating" a value or other information may be a digital or analog signal that encodes or otherwise, communicates the value or other information in a manner that can be decoded by and/or cause a responsive action in a component receiving the signal. The signal may be stored or buffered in computer-readable storage medium prior to its receipt by the receiving component and the receiving component may retrieve the signal from the storage medium. Further, a "value" that is "indicative of" some quantity, state, or parameter may be physically embodied as a digital signal, an analog signal, or stored bits that encode or otherwise communicate the value.

As used herein, a signal may be transmitted or conducted through a signal chain in which the signal is processed to change characteristics such as phase, amplitude, frequency, and so on. The signal may be referred to as the same signal even as such characteristics are adapted. In general, so long as a signal continues to encode the same information, the signal may be considered as the same signal. For example, a transmit signal may be considered as referring to the transmit signal in baseband, intermediate, and radio frequencies.

The terms "processor" or "controller" as, for example, used herein may be understood as any kind of technological entity that allows handling of data. The data may be handled according to one or more specific functions executed by the processor or controller. Further, a processor or controller as used herein may be understood as any kind of circuit, e.g., any kind of analog or digital circuit. A processor or a controller may thus be or include an analog circuit, digital circuit, mixed-signal circuit, logic circuit, processor, micro-processor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

The terms "one or more processors" is intended to refer to a processor or a controller. The one or more processors may include one processor or a plurality of processors. The terms are simply used as an alternative to the "processor" or "controller".

As utilized herein, terms "module", "component," "system," "circuit," "element," "slice," "circuit," and the like are intended to refer to a set of one or more electronic components, a computer-related entity, hardware, software (e.g., in execution), and/or firmware. For example, circuit or a similar term can be a processor, a process running on a processor, a controller, an object, an executable program, a storage device, and/or a computer with a processing device. By way of illustration, an application running on a server and the server can also be circuit. One or more circuits can reside within the same circuit, and circuit can be localized on one computer and/or distributed between two or more computers. A set of elements or a set of other circuits can be described herein, in which the term "set" can be interpreted as "one or more."

As used herein, "memory" is understood as a computer-readable medium (e.g., a non-transitory computer-readable medium) in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, 3D Points, among others, or any combination thereof. Registers, shift registers, processor registers, data buffers, among others, are also embraced herein by the term memory. The term "software" refers to any type of executable instruction, including firmware.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term "data", however, is not limited to the aforementioned examples and may take various forms and represent any information as understood in the art. The term "data item" may include data or a portion of data.

The term "antenna", as used herein, may include any suitable configuration, structure and/or arrangement of one or more antenna elements, components, units, assemblies and/or arrays. The antenna may implement transmit and receive functionalities using separate transmit and receive antenna elements. The antenna may implement transmit and receive functionalities using common and/or integrated transmit/receive elements. The antenna may include, for example, a phased array antenna, a single element antenna, a set of switched beam antennas, and/or the like.

It will be understood that when an element is referred to as being "connected" or "coupled" to another element, it can be physically connected or coupled to the other element such that current and/or electromagnetic radiation (e.g., a signal) can flow along a conductive path formed by the elements. Intervening conductive, inductive, or capacitive elements may be present between the element and the other element when the elements are described as being coupled or connected to one another. Further, when coupled or connected to one another, one element may be capable of inducing a voltage or current flow or propagation of an electro-magnetic wave in the other element without physical contact or intervening components. Further, when a voltage, current, or signal is referred to as being "provided" to an element, the voltage, current, or signal may be conducted to the element by way of a physical connection or by way of capacitive, electro-magnetic, or inductive coupling that does not involve a physical connection.

Unless explicitly specified, the term "transmit" encompasses both direct (point-to-point) and indirect transmission (via one or more intermediary points). Similarly, the term "receive" encompasses both direct and indirect reception. Furthermore, the terms "transmit," "receive," "communicate," and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as RF transceivers and antennas, and the logical transmission and reception over the software-level connection is performed by the processors or controllers. The term "communicate" encompasses one or both of transmitting and receiving, i.e., unidirectional or bidirectional communication in one or both of the incoming and outgoing directions. The term "calculate" encompasses both 'direct' calculations via a mathematical expression/formula/relationship and 'indirect' calculations via lookup or hash tables and other array indexing or searching operations.

The term "road user" intends to refer any vehicles involved in road traffic that may include passenger cars, trucks, motorcycles, electrical scooters, electrical chairs, and the like, and further it may include vehicles that are driven with a motor or without a motor, including bicycles, and scooters. Furthermore, the term "road user" also include pedestrians, cyclists, motor-cyclists, and people with disabilities or reduced mobility and orientation.

The term "vulnerable road user" intends to refer road users that may be non-motorized road users, such as pedestrians, children, and cyclists as well as motor-cyclists and persons with disabilities or reduced mobility and orientation.

Some aspects may be used in conjunction with one or more types of wireless communication signals and/or systems, for example, Radio Frequency (RF), Infra-Red (IR), Frequency-Division Multiplexing (FDM), Orthogonal FDM (OFDM), Orthogonal Frequency-Division Multiple Access (OFDMA), Spatial Divisional Multiple Access (SDMA), Time-Division Multiplexing (TDM), Time-Division Multiple Access (TDMA), Multi-User MIMO (MU-MIMO), General Packet Radio Service (GPRS), extended GPRS (EGPRS), Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth (BT), Global Positioning System (GPS), Wi-Fi, WiMax, Zig-Bee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other aspects may be used in various other devices, systems and/or networks.

Some demonstrative aspects may be used in conjunction with a WLAN, e.g., a WiFi network. Other aspects may be used in conjunction with any other suitable wireless communication network, for example, a wireless area network, a "piconet", a WPAN, a WVAN, and the like.

Some aspects may be used in conjunction with a wireless communication network communicating over a frequency band of 2.4 GHz, 5 GHz, and/or 6-7 GHz. However, other aspects may be implemented utilizing any other suitable wireless communication frequency bands, for example, an Extremely High Frequency (EHF) band (the millimeter wave (mmWave) frequency band), e.g., a frequency band within the frequency band of between 20 GHz and 300 GHz, a WLAN frequency band, a WPAN frequency band, and the like.

While the above descriptions and connected figures may depict electronic device components as separate elements, skilled persons will appreciate the various possibilities to combine or integrate discrete elements into a single element. Such may include combining two or more circuits to form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

What is claimed is:

1. An apparatus comprising:
an interface configured to receive a plurality of data items provided by a plurality of sensors, wherein the plurality of data items comprises information indicating presences of a plurality of road users in a road environment, wherein the plurality of road users comprises a first road user and a second road user;
a processor configured to:
   identify a first object related to the first road user and a second object related to the second road user from the plurality of data items;
   predict a respective road user trajectory for each of the plurality of road users based on the plurality of data items;
   generate road user trajectory data based on the predicted road user trajectories, wherein the road user trajectory data comprises information indicating a respective predicted location of each of the plurality of road users in the road environment;
   determine whether the predicted location of the first road user will be occupied by the first road user and the second road user at the same time;
   determine locations in the road environment where there will be no occupancy by any one of the plurality of road users for a period of time; and
   generate an alternative trajectory for a road user being the first road user of the plurality of road users based on the determination of the locations;
   encode a first message based on the determination of the occupancy of the predicted location of the first road user to be transmitted to the first road user; and
   encode a second message based on the determination of the occupancy of the predicted location of the first road user to be transmitted to the second road user.

2. The apparatus of claim 1,
wherein the processor is further configured to predict the road user trajectory for the road user based on a road user data item, and
wherein the road user data item comprises at least one of the following information:
   an indication of a type of the road user;
   an indication of a posture of the road user;
   an indication of a behaviour of the road user;
   an indication of a state of the road user;
   wherein the plurality of data items comprises the road user data item.

3. The apparatus of claim 1,
wherein the plurality of data items comprises a first sensor data item and a second sensor data item; and
wherein the processor is further configured to perform a first prediction based on the first sensor data item, and perform a second prediction based on the second sensor data item.

4. The apparatus of claim 1,
wherein the processor is further configured to determine the occupancy of the predicted location of the first road user based on a second road user information; and
wherein the second road user information comprises at least one of the following:
   an indication of a type of the second road user;
   an indication of a posture of the second road user;
   an indication of a behaviour of the second road user;
   an indication of a state of the second road user.

5. The apparatus of claim 1,
wherein the processor is further configured to encode a message for transmission,
wherein the message comprises information indicating the alternative trajectory.

6. The apparatus of claim 1, further comprising a transmitter configured to transmit an encoded message.

7. A system comprising:
a plurality of indicators configured to be located at a plurality of indicator locations;
a plurality of sensors configured to:
   detect an object, and
   provide a plurality of data items comprising information indicating whether the object has been detected by one of the plurality of sensors, and
an apparatus comprising a processor configured to:
   predict a respective road user trajectory for each of a plurality of road users based on the plurality of data items comprising information indicating presences of the plurality of road users in a road environment,
   generate road user trajectory data based on the predicted road user trajectories, wherein the road user trajectory data comprises information indicating a respective predicted location of each of the plurality of road users in the road environment;
   determine locations in the road environment where there will be no occupancy by any one of the plurality of road users for a period of time;
   determine a location of the road user; and
   select one of the plurality of indicators based on the location of the road user and to transmit a signal to the selected indicator; and
   generate an alternative trajectory for a road user of the plurality of road users based on the determination of the locations.

8. The system of claim 7,
wherein the plurality of sensors comprises a first sensor and a second sensor, and
wherein the first sensor is configured to detect an area of interest and located to detect the area of interest from a first viewing angle, and
wherein the second sensor is configured to detect at least a portion of the area of interest from a second viewing angle.

9. The system of claim 8,
wherein one of the plurality of sensors are configured to detect a brake light condition of a vehicle, and
wherein the one of the plurality of sensors is configured to generate one of the plurality of data items comprising an indication of the brake light condition of the vehicle.

* * * * *